(12) United States Patent
Hayduke

(10) Patent No.: US 10,970,863 B2
(45) Date of Patent: Apr. 6, 2021

(54) SYSTEM AND METHOD OF ANALYZING FEATURES OF THE HUMAN FACE AND BREASTS USING ONE OR MORE OVERLAY GRIDS

(71) Applicant: Andrew John-Haidukewych Hayduke, Rancho Mirage, CA (US)

(72) Inventor: Andrew John-Haidukewych Hayduke, Rancho Mirage, CA (US)

(*) Notice: Subject to any disclaimer, the term of this patent is extended or adjusted under 35 U.S.C. 154(b) by 80 days.

(21) Appl. No.: 16/593,126

(22) Filed: Oct. 4, 2019

(65) Prior Publication Data

US 2020/0034979 A1 Jan. 30, 2020

Related U.S. Application Data

(63) Continuation-in-part of application No. 16/002,924, filed on Jun. 7, 2019, now abandoned, which is a continuation of application No. 15/628,419, filed on Jun. 20, 2017, now Pat. No. 9,996,943, which is a
(Continued)

(51) Int. Cl.
| | |
|---|---|
| *G06K 9/00* | (2006.01) |
| *G06T 7/38* | (2017.01) |
| *G06T 11/60* | (2006.01) |
| *G06T 7/00* | (2017.01) |
| *G06T 7/33* | (2017.01) |

(52) U.S. Cl.
CPC ............ *G06T 7/38* (2017.01); *G06K 9/00281* (2013.01); *G06T 7/0014* (2013.01); *G06T 7/33* (2017.01); *G06T 11/60* (2013.01); *G06K 2009/00322* (2013.01); *G06T 2207/10004* (2013.01); *G06T 2207/20221* (2013.01); *G06T 2207/30201* (2013.01)

(58) Field of Classification Search
CPC .... G06K 9/00268; G06T 7/0028; G06T 11/60
See application file for complete search history.

(56) References Cited

U.S. PATENT DOCUMENTS

| | | | | |
|---|---|---|---|---|
| 2009/0257654 | A1* | 10/2009 | Roizen | G06K 9/00281 382/190 |
| 2017/0286751 | A1* | 10/2017 | Hayduke | G06T 7/38 |

OTHER PUBLICATIONS

Mallucci et al, "Shapes, Proportions, and Variations in Breast Aesthetic Ideals The Definition of Breast Beauty," 2015, Clin Plastic Surg 42, pp. 451-464 (14 pages) (Year: 2015).*

* cited by examiner

*Primary Examiner* — David F Dunphy
(74) *Attorney, Agent, or Firm* — Ellenoff Grossman & Schole LLP; James M. Smedley; Alex Korona

(57) ABSTRACT

The present invention generally relates to human feature analysis. Specifically, embodiments of the present invention relate to a system and method for utilizing one or more overlay grids in conjunction with imagery of a human face or breast area in order to analyze beauty and attractiveness of the face or breast area in the underlying imagery. In an exemplary embodiment, the system utilizes computerized image capture features and processing features to analyze a human face or breast area in relation to a plurality of overlay grids in order to identify and empirically measure beauty and attractiveness based on the alignment of said overlay grids with specific features of the human face or breast area and whether a successful fit exists with specifically defined facial or breast grids or by how close the individual's features align with specifically defined facial or breast grids.

16 Claims, 39 Drawing Sheets

Related U.S. Application Data continuation of application No. 14/981,827, filed on Dec. 28, 2015, now Pat. No. 9,721,146.

SYSTEM AND METHOD OF ANALYZING FEATURES OF THE HUMAN FACE AND BREASTS USING ONE OR MORE OVERLAY GRIDS

CROSS-REFERENCE TO RELATED APPLICATIONS

This application is a continuation-in-part of U.S. Non-Provisional Utility patent application Ser. No. 16/002,924 filed Jun. 7, 2018, and entitled "System and method for analyzing features of a human face using one or more overlay facial grids", which is a continuation of U.S. Non-Provisional Utility patent application Ser. No. 15/628,419 filed Jun. 20, 2017 (since issued as U.S. Pat. No. 9,996,943 on Jun. 12, 2018), and entitled "System and method for analyzing features of a human face using one or more overlay facial grids", which is a continuation of U.S. Non-Provisional Utility patent application Ser. No. 14/981,827, filed Dec. 28, 2015 (since issued as U.S. Pat. No. 9,721,146 on Aug. 1, 2017), and entitled "System and method for analyzing features of a human face using one or more overlay facial grids." The entire disclosures of each and all of the above mentioned references are hereby incorporated herein by reference.

FIELD OF THE INVENTION

The present invention generally relates to human feature analysis such as, for example, human facial feature and/or breast feature analysis. Specifically, embodiments of the present invention relate a system and method for utilizing one or more specifically defined overlay grids in conjunction with imagery of a human face and/or human breast area in order to analyze beauty and attractiveness of the face and/or breast area in the underlying imagery. In an exemplary embodiment, the system utilizes computerized image capture features and processing features to analyze a human face and/or breast area in relation to a plurality of overlay grids in order to identify and empirically measure beauty and attractiveness based on the alignment of said overlay grids with specific facial features (e.g. upper lip border, eyebrows, chin edge) of the human face and/or breast features and the presence or absence of the divine proportion (golden ratio) 1:1.618 relationship in the resultant quadrilaterals created by one or more specified overlay facial grids and/or breast grids.

BACKGROUND OF THE INVENTION

Beauty and attractiveness at first glance may appear to be subjective qualities that lie solely in the eye of the beholder. However, empirical research and data has shown time and again that there are certain quantifiable aspects that can be measured and determine with a high probability the actual attractiveness of an individual. Even as far back as ancient Greece, early mathematicians were able to deduce a relationship between two linear distances, known as the "golden ratio" or "golden proportion" (used interchangeably herein), that has been shown to produce aesthetically pleasing results. This golden ratio has been used to produce works of exceptional aesthetic qualities in everything from art to architecture. Some believe that many of the architectural proportions of the famous Greek Parthenon are alleged to exhibit golden ratio relationships to create this beautifully balanced architectural masterpiece.

While useful in artwork and architecture, the golden ratio has also been shown to be useful in determining the attractiveness of individuals as well. Ancient Greeks found the golden ratio may apply to the certain ratios related to the human body, such as ratios between the height of an individual and various points on the individual's body. Leonardo da Vinci's illustrations of polyhedra in De divina proportione and his views that some bodily proportions exhibit the golden ratio have led some scholars to speculate that he incorporated the golden ratio into his paintings. It has been suggested that even his famous Mona Lisa and Vitruvian Man, for example, possibly employ golden ratio proportions.

While much research has been done, there is still much left unanswered about application of the golden ratio to various aspects of aesthetics when it comes to human facial or breast analysis and empirical determination of beauty and attractiveness of a human face or breast area.

Therefore, there is a need in the art for a system and method that allows for the analysis of a human face or human breast area in order to analyze beauty and attractiveness of the face or breast area. These systems and methods may be best engaged and practiced through the use of modern computing and imaging systems in order to capture and analyze the underlying imagery, such as through the use of overlays comprising grid lines, for the purpose of analyzing the beauty and attractiveness of a human face or breast area. These and other features and advantages of the present invention will be explained and will become obvious to one skilled in the art through the summary of the invention that follows.

SUMMARY OF THE INVENTION

Accordingly, it is an object of the present invention to provide systems and methods for capturing imagery of a human face and/or a human breast area for the purpose of analysis, such as through the use of overlays comprising grid lines, directed at analyzing the beauty and attractiveness of the human face and/or breast area.

According to an embodiment of the present invention, a system for analyzing the attractiveness of a human face comprises: an image capture and processing module, comprising computer-executable code stored in non-volatile memory, an overlay retrieval and analysis module, comprising computer-executable code stored in non-volatile memory, a processor, and a display element, wherein said image capture and processing module, said overlay retrieval and analysis module, said processor, and said display element are operably connected and are configured to: receive image data associated with one or more images of the human face; process said one or more images of the human face in order to identify a plurality of facial features to be analyzed; retrieve a plurality of overlay grids selected from a group of facial grid overlays; align each overlay grid of said plurality of overlay grids over said one or more images, wherein said alignment utilizes said identified plurality of facial features as points of reference for said alignment; and generate an analysis of said human face based upon whether the individual's resultant grid meet the required 1:1.618 ratio dictated within the reference facial grid.

According to an embodiment of the present invention, the facial grid overlays comprise a plurality of anchor points, wherein each anchor point associates with a feature of a face of a human.

According to an embodiment of the present invention, said anchor points are selected from the group consisting of an upper lip vermillion apex plane, a separation point of lips, a lower lip vermillion apex plane, a pupillary horizontal plane, an inferior edge of a chin, an eyebrow arch, a medial canthus, a contralateral medial canthus, a canthal plane, a nasal base plane, a supratip breakpoint of nose, a nasal base, one or more pupils, a nostril opening, a lower eyelid margin, an upper eyelid margin, an eyebrow arch, a temporal process of zygoma, a contralateral temporal process of zygoma, a facial midline, a contralateral lateral canthus, a medial ipsilateral iris edge, an ipsilateral medial canthus, a right oral commissure, a right cupid's bow, a left cupid's bow, a left oral commissure, an ipsilateral lateral canthus pupil, a lateral ipsilateral iris edge, a lateral canthus, a nasal radix, a nasal tip edge, an upper lip philtral dimple, an anterior edge of eyeball globe, a horizontal line just above the nostrils, a right cupid's bow peak, a left cupid's bow peak, an oral commissure, and an inner margin of nostrils.

According to an embodiment of the present invention, at least one overlay comprises anchor points consisting of, an upper lip vermillion apex plane, a separation point of the lips, and a lower lip vermillion apex plane.

According to an embodiment of the present invention, at least one overlay comprises anchor points consisting of, a pupillary horizontal plane, a lip separation point, and an inferior edge of a chin.

According to an embodiment of the present invention, at least one overlay comprises anchor points consisting of, an eyebrow arch, an upper lip vermillion apex plane, and an inferior chin edge.

According to an embodiment of the present invention, at least one overlay comprises anchor points consisting of, a medial canthus, a contralateral medial canthus, and an inner margin of nostrils.

According to an embodiment of the present invention, at least one overlay comprises anchor points consisting of, pupils, a supratip breakpoint of nose and a nasal base.

According to an embodiment of the present invention, at least one overlay comprises anchor points consisting of, a lower eyelid margin, an upper eyelid margin, and an eyebrow arch.

According to an embodiment of the present invention, at least one overlay comprises anchor points consisting of, a temporal process of zygoma, a contralateral medial canthus, and a contralateral temporal process of zygoma.

According to an embodiment of the present invention, a method for analyzing the attractiveness of a human face comprises the steps of: receiving image data associated with one or more images of the human face; processing said one or more images of the human face in order to identify a plurality of facial features to be analyzed; retrieving a plurality of overlay grids selected from a group of facial grid overlays; aligning each overlay grid of said plurality of overlay grids over said one or more images, wherein said alignment utilizes said identified plurality of facial features as points of reference for said alignment; and generating an analysis of said human face based upon whether the individual's resultant grid meet the suitable 1:1.618 ratio dictated within the reference facial grid.

In at least some exemplary embodiments of the present invention, a system for analyzing the attractiveness of a human breast area comprises an image capture and processing module, comprising computer-executable code stored in non-volatile memory, an overlay retrieval and analysis module, comprising computer-executable code stored in non-volatile memory, a processor, and a display element. Said image capture and processing module, said overlay retrieval and analysis module, said processor, and said display element are operably connected and are configured to receive image data associated with one or more images of the human breast area, process said one or more images of the human breast area in order to identify a plurality of breast features to be analyzed, generate and associate placement points for each identified breast feature, group the placement points into respective breast zones, where each breast zone comprises one or more identified breast features, wherein each breast zone is configured as one or more quadrilateral grids having dimensions that are defined by said placement points, retrieve one or more quadrilateral breast overlay grids for each breast zone, wherein the quadrilateral breast overlay grids are selected from a group of specifically defined breast grid overlays; align each retrieved quadrilateral breast overlay grid over said one or more images, wherein said alignment utilizes said identified plurality of breast features as points of reference for said alignment, wherein said alignment aligns said retrieved quadrilateral breast overlay grids over discontinuous discrete portions of said image, calculate for each of said one or more quadrilateral grids comprising each of said breast zones a numerical rating score indicative of a degree of match between said one or more quadrilateral grids and said quadrilateral breast overlay grid aligned to said one or more quadrilateral grids, and calculate an overall numerical attractiveness rating score as the sum of individually calculated numerical rating scores. The one or more quadrilateral breast overlay grids form a logarithmic spiral having a predetermined growth factor.

In at least some exemplary embodiments of the present invention, the predetermined growth factor is 1.618.

In at least some exemplary embodiments of the present invention, the logarithmic spiral widens in a direction moving from an origin by a factor of 1.618 for each quarter turn that the logarithmic spiral makes.

In at least some exemplary embodiments of the present invention, a portion of the logarithmic spiral is overlaid at the lower breast margin curvature of the human breast.

In at least some exemplary embodiments of the present invention, the one or more quadrilateral breast overlay grids have a first dimension and a second dimension, with a ratio between the first dimension and the second dimension being 1.618:1.

In at least some exemplary embodiments of the present invention, the plurality of breast features are selected from the group consisting of a base of a jugular suprasternal notch, a medial uppermost margin of a right breast, a medial uppermost margin of a left breast, a superior border of a right areola, a superior border of a left areola, a superior border of a right nipple, a superior border of a left nipple, a lateral margin of a right breast, a lateral border of a right areola, a center of a right nipple, a medial border of a right areola, a medial border of a left areola, a center of a left nipple, a lateral border of a left areola, a lateral margin of a left breast, a central inferior-most margin of a right breast, a central inferior-most margin of a left breast, and a center of an umbilicus.

In at least some exemplary embodiments of the present invention, the plurality of breast features are selected from the group consisting of a lowermost inferior border of a right clavicle, a superior border of a right areola, a central base of a right nipple where a nipple base joins an areola, an anterior most margin of a right breast, and an inferior most central margin of a right breast.

In at least some exemplary embodiments of the present invention, the plurality of breast features are selected from the group consisting of a lowermost inferior border of a left clavicle, a superior border of a left areola, a central base of a left nipple, an anterior most margin of a left breast, and an inferior most central margin of a left breast.

In at least some exemplary embodiments of the present invention, the image data associated with the one or more images of the human breast area includes data of one or more equivalent images that are equivalent to imaging by a 35 mm single lens reflex print film camera having a focal length of between 50 mm and 60 mm. In other embodiments, imaging devices with other lens apertures and focal lengths may be used. In still further embodiments, three-dimensional imaging or other stereoscopic imaging techniques may be used to capture the image data. One of ordinary skill in the art would appreciate that there are numerous methods for capturing image data, and embodiments of the present invention are contemplated for use with any appropriate imaging technique.

In at least some exemplary embodiments of the present invention, a method for analyzing the attractiveness of a human breast area comprises receiving image data associated with one or more images of a human breast area, processing said one or more images of the human breast area in order to identify a plurality of breast features to be analyzed, generating and associating placement points for each identified breast feature, grouping the placement points into respective breast zones, where each breast zone comprises one or more identified breast features, wherein each breast zone is configured as one or more quadrilateral grids having dimensions that are defined by said placement points, retrieving one or more quadrilateral breast overlay grids for each breast zone, wherein the quadrilateral breast overlay grids are selected from a group of specifically defined breast grid overlays, aligning each retrieved quadrilateral breast overlay grid over said one or more images, wherein said alignment utilizes said identified plurality of breast features as points of reference for said alignment, wherein said alignment aligns said retrieved quadrilateral breast overlay grids over discontinuous discrete portions of said image, calculating for each of said one or more quadrilateral grids comprising each of said breast zones a numerical rating score indicative of a degree of match between said one or more quadrilateral grids and said quadrilateral breast overlay grid aligned to said one or more quadrilateral grids, and calculating an overall numerical attractiveness rating score as the sum of individually calculated numerical rating scores. The one or more quadrilateral breast overlay grids form a logarithmic spiral having a predetermined growth factor.

In at least some exemplary embodiments of the present invention, a system for analyzing the attractiveness of a human breast area comprises an image capture and processing module, comprising computer-executable code stored in non-volatile memory, an overlay retrieval and analysis module, comprising computer-executable code stored in non-volatile memory, a processor, and a display element. Said image capture and processing module, said overlay retrieval and analysis module, said processor, and said display element are operably connected and are configured to receive image data associated with one or more images of the human breast area, process said one or more images of the human breast area in order to identify a plurality of breast features to be analyzed, generate and associate placement points for each identified breast feature, group the placement points into respective breast zones, where each breast zone comprises one or more identified breast features, wherein each breast zone is configured as one or more quadrilateral grids having dimensions that are defined by said placement points, retrieve one or more quadrilateral breast overlay grids for each breast zone, wherein the quadrilateral breast overlay grids are selected from a group of specifically defined breast grid overlays; align each retrieved quadrilateral breast overlay grid over said one or more images, wherein said alignment utilizes said identified plurality of breast features as points of reference for said alignment, wherein said alignment aligns said retrieved quadrilateral breast overlay grids over discontinuous discrete portions of said image, calculate for each of said one or more quadrilateral grids comprising each of said breast zones a numerical rating score indicative of a degree of match between said one or more quadrilateral grids and said quadrilateral breast overlay grid aligned to said one or more quadrilateral grids, and calculate an overall numerical attractiveness rating score as the sum of individually calculated numerical rating scores. The image data associated with the one or more images of the human breast area includes data of one or more equivalent images that are equivalent to imaging by a 35 mm camera having a focal length of between 50 mm and 60 mm.

In at least some exemplary embodiments of the present invention, the 35 mm camera is a 35 mm single lens reflex print film camera.

In at least some exemplary embodiments of the present invention, the one or more quadrilateral breast overlay grids have a first dimension and a second dimension, with a ratio between the first dimension and the second dimension being 1.618:1.

The foregoing summary of the present invention with the exemplary embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to human facial feature and/or human breast feature analysis. Specifically, embodiments of the present invention relate a system and method for utilizing one or more overlay grids in conjunction with imagery of a human face and/or breast area in order to analyze beauty and attractiveness of the face and/or breast area in the underlying imagery. In an exemplary embodiment, the system utilizes computerized image capture features and processing features to analyze a human face and/or breast area in relation to a plurality of overlay grids in order to identify and empirically measure beauty and attractiveness based on the alignment of said overlay grids with specific features (e.g., nose, lips, eyebrows) of the human face and/or breast area.

Figure 1:
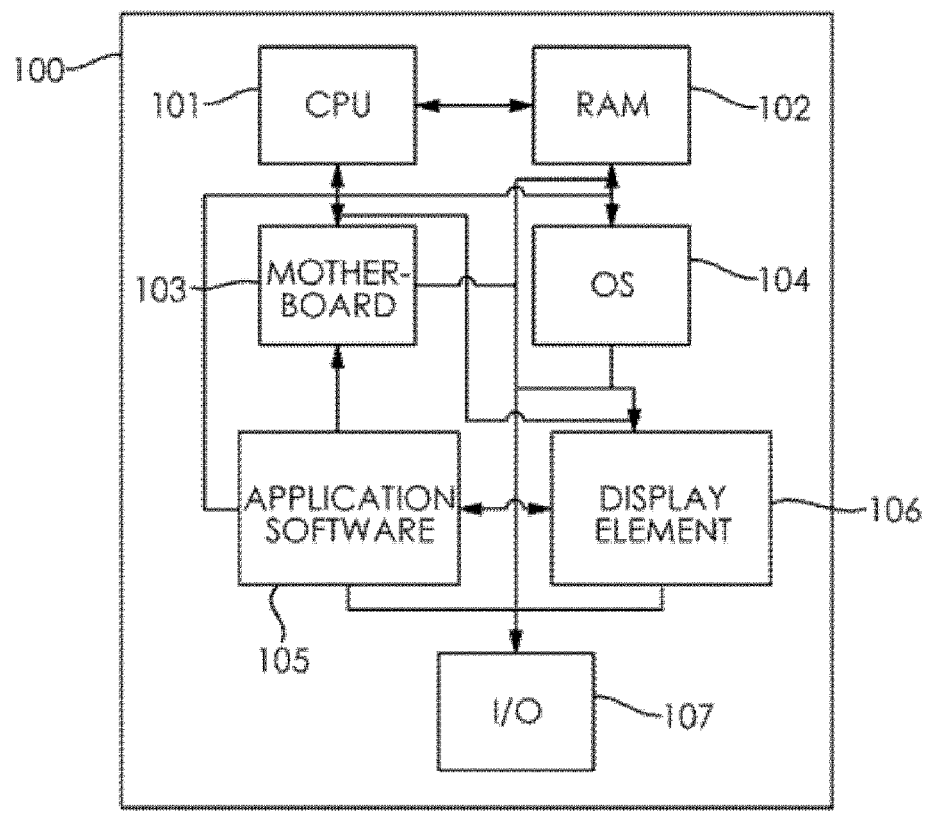
FIG. 1 illustrates a schematic overview of a computing device, in accordance with an embodiment of the present invention.

According to an embodiment of the present invention, the system and method shares data to and may be used in conjunction or through the use of one or more computing devices. As shown in FIG. 1, one of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, one or more programming languages 106 and one or more input/output devices/means 107. Examples of computing devices usable with embodiments of the present invention include, but are not limited to, personal computers, smartphones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

Figure 2A:
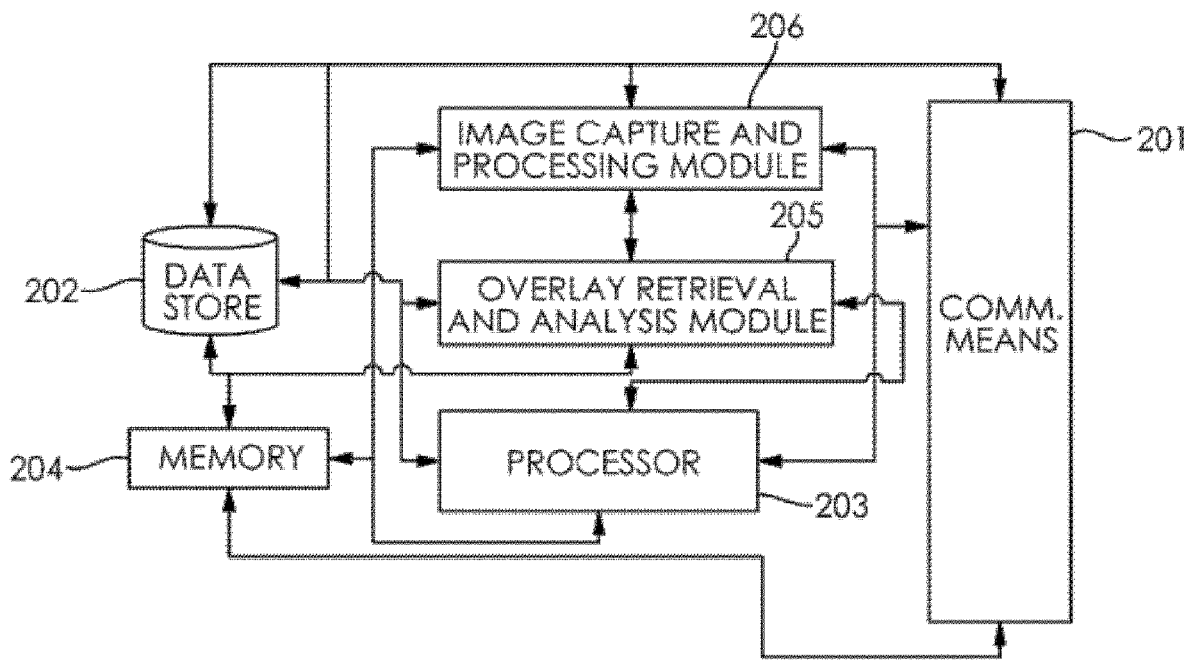
FIG. 2A illustrates a schematic of a system for analyzing the attractiveness of a human face, in accordance with an embodiment of the present invention.
Figure 2B:
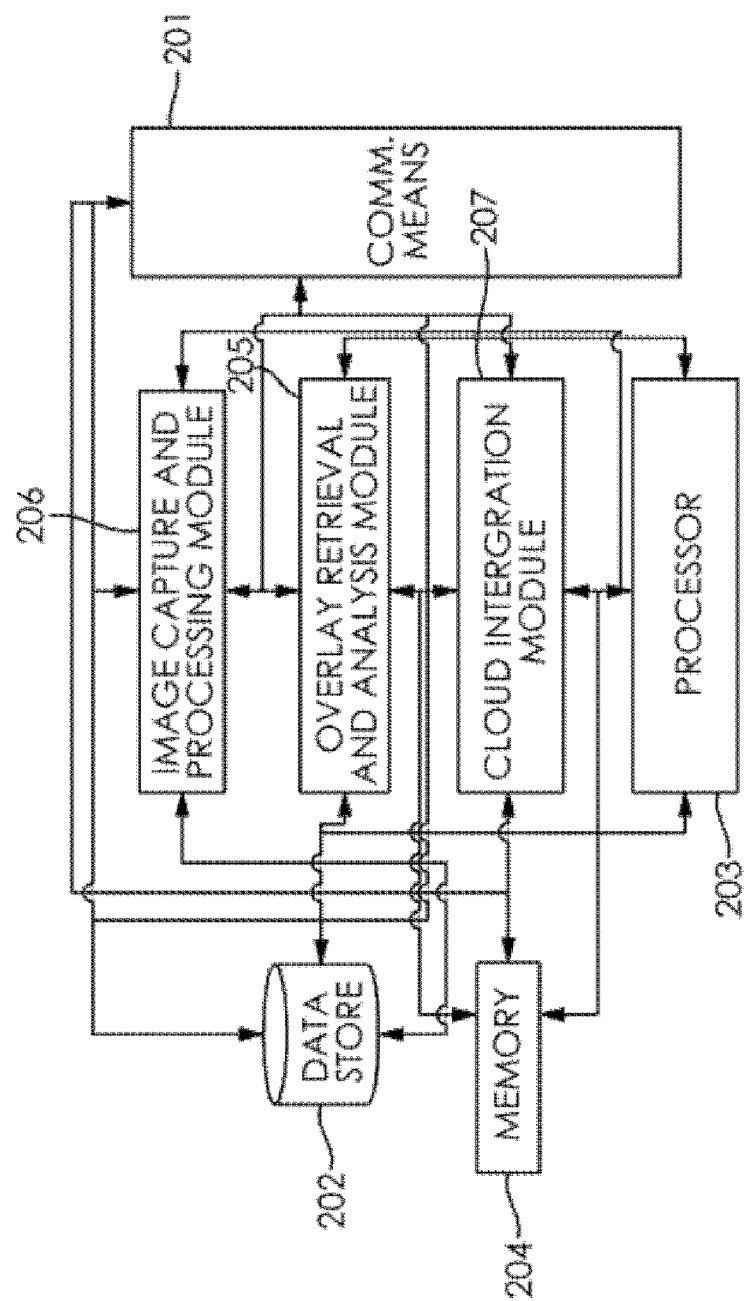
FIG. 2B illustrates a schematic of a system for analyzing the attractiveness of a human face, in accordance with an embodiment of the present invention.

Turning to FIG. 2A, according to an embodiment of the present invention, a system for capturing imagery of a human feature (e.g., a human face and/or a human breast area) for the purpose of analysis, such as through the use of overlays comprising grid lines, directed at analyzing the beauty and attractiveness of the human feature (e.g., a human face and/or human breast area) is comprised of one or more communications means 201, one or more data stores 202, a processor 203, memory 204, an overlay retrieval and analysis module 205 and an image capture and processing module 206. FIG. 2B shows an alternative embodiment of the present invention, comprised of one or more communications means 201, one or more data stores 202, a processor 203, memory 204, an overlay retrieval and analysis module 205 and an image capture and processing module 206 and a cloud integration module 207. The various modules described herein provide functionality to the system, but the features described and functionality provided may be distributed in any number of modules, depending on various implementation strategies. One of ordinary skill in the art would appreciate that the system may be operable with any number of modules, depending on implementation, and embodiments of the present invention are contemplated for use with any such division or combination of modules as required by any particular implementation. In alternate embodiments, the system may have additional or fewer components. One of ordinary skill in the art would appreciate that the system may be operable with a number of optional components, and embodiments of the present invention are contemplated for use with any such optional component.

According to an embodiment of the present invention, the communications means of the system may be, for instance, any means for communicating data, voice or video communications over one or more networks or to one or more peripheral devices attached to the system. Appropriate communications means may include, but are not limited to, wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

According to an embodiment of the present invention, the image capture and processing module is configured to capture an image of a human feature (e.g., a human face and/or breast area), or otherwise receive data representing an image of a human face and/or breast area, and processing of the image for use in the system and methods described herein. The image capture and processing module may comprise one or more of a digital camera, a 3D camera, a video camera, a software module for receiving image data from an image capture source (e.g., digital camera, video camera), a software module configured to process image data into a displayable or otherwise measurable image, a software module for identifying one or more facial features associated with a human feature (e.g., a human face or breast area) in the image or image data, or any combination thereof. In an exemplary embodiment of the present invention, the purpose of the image capture and processing module is to ensure the system has the ability to receive image data and process the image data such that various facial features of a human face and/or features of a human breast area in image data are identifiable.

In an exemplary embodiment of the present invention, with respect to capturing the image data for processing by the image capture and processing module, camera lens focal length may be important to ensure quality and accuracy of raw image data. For instance, for a standard 35 mm film camera, a lens with a focal length of 90-105 mm is recommended for clinical facial photography and for use in analyses contemplated by certain embodiments of the present invention. With regards to digital camera lenses, exemplary embodiments desire a 35 mm equivalent focal length, which is calculated by multiplying the actual focal length of the lens by the crop factor of the specific digital camera sensor being used. The ultimate goal is to create a photographic or video image equivalent to one taken with a 90-105 mm focal length lens on a standard 35 mm film camera. Lenses in this range have a minimal amount of distortion, which creates a flat field and the most accurate depiction of the subject's face. One of ordinary skill in the art would appreciate that there are numerous methods for capturing image data for clinical facial photography and/or videography for use with embodiments of the present invention, and embodiments of the present invention are contemplated for use with any appropriate image capture means.

According to an embodiment of the present invention and as illustrated in FIGS. 3A-Y and FIGS. 4A-D, facial features identifiable by the image capture and processing module may include, but are not limited to, an upper lip vermillion apex plane 301, a separation point of lips 302, a lower lip vermillion apex plane 303, a pupillary horizontal plane 305, an inferior edge of a chin 306, an eyebrow arch 307, a left pupil 308, a right pupil 309, a medial canthus 310, a contralateral medial canthus 311, a canthal plane 312, a nasal base plane 313, a supratip breakpoint of nose 314, nostril opening 316, a lower eyelid margin 317, an upper eyelid margin 318, an eyebrow arch 319, an outer edge of temporal process of zygoma 320, a contralateral temporal process of zygoma 321, a facial midline 322, a contralateral lateral canthus 323, a medial ipsilateral iris edge 324, an ipsilateral medial canthus 325, a right oral commissure 326, a right cupid's bow 327, a left cupid's bow 328, a left oral commissure 329, an ipsilateral lateral canthus 330, a lateral ipsilateral iris edge 331, a lateral canthus 332, a nasal radix 333, a nasal tip edge 334, an upper lip philtral dimple 336, an anterior edge of eyeball globe 337, a nose supratip break point 338, a horizontal line just above the nostrils 342, and an inner margin of nostrils 346. One of ordinary skill in the art would appreciate that there are numerous facial features that could be identified by the image capture and processing module from image data received/captured, and embodiments of the present invention are contemplated for use with the identification of any such facial features.

According to an embodiment of the present invention, the overlay retrieval and analysis module is configured to retrieve one or more overlays to be used with the image data received and processed by the image capture and processing module to perform analysis of the facial features identified thereby in order to provide a measurement of beauty and/or attractiveness. Measurement and analysis methodology is described later herein. In exemplary embodiments of the present invention, the overlay retrieval and analysis module may be configured to retrieve one or more overlays from a local or remote datastore (e.g., database, file repository, cloud service) for use in analysis of the facial features identified in the image data. Analysis of the overlays and identified facial features is also generally handled by the overlay retrieval and analysis module. One of ordinary skill in the art would appreciate that the functional modeling of these components as separate is merely one embodiment, and embodiments of the present invention could combine or further separate and individualize each module or component as may be required for various implementations, and embodiments of the present invention are contemplated for use with any such implementation. For example, the present invention may also be used in conjunction with a human breast area as described below.

The cloud integration module is an optional module that is present in certain embodiments and configured to receive and augment functionality provided by local devices. For instance, the cloud integration module may provide the system access to remote computing platforms for the provision of additional overlays or for retrieval of additional image data associated with the individual being analyzed. The cloud integration module may also provide the system the ability to share, access and host analysis data, image data, overlay data or other data for consumption by the public or a controlled group of individuals (e.g., a select group of doctors, friends of the individual, healthcare professionals, family members). The cloud integration module may further work in conjunction with the communications means to receive and transmit such data to remote sources, such as via application programming interfaces (APIs) or other communications methodologies (e.g., TCP/IP connections/tunnels). One of ordinary skill in the art would appreciate that there are numerous methods and ways for the cloud integration module to interact with remote systems for the provision and receipt of data, and embodiments of the present invention are contemplated for use with any appropriate means for doing so.

According to an exemplary embodiment of the present invention, the system is configured to process image data, whether captured by the system or provided to it via an external source, in such a manner as to identify specific facial features of an individual depicted in the image data. In the exemplary embodiment, once the facial features are identified, the system is further configured to use specific overlays detailed herein, known as facial grids, in order to analyze proportions (e.g., areas) between the specific facial features to identify a measurement of beauty or attractiveness based on these analyzed proportions. In other embodiments, additional or alternative overlays may be used in order to analyze the identified facial features. The measurement of beauty or attractiveness is generally based on a plurality of facial feature anatomical anchor points in a specific overlay and the resultant presence or absence of a golden ratio relationship in the quadrilaterals created using those specific anchor points.

According to an exemplary embodiment of the present invention, horizontal and vertical grid line anchor points based on specifically defined human facial anatomical points dictate the precise placement (location) of the given grid lines on a human face. In order for any given Facial Grid to be considered a successful fit, the grid lines may first be placed on the specified anatomic anchor points for that particular Facial Grid. The resulting grid lines will create multiple quadrilaterals. The next step is to analyze the relationship between the created quadrilaterals. For a "successful fit" in any given Facial Grid, a predetermined ratio (e.g., the ratio of 1:1.618) exists between the created quadrilaterals within the grid itself as specified in the figures provided (FIGS. 3A-Y, FIGS. 4A-D). If this golden ratio relationship does not exist between the quadrilaterals created based on the anatomical anchor points for any given human face, then that particular Facial Grid is considered an unsuccessful or "failed fit". After analysis of a human face with multiple Facial Grids, the more "successful fit" grids a face possesses, the more golden ratio (1:1.618) relationships exists within the features of that particular human face. An attractive or beautiful face will have many "successful fits". This system and method can be used to gauge beauty and harmony within a given human face.

As noted above in the brief description of the drawings, FIGS. 3A-3Y and 4A-4D show 29 Facial Grids. Facial Grids 1, 4, 5, 6, 7, 8, 9, 10, 11, 15, 22, 23, 25 and 28 include vertically arranged quadrilaterals. Facial Grids 12, 16, 17, 18, 19, 20, 21, 24, 26 and 29 include horizontally arranged quadrilaterals. Facial Grids 2, 3, 13, 14 and 27 are combination grids including both horizontally arranged as well as vertically arranged quadrilaterals within the same grid.

Turning now to FIGS. 3A-3Y and FIGS. 4A-4D, depictions of the facial grids can be found. A description of each facial grid is detailed below. In exemplary embodiments of the present invention, the facial grids are comprised of a plurality of anchor points corresponding to facial features that are to be identified in the image data. The anchor points are configured such that when aligned with the facial features, two or more quadrilaterals are formed and these quadrilaterals may be compared in proportion to one another, preferably with respect to the golden ratio, in order to identify beauty or attractiveness, particularly with respect to the particular facial features utilized with the anchor points. In exemplary embodiments, a grid forms two or more pairs of quadrilaterals. Each pair of quadrilaterals comprises a first quadrilateral, representing the smaller portion of the golden ratio (e.g., 1.0) and a second quadrilateral, representing the larger portion of the golden ratio (e.g., 1.618). In each of the following facial grid descriptions, when reference is made to a first quadrilateral, this reference is to a quadrilateral forming the smaller portion of the golden ratio (e.g., 1.0), and when reference is made to a second quadrilateral, this reference is to a quadrilateral forming the larger portion of the golden ratio (e.g., 1.618).

Figure 3A:
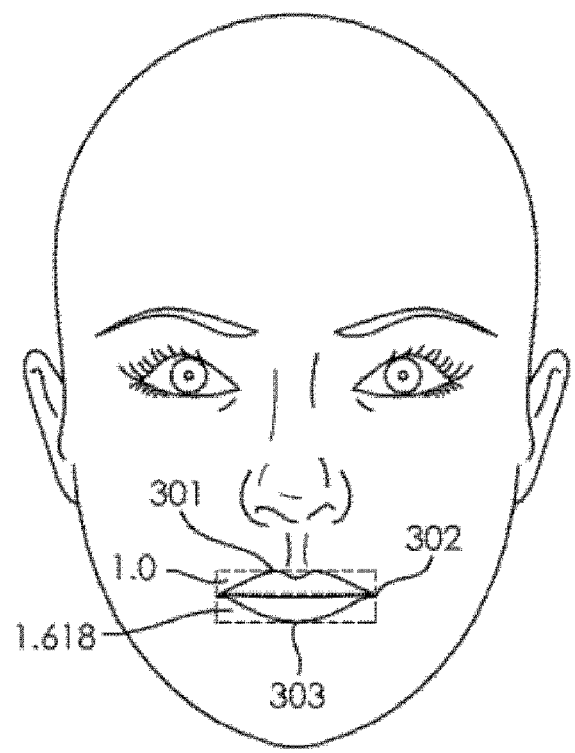
FIG. 3A illustrates an exemplary portrayal of a facial grid 1, shown overlaid on representations of a human face situated in a frontal position, in accordance with an embodiment of the present invention.

Turning to FIG. 3A, facial grid 1 is depicted, with three anchor points that determine (e.g., dictate) a suitable location for the horizontal grid lines of this particular grid. A first anchor point being an upper lip vermillion apex plane, a second anchor point being a separation point of the lips and a third anchor point being a lower lip vermillion apex plane. In this overlay, a first quadrilateral (e.g., smaller portion of the golden ratio—1.0) is formed between the upper lip vermillion apex plane and the separation point of the lips and a second quadrilateral (e.g., larger portion of the golden ratio—1.618) is formed between the separation point of the lips and the lower lip vermillion apex plane.

Figure 3B:
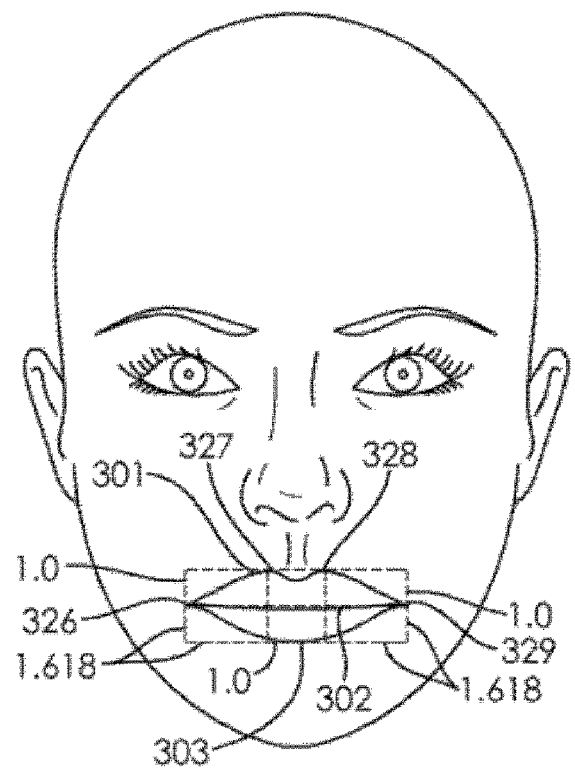
FIG. 3B illustrates an exemplary portrayal of a facial grid 2, shown overlaid on representations of a human face situated in a frontal position, in accordance with an embodiment of the present invention.

Turning to FIG. 3B, facial grid 2 is a combination grid with both horizontal and vertical gridlines. Three anchor points dictate a suitable location of the horizontal grid lines of this particular grid, with a first anchor point being a upper lip vermillion apex plane, a second anchor point being a separation point of lips and a third anchor point being a lower lip vermillion apex plane. These three anchor points form two vertically arranged quadrilaterals, with a first quadrilateral formed between the upper lip vermillion apex plane and the separation point of lips and a second quadrilateral formed between the separation point of lips and the lower lip vermillion apex plane. Four anchor points dictate a suitable location for the four vertical grid lines of this grid, with a first anchor point being a right oral commissure, a second anchor point being a right cupids bow, a third anchor point being a left cupids bow and a fourth anchor point being a left oral commissure. These four anchor points form three horizontally arranged quadrilaterals, which form two pairs of horizontally arranged quadrilaterals that are related by the Golden Ratio (1.618:1.0) as labeled in FIG. 3B. A first pair of horizontally arranged quadrilaterals is formed with a first quadrilateral formed between the right cupid's bow and left cupid's bow and a second quadrilateral formed between the right cupids bow and right oral commissure. A second pair of horizontally arranged quadrilaterals is formed with a first quadrilateral formed between the right cupid's bow and left cupid's bow and a second quadrilateral formed between the left cupid's bow and left oral commissure.

Figure 3C:
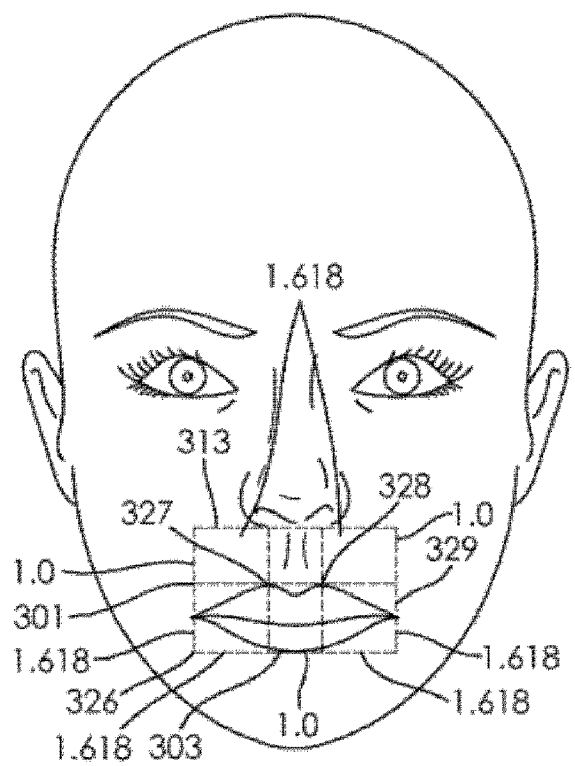
FIG. 3C illustrates an exemplary portrayal of a facial grid 3, shown overlaid on representations of a human face situated in a frontal position, in accordance with an embodiment of the present invention.

Turning to FIG. 3C, facial grid 3 is a combination grid with both horizontal and vertical gridlines. Three anchor points dictate a suitable location of the horizontal grid lines of this particular grid, with a first anchor point being a nasal base plane, a second anchor point being an upper lip vermillion apex plane and a third anchor point being a lower lip vermillion apex plane. These three anchor points form two vertically arranged quadrilaterals, with a first quadrilateral formed between the nasal base plane and the upper lip vermillion apex plane and a second quadrilateral formed between the upper lip vermillion apex plane and lower lip vermillion apex plane. Four anchor points dictate a suitable location for the four vertical grid lines of this grid, with, a first anchor point being a right cupid's bow peak, a second anchor point being a left cupid's bow peak and a third anchor point being a left oral commissure and a fourth anchor point being a right oral commissure. These four anchor points form three horizontally arranged quadrilaterals, which form two pairs of horizontally arranged quadrilaterals that are related by the Golden Ratio (1.618:1.0) as labeled in FIG. 3C. A first pair of horizontally arranged quadrilaterals is formed with a first quadrilateral formed between the right cupids bow peak and left cupids bow peak and a second quadrilateral formed between the right cupids bow and right oral commissure. A second pair of horizontally arranged quadrilaterals is formed with a first quadrilateral formed between the right cupids bow peak and left cupids bow peak and a second quadrilateral formed between the left cupids bow peak and left oral commissure.

Figure 3D:
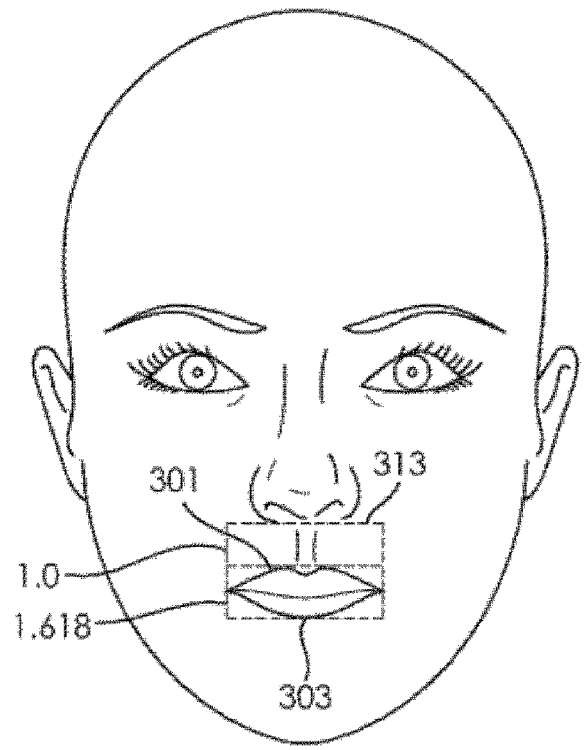
FIG. 3D illustrates an exemplary portrayal of a facial grid 4, shown overlaid on representations of a human face situated in a frontal position, in accordance with an embodiment of the present invention.

Turning to FIG. 3D, facial grid 4 is depicted, with three anchor points that dictate a suitable location for the horizontal grid lines of this particular grid. A first anchor point being a nasal base plane, a second anchor point being an upper lip vermillion apex plane and a third anchor point being a lower lip vermillion apex plane. In this overlay, a first quadrilateral (e.g., smaller portion of the golden ratio—1.0) is formed between the nasal base plane and the upper lip vermillion apex plane and a second quadrilateral (e.g., larger portion of the golden ratio—1.618) is formed between the upper lip vermillion apex plane and the lower lip vermillion apex plane.

Figure 3E:
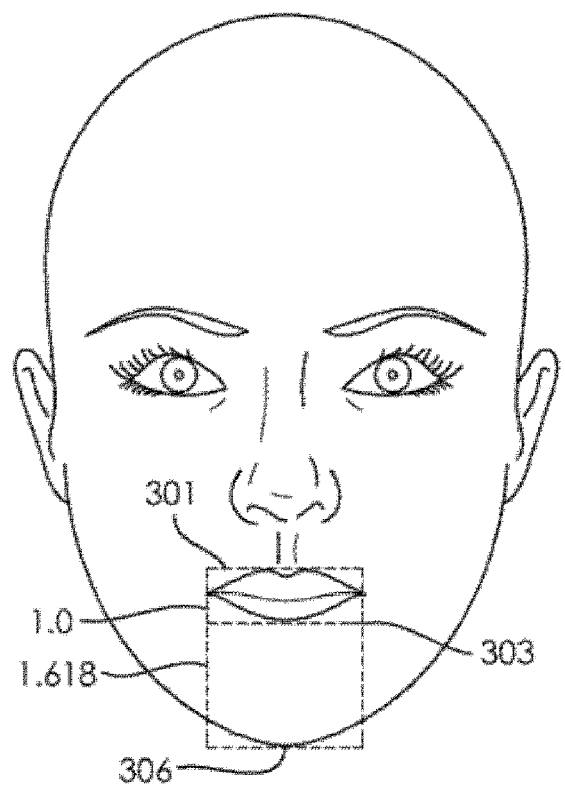
FIG. 3E illustrates an exemplary portrayal of a facial grid 5, shown overlaid on representations of a human face situated in a frontal position, in accordance with an embodiment of the present invention.

Turning to FIG. 3E, facial grid 5 is depicted, with three anchor points that dictate a suitable location for the horizontal grid lines of this particular grid. A first anchor point being an upper lip vermillion apex plane, a second anchor point being a lower lip vermillion apex plane and a third anchor point being an inferior edge of chin. In this overlay, a first quadrilateral (e.g., smaller portion of the golden ratio—1.0) is formed between the upper lip vermillion apex plane and the lower lip vermillion apex plane and a second quadrilateral (e.g., larger portion of the golden ratio—1.618) is formed between the lower lip vermillion apex plane and the inferior edge of chin.

Figure 3F:
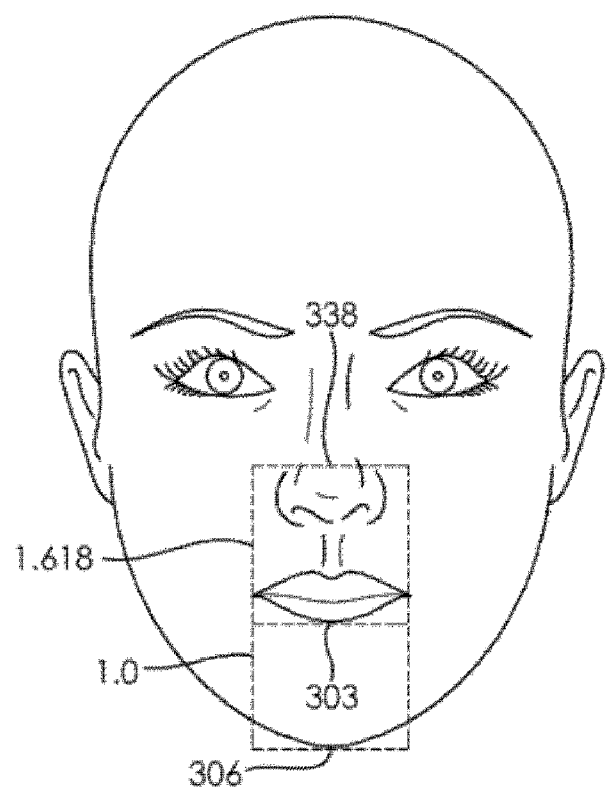
FIG. 3F illustrates an exemplary portrayal of a facial grid 6, shown overlaid on representations of a human face situated in a frontal position, in accordance with an embodiment of the present invention.

Turning to FIG. 3F, facial grid 6 is depicted, with three anchor points that dictate a suitable location for the horizontal grid lines of this particular grid. A first anchor point being a nose supratip break point, a second anchor point being a lower lip vermillion apex plane and a third anchor point being an inferior edge of chin. In this overlay, a first quadrilateral (e.g., smaller portion of the golden ratio—1.0) is formed between the lower lip vermillion apex plane and the inferior edge of chin and a second quadrilateral (e.g., larger portion of the golden ratio—1.618) is formed between the lower lip vermillion apex plane and the nose supratip break point.

Figure 3G:
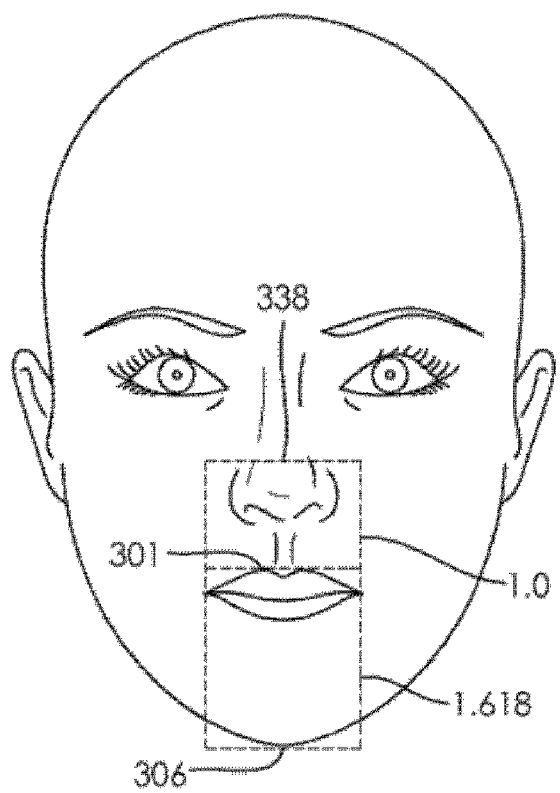
FIG. 3G illustrates an exemplary portrayal of a facial grid 7, shown overlaid on representations of a human face situated in a frontal position, in accordance with an embodiment of the present invention.

Turning to FIG. 3G, facial grid 7 is depicted, with three anchor points that dictate a suitable location for the horizontal grid lines of this particular grid. A first anchor point being a nose supratip break point, a second anchor point being an upper lip vermillion apex plane and a third anchor point being an inferior edge of chin. In this overlay, a first quadrilateral (e.g., smaller portion of the golden ratio—1.0) is formed between the upper lip vermillion apex plane and the nose supratip break point and a second quadrilateral (e.g., larger portion of the golden ratio—1.618) is formed between the upper lip vermillion apex plane and the inferior edge of chin.

Figure 3H:
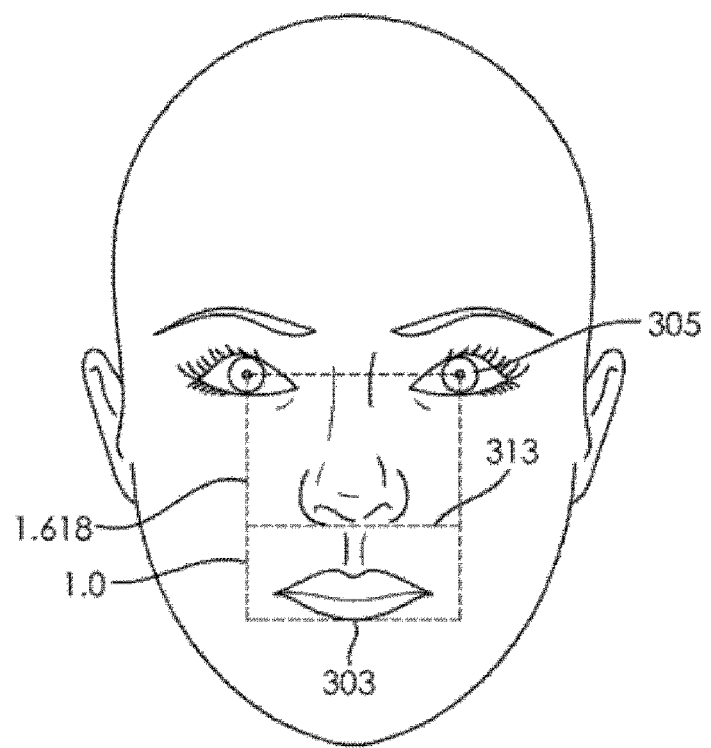
FIG. 3H illustrates an exemplary portrayal of a facial grid 8, shown overlaid on representations of a human face situated in a frontal position, in accordance with an embodiment of the present invention.

Turning to FIG. 3H, facial grid 8 is depicted, with three anchor points that dictate a suitable location for the horizontal grid lines of this particular grid. A first anchor point being a pupillary horizontal plane, a second anchor point being a nasal base plane and a third anchor point being a lower vermillion border. In this overlay, a first quadrilateral (e.g., smaller portion of the golden ratio—1.0) is formed between the nasal base plane and the lower vermillion border and a second quadrilateral (e.g., larger portion of the golden ratio—1.618) is formed between the nasal base plane and the pupillary horizontal plane.

Figure 3I:
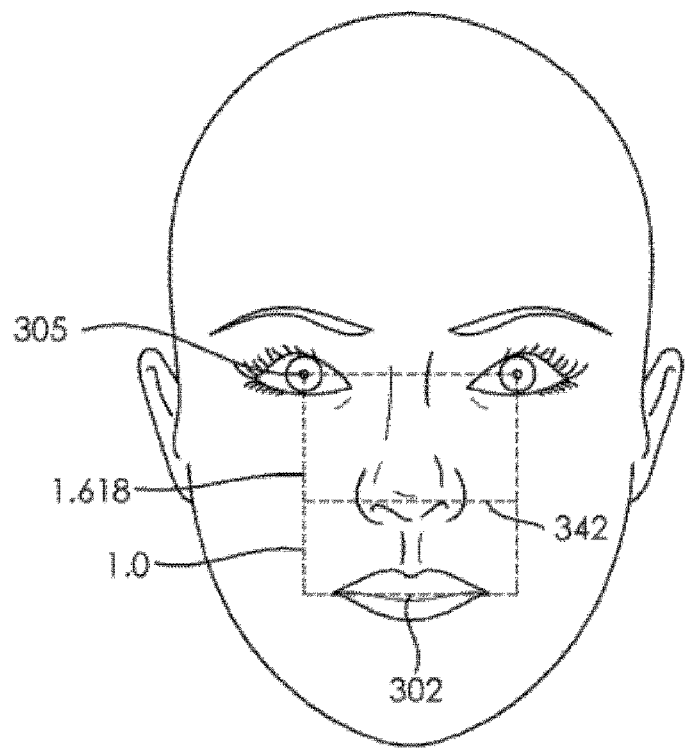
FIG. 3I illustrates an exemplary portrayal of a facial grid 9, shown overlaid on representations of a human face situated in a frontal position, in accordance with an embodiment of the present invention.

Turning to FIG. 3I, facial grid 9 is depicted, with three anchor points that dictate a suitable location for the horizontal grid lines of this particular grid. A first anchor point being a pupillary horizontal plane, a second anchor point being a horizontal line just above the nostril openings and a third anchor point being a separation point of lips. In this overlay, a first quadrilateral (e.g., smaller portion of the golden ratio—1.0) is formed between the separation point of lips and the horizontal line just above the nostril openings and a second quadrilateral (e.g., larger portion of the golden ratio—1.618) is formed between the horizontal line just above the nostril openings and the pupillary horizontal plane.

Figure 3J:
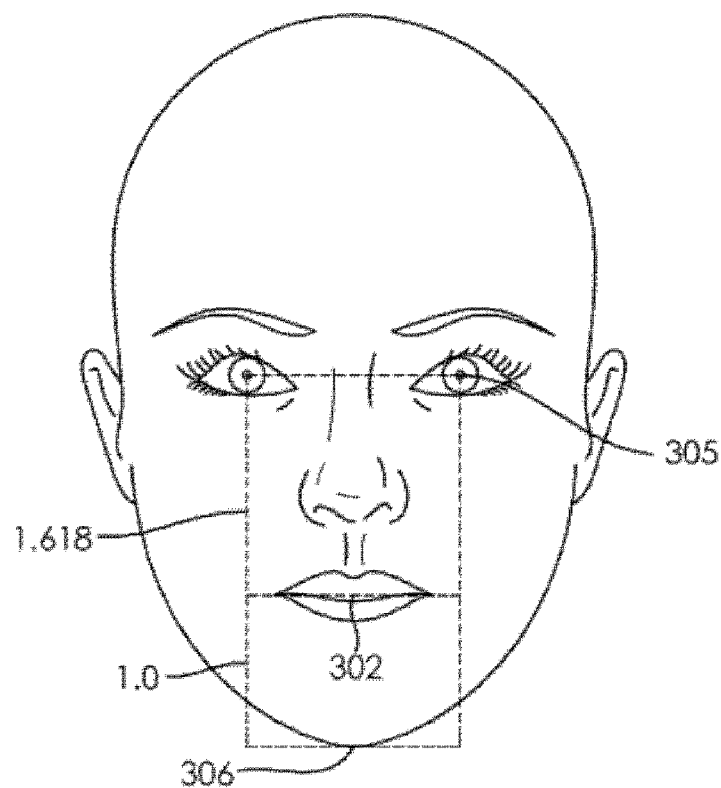
FIG. 3J illustrates an exemplary portrayal of a facial grid 10, shown overlaid on representations of a human face situated in a frontal position, in accordance with an embodiment of the present invention.

Turning to FIG. 3J, facial grid 10 is depicted, with three anchor points that dictate a suitable location for the horizontal grid lines of this particular grid. A first anchor point being a pupillary horizontal plane, a second anchor point being a separation point of the lips and a third anchor point being an inferior edge of chin. In this overlay, a first quadrilateral (e.g., smaller portion of the golden ratio—1.0) is formed between the separation point of the lips and the inferior edge of chin and a second quadrilateral (e.g., larger portion of the golden ratio—1.618) is formed between the separation point of the lips and the pupillary horizontal plane.

Figure 3K:
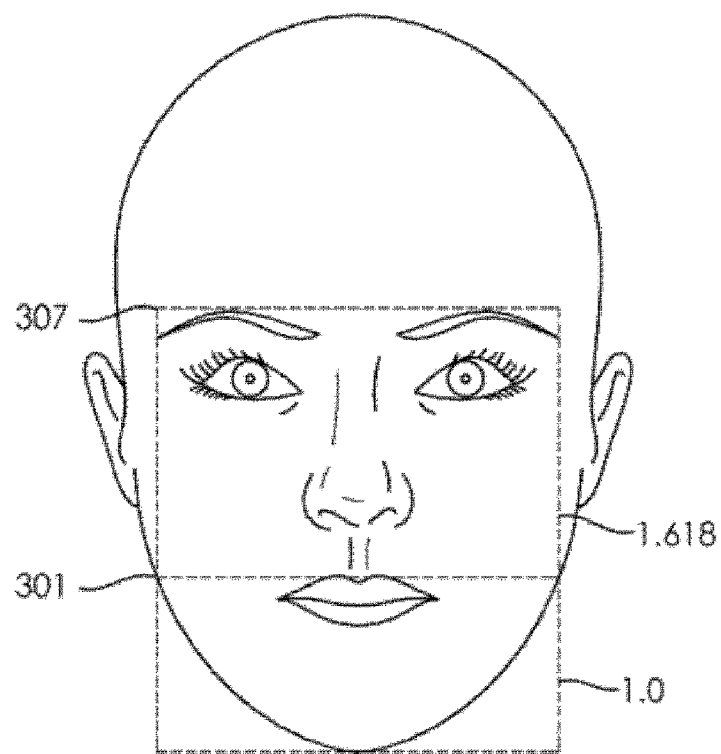
FIG. 3K illustrates an exemplary portrayal of a facial grid 11, shown overlaid on representations of a human face situated in a frontal position, in accordance with an embodiment of the present invention.

Turning to FIG. 3K, facial grid 11 is depicted, with three anchor points that dictate a suitable location for the horizontal grid lines of this particular grid. A first anchor point being a peak of the eyebrow arch, a second anchor point being an upper lip vermillion apex plane and a third anchor point being an inferior chin edge. In this overlay, a first quadrilateral (e.g., smaller portion of the golden ratio—1.0) is formed between the upper lip vermillion apex plane and the inferior chin edge and a second quadrilateral (e.g., larger portion of the golden ratio—1.618) is formed between the upper lip vermillion apex plane and the a peak of the eyebrow arch.

Figure 3L:
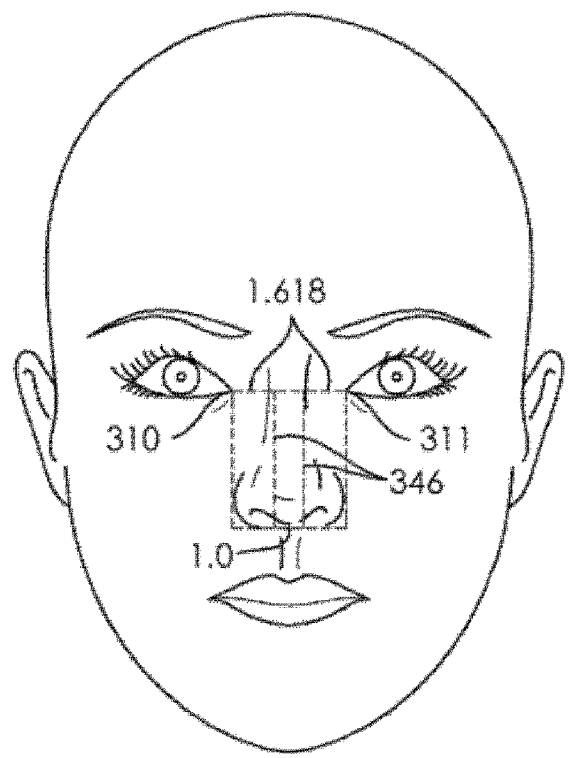
FIG. 3L illustrates an exemplary portrayal of a facial grid 12, shown overlaid on representations of a human face situated in a frontal position, in accordance with an embodiment of the present invention.

Turning to FIG. 3L, facial grid 12 is depicted, with three anchor points that dictate a suitable location for the vertical grid lines of this particular grid. A first anchor point being a medial canthus, a second anchor point being a contralateral medial canthus and a third anchor point being an inner margin of nostril openings. This overlay utilizes an additional relationship, wherein an outer vertical edge of the grid creates a relationship of medial canthi and total width of the base of the nose. In this overlay, a first quadrilateral (e.g., smaller portion of the golden ratio—1.0) is formed between the two inner margins of the nostrils and a second quadrilateral (e.g., larger portion of the golden ratio—1.618) is formed between the medial canthus and one inner margin of the nostrils on each side of the first quadrilateral.

Figure 3M:
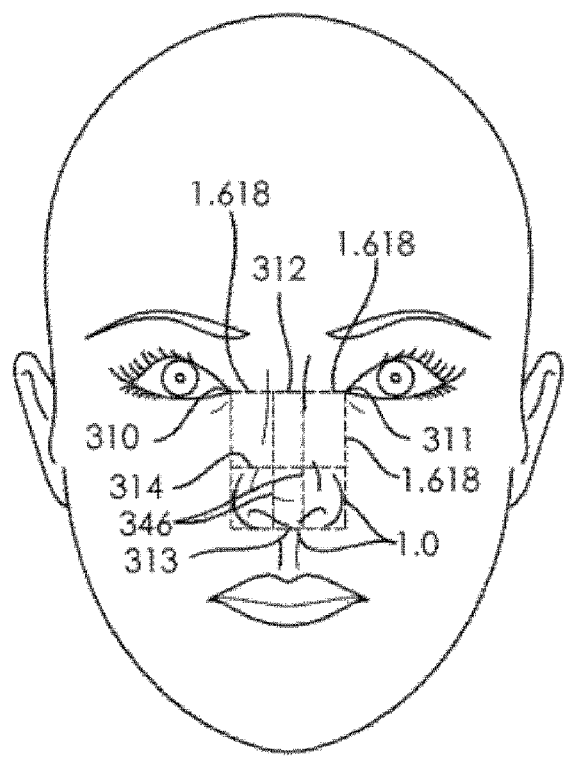
FIG. 3M illustrates an exemplary portrayal of a facial grid 13, shown overlaid on representations of a human face situated in a frontal position, in accordance with an embodiment of the present invention.

Turning to FIG. 3M, facial grid 13 is a combination grid with both horizontal and vertical gridlines. Three anchor points dictate a suitable location of the horizontal grid lines of this particular grid, with a first anchor point being a canthal plane, a second anchor point being a supratip breakpoint of the nose and the third anchor point being a nasal base plane. These three anchor points form two vertically arranged quadrilaterals, with a first quadrilateral formed between the nasal base plane and the surpatip breakpoint of the nose and a second quadrilateral formed between the surpatip of the nose and the canthal plane. Four anchor points dictate a suitable location for the four vertical grid lines of this grid, with, a first anchor point being a medial canthus, a second anchor point being a contralateral medial canthus, a third anchor point being an inner margin of a left nostril opening and a fourth anchor point being an inner margin of a right nostril opening. These four anchor points form three horizontally arranged quadrilaterals, which form two pairs of horizontally arranged quadrilaterals that are related by the Golden Ratio (1.618:1.0) as labeled in FIG. 3M. A first pair of horizontally arranged quadrilaterals is formed with a first quadrilateral formed between the inner margins of the left and right nostril openings and a second quadrilateral formed between the inner margin of the left nostril opening and the left medial canthus. A second pair of horizontally arranged quadrilaterals is formed with a first quadrilateral formed between the inner margins of the left and right nostrils and a second quadrilateral formed between the inner margin of the right nostril and the right medial canthus.

Figure 3N:
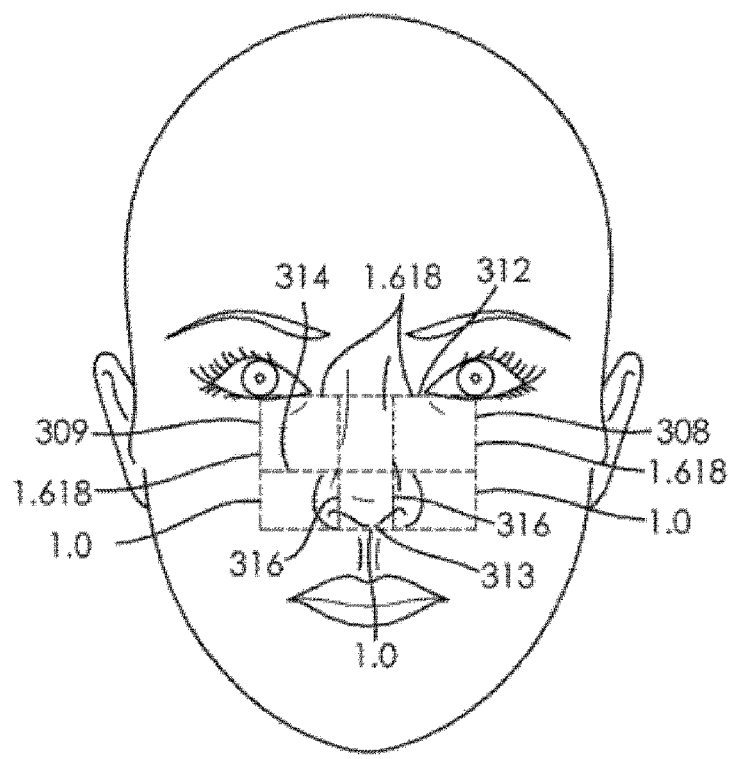
FIG. 3N illustrates an exemplary portrayal of a facial grid 14, shown overlaid on representations of a human face situated in a frontal position, in accordance with an embodiment of the present invention.

Turning to FIG. 3N, facial grid 14 is a combination grid with both horizontal and vertical gridlines. Three anchor points dictate a suitable location of the horizontal grid lines of this particular grid, with a first horizontal anchor point being a medial canthal plane, a second horizontal anchor point being a supratip breakpoint of nose and a third horizontal anchor point being a nasal base plane. These three anchor points form two vertically arranged quadrilaterals, with a first quadrilateral formed between the nasal base plane and the supratip breakpoint of the nose and a second quadrilateral formed between the surpatip of the nose and the medial canthal plane. Four anchor points dictate a suitable location for the four vertical grid lines of this grid, with, a first vertical anchor point being a center of a left pupil, a second vertical anchor point being a left nostril opening, a third vertical anchor point being a right nostril opening and a fourth vertical anchor point being a center of a right pupil. These four anchor points form three horizontally arranged quadrilaterals, which form two pairs of horizontally arranged quadrilaterals that are related by the Golden Ratio (1.618:1.0) as labeled in FIG. 3N. A first pair of horizontally arranged quadrilaterals is formed with a first quadrilateral formed between the left and right nostril openings and a second quadrilateral formed between the left nostril opening and the center of the left pupil. A second pair of horizontally arranged quadrilaterals is formed with a first quadrilateral formed between the left and right nostril openings and a second quadrilateral formed between the right nostril opening and the center of the right pupil.

Figure 3O:
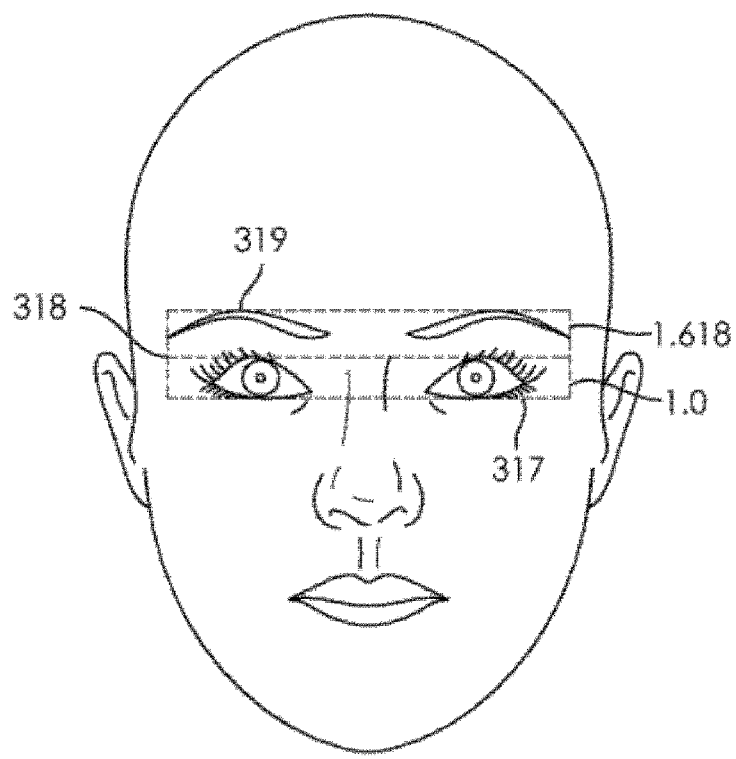
FIG. 3O illustrates an exemplary portrayal of a facial grid 15, shown overlaid on representations of a human face situated in a frontal position, in accordance with an embodiment of the present invention.

Turning to FIG. 3O, facial grid 15 is depicted, with three anchor points that dictate a suitable location for the horizontal grid lines of this particular grid. A first anchor point being a lower eyelid margin, a second anchor point being an upper eyelid margin and a third anchor point being an eyebrow arch peak. In this overlay, a first quadrilateral (e.g., smaller portion of the golden ratio—1.0) is formed between the lower eyelid margin and the upper eyelid margin and a second quadrilateral (e.g., larger portion of the golden ratio—1.618) is formed between the upper eyelid margin and the eyebrow arch peak.

Figure 3P:
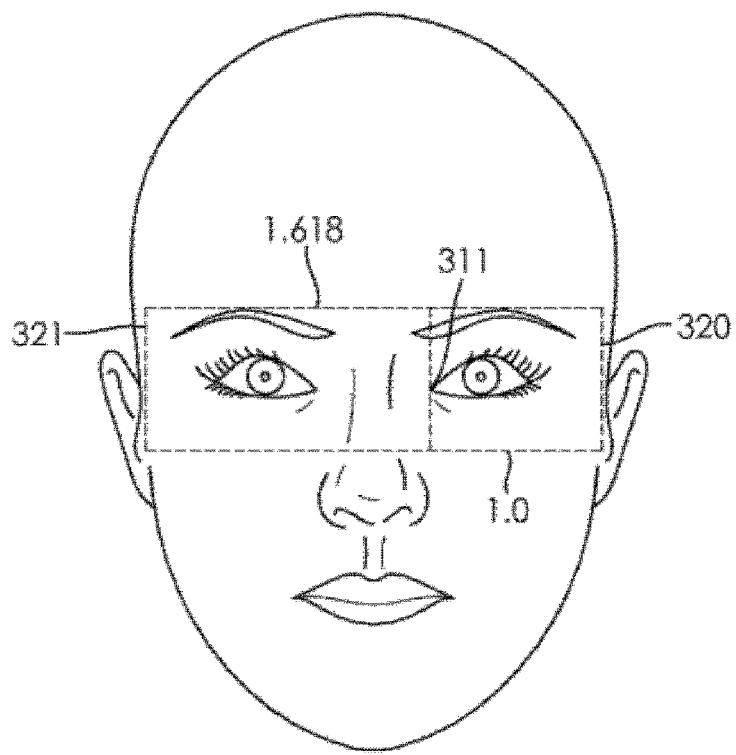
FIG. 3P illustrates an exemplary portrayal of a facial grid 16, shown overlaid on representations of a human face situated in a frontal position, in accordance with an embodiment of the present invention.

Turning to FIG. 3P, facial grid 16 is depicted, with three anchor points that dictate a suitable location for the vertical grid lines of this particular grid. A first anchor point being a temporal process of zygoma, a second anchor point being a contralateral medial canthus and a third anchor point being a contralateral temporal process of zygoma. In this overlay, a first quadrilateral (e.g., smaller portion of the golden ratio—1.0) is formed between the temporal process of zygoma and the ipsilateral medial cantus and a second quadrilateral (e.g., larger portion of the golden ratio—1.618) is formed between the same canthus and the contralateral temporal process of zygoma.

Figure 3Q:
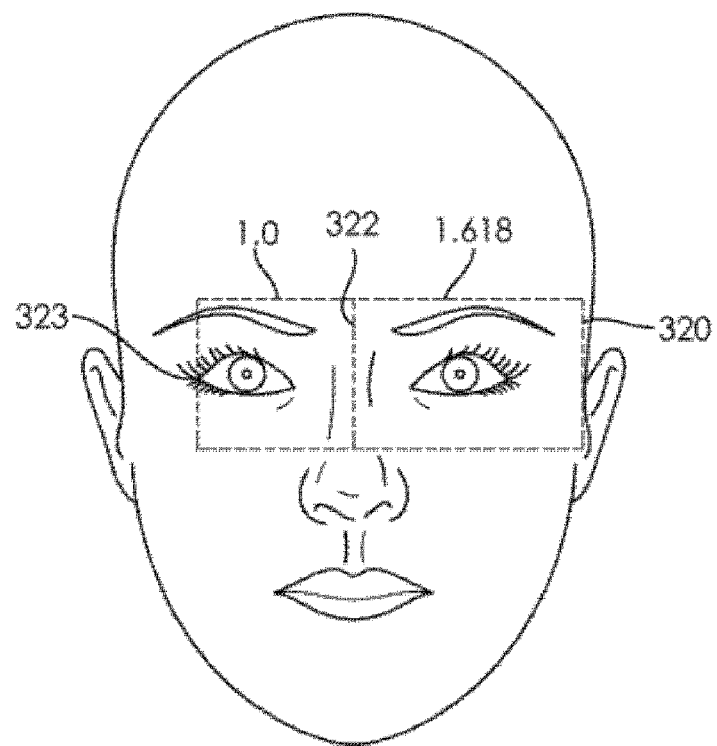
FIG. 3Q illustrates an exemplary portrayal of a facial grid 17, shown overlaid on representations of a human face situated in a frontal position, in accordance with an embodiment of the present invention.

Turning to FIG. 3Q, facial grid 17 is depicted, with three anchor points that dictate a suitable location for the vertical grid lines of this particular grid. A first anchor point being a temporal process of zygoma, a second anchor point being a facial midline and a third anchor point being a contralateral lateral canthus as related to the temporal process of zygoma. In FIG. 3Q, a first quadrilateral (e.g., smaller portion of the golden ratio—1.0) is formed between the right lateral canthus and the facial midline and a second quadrilateral (e.g., larger portion of the golden ratio—1.618) is formed between the facial midline and the left temporal process of zygoma.

Figure 3R:
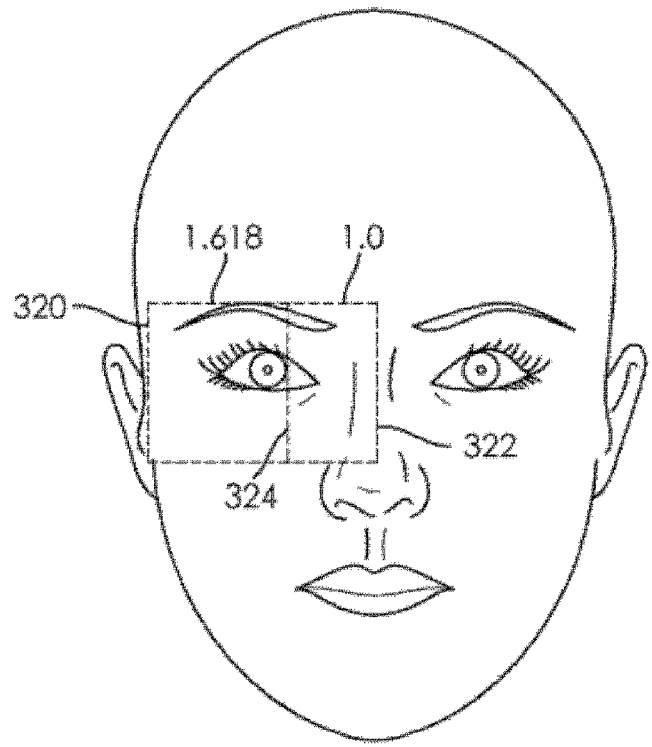
FIG. 3R illustrates an exemplary portrayal of a facial grid 18, shown overlaid on representations of a human face situated in a frontal position, in accordance with an embodiment of the present invention.

Turning to FIG. 3R, facial grid 18 is depicted, with three anchor points that dictate a suitable location for the vertical grid lines of this particular grid. A first anchor point being a temporal process of zygoma, a second anchor point being a medial ipsilateral iris edge and a third anchor point being a facial midline. In FIG. 3R, a first quadrilateral (e.g., smaller portion of the golden ratio—1.0) is formed between the facial midline and the right medial ipsilateral iris edge and a second quadrilateral (e.g., larger portion of the golden ratio—1.618) is formed between the right medial ipsilateral iris edge and the right temporal process of zygoma.

Figure 3S:
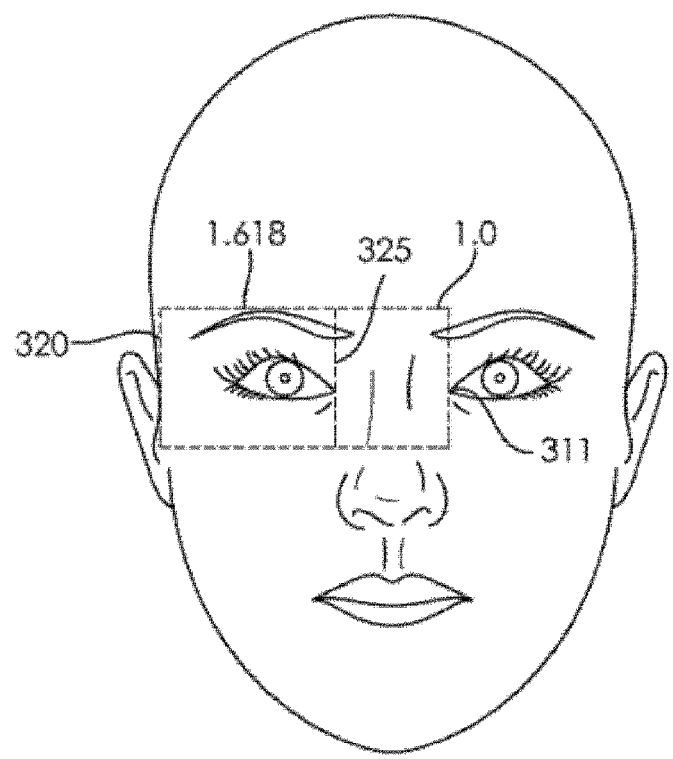
FIG. 3S illustrates an exemplary portrayal of a facial grid 19, shown overlaid on representations of a human face situated in a frontal position, in accordance with an embodiment of the present invention.

Turning to FIG. 3S, facial grid 19 is depicted, with three anchor points that dictate a suitable location for the vertical grid lines of this particular grid. A first anchor point being a temporal process of zygoma, a second anchor point being an ipsilateral medial canthus and a third anchor point being a contralateral medial canthus. In this FIG. 3S, a first quadrilateral (e.g., smaller portion of the golden ratio—1.0) is formed between the right medial canthus and the left medial canthus and a second quadrilateral (e.g., larger portion of the golden ratio—1.618) is formed between the right medial canthus and the right temporal process of zygoma.

Figure 3T:
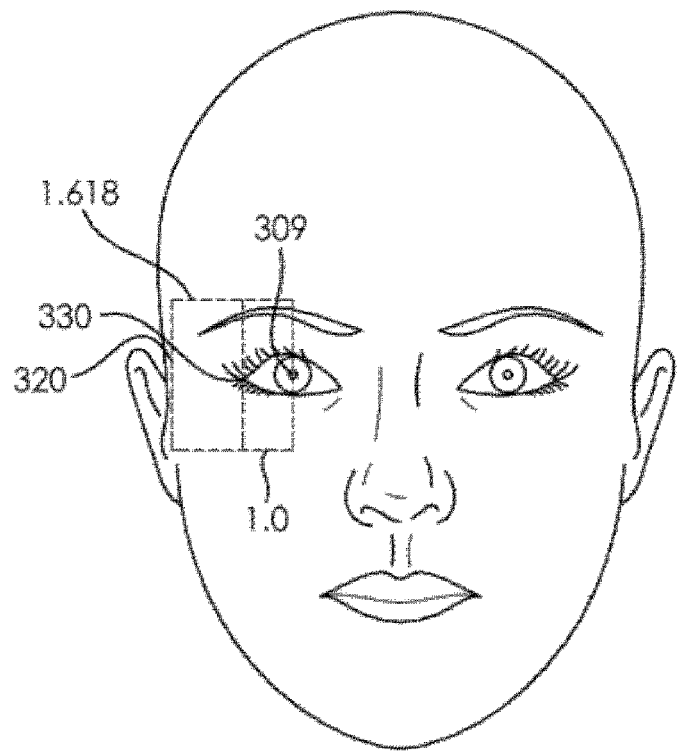
FIG. 3T illustrates an exemplary portrayal of a facial grid 20, shown overlaid on representations of a human face situated in a frontal position, in accordance with an embodiment of the present invention.

Turning to FIG. 3T, facial grid 20 is depicted, with three anchor points that dictate a suitable location for the vertical grid lines of this particular grid. A first anchor point being a temporal process of zygoma, a second anchor point being an ipsilateral lateral canthus and a third anchor point being an ipsilateral pupil. In this FIG. 3T, a first quadrilateral (e.g., smaller portion of the golden ratio—1.0) is formed between the pupil and the right lateral canthus and a second quadrilateral (e.g., larger portion of the golden ratio—1.618) is formed between the right lateral canthus and the right temporal process of zygoma.

Figure 3U:
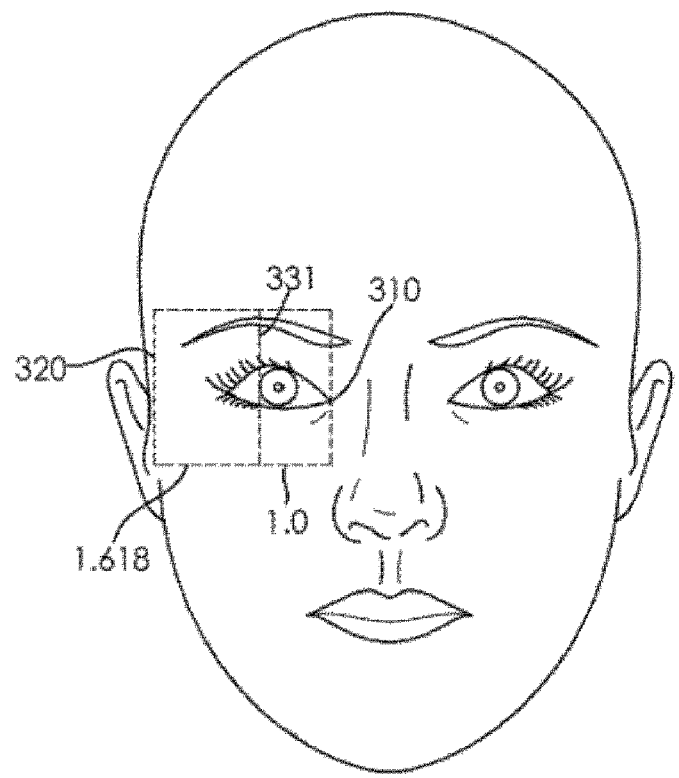
FIG. 3U illustrates an exemplary portrayal of a facial grid 21, shown overlaid on representations of a human face situated in a frontal position, in accordance with an embodiment of the present invention.

Turning to FIG. 3U, facial grid 21 is depicted, with three anchor points that dictate a suitable location for the vertical grid lines of this particular grid. A first anchor point being a temporal process of zygoma, a second anchor point being a lateral ipsilateral iris edge and a third anchor point being a ipsilateral medial canthus. In this FIG. 3U, a first quadrilateral (e.g., smaller portion of the golden ratio—1.0) is formed between the right medial canthus and the right lateral ipsilateral iris edge and a second quadrilateral (e.g., larger portion of the golden ratio—1.618) is formed between the right lateral iris edge and right temporal process of zygoma.

Figure 3V:
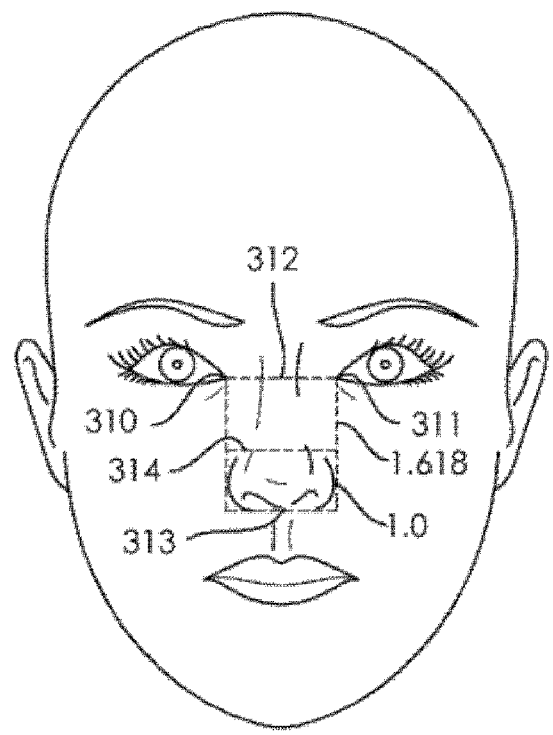
FIG. 3V illustrates an exemplary portrayal of a facial grid 22, shown overlaid on representations of a human face situated in a frontal position, in accordance with an embodiment of the present invention.

Turning to FIG. 3V, facial grid 22 is depicted, with three anchor points that dictate a suitable location of the horizontal grid lines of this particular grid, with a first horizontal anchor point being a medial canthal plane, a second horizontal anchor point being a supratip breakpoint of nose and a third horizontal anchor point being a nasal base plane. These three anchor points form two vertically arranged quadrilaterals, with a first quadrilateral formed between the nasal base plane and the supratip breakpoint of the nose and a second quadrilateral formed between the surpatip of the nose and the medial canthal plane.

Figure 3W:
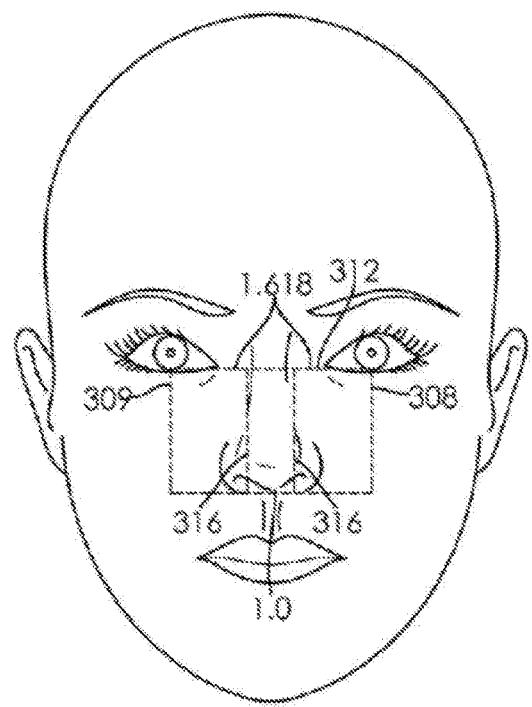
FIG. 3W illustrates an exemplary portrayal of a facial grid 23, shown overlaid on representations of a human face situated in a frontal position, in accordance with an embodiment of the present invention.

Turning to FIG. 3W, facial grid 23 is depicted, with four anchor points that dictate a suitable location of the horizontal grid lines of this particular grid, with a first vertical anchor point being a center of a left pupil, a second vertical anchor point being a left nostril opening, a third vertical anchor point being a right nostril opening and a fourth vertical anchor point being a center of a right pupil. These four anchor points form three horizontally arranged quadrilaterals, which form two pairs of horizontally arranged quadrilaterals that are related by the Golden Ratio (1.618:1.0) as labeled in FIG. 3W. A first pair of horizontally arranged quadrilaterals is formed with a first quadrilateral formed between the left and right nostril openings and a second quadrilateral formed between the left nostril opening and the center of the left pupil. A second pair of horizontally arranged quadrilaterals is formed with a first quadrilateral formed between the left and right nostril openings and a second quadrilateral formed between the right nostril opening and the center of the right pupil.

Figure 3X:
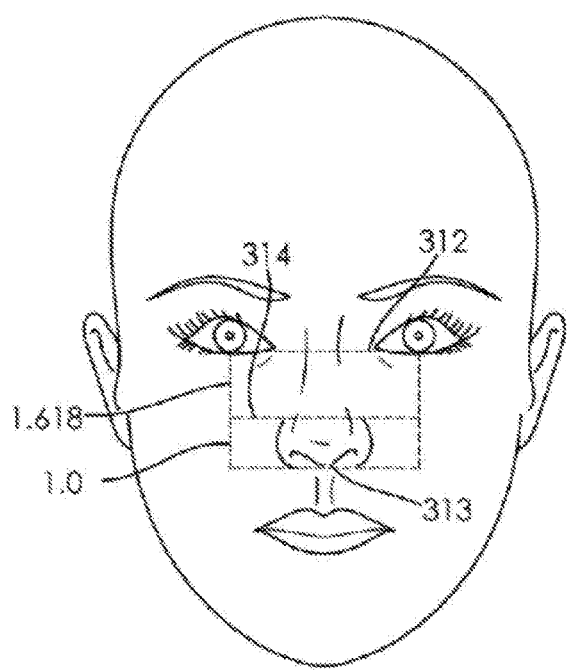
FIG. 3X illustrates an exemplary portrayal of a facial grid 24, shown overlaid on representations of a human face situated in a frontal position, in accordance with an embodiment of the present invention.

Turning to FIG. 3X, facial grid 24 is depicted, with three anchor points that dictate a suitable location of the horizontal grid lines of this particular grid. A first anchor point being a canthal plane, a second anchor point being a surpatip breakpoint of the nose, and a third anchor point being a nasal base plane. These three anchor points form two vertically arranged quadrilaterals, with a first quadrilateral formed between the nasal base plane and the surpatip breakpoint of the nose and a second quadrilateral formed between the surpatip breakpoint of the nose and the canthal plane.

Figure 3Y:
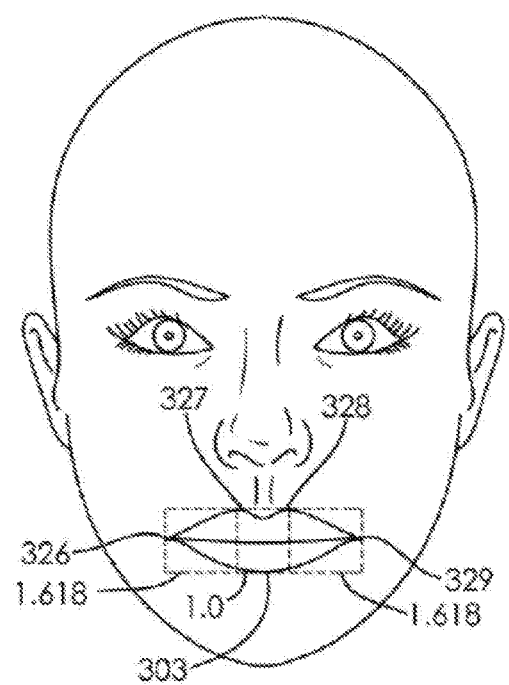
FIG. 3Y illustrates an exemplary portrayal of a facial grid 25, shown overlaid on representations of a human face situated in a frontal position, in accordance with an embodiment of the present invention.

Turning to FIG. 3Y, facial grid 25 is depicted, with four anchor points that dictate a suitable location of the vertical grid lines of this particular grid, with a first anchor point being a right oral commissure, a second anchor point being a right cupids bow, a third anchor point being a left cupids bow and a fourth anchor point being a left oral commissure. These four anchor points form three horizontally arranged quadrilaterals, which form two pairs of horizontally arranged quadrilaterals that are related by the Golden Ratio (1.618:1.0) as labeled in FIG. 3Y. A first pair of horizontally arranged quadrilaterals is formed with a first quadrilateral formed between the right cupid's bow and left cupid's bow and a second quadrilateral formed between the right cupids bow and right oral commissure. A second pair of horizontally arranged quadrilaterals is formed with a first quadrilateral formed between the right cupid's bow and left cupid's bow and a second quadrilateral formed between the left cupid's bow and left oral commissure.

Figure 4A:
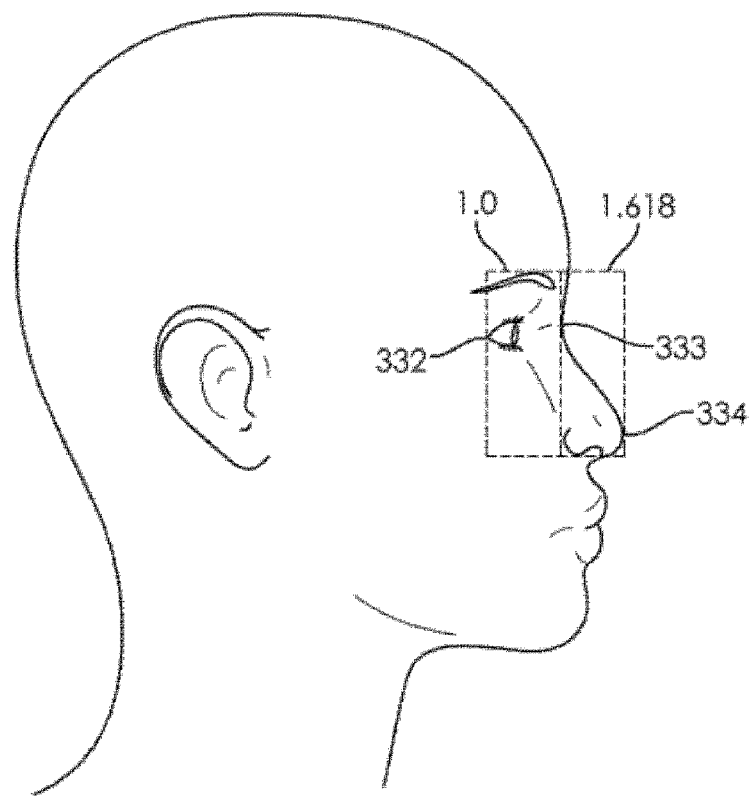
FIG. 4A illustrates an exemplary portrayal of a facial grid 26, shown overlaid on representations of a human face situated in a profile position, in accordance with an embodiment of the present invention.

Turning to FIG. 4A, facial grid 26 is depicted, with three anchor points that dictate a suitable location for the vertical grid lines of this particular grid. A first anchor point being a lateral canthus, a second anchor point being a nasal radix and a third anchor point being a nasal tip edge. In this overlay, a first quadrilateral (e.g., smaller portion of the golden ratio—1.0) is formed between the lateral canthus and the nasal radix and a second quadrilateral (e.g., larger portion of the golden ratio—1.618) is formed between the nasal radix and the nasal tip edge.

Figure 4B:
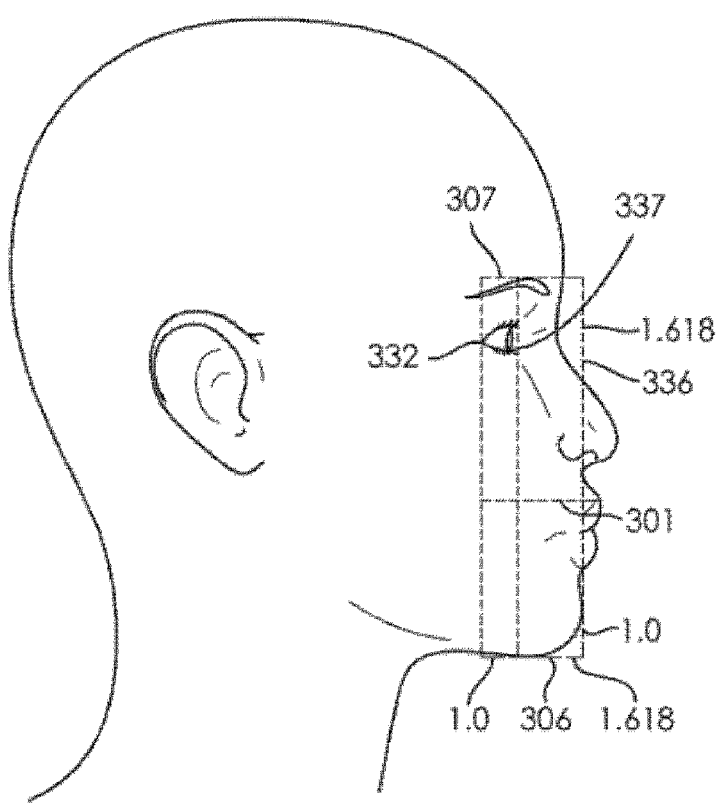
FIG. 4B illustrates an exemplary portrayal of a facial grid 27, shown overlaid on representations of a human face situated in a profile position, in accordance with an embodiment of the present invention.

Turning to FIG. 4B, facial grid 27 is a combination grid with both horizontal and vertical gridlines. Three anchor points dictate a suitable location of the horizontal grid lines of this particular grid, with a first horizontal anchor point being a peak of an eyebrow arch, a second horizontal anchor point being an upper lip vermillion apex plane and a third horizontal anchor point being an inferior edge of chin. These three anchor points form two vertically arranged quadrilaterals, with a first quadrilateral formed between the inferior edge of chin and the upper lip vermillion apex plane and a second quadrilateral formed between the upper lip vermillion apex plane and the eyebrow arch peak. Three anchor points dictate a suitable location for the three vertical grid lines of this grid, with, a first vertical anchor point being an upper lip philtral dimple, a second vertical anchor point being an anterior edge of eyeball globe and a third vertical anchor point being a lateral canthus. These three anchor points form two horizontally arranged quadrilaterals that are related by the Golden Ratio (1.618:1.0) as labeled in FIG. 4B. A first quadrilateral is formed between the lateral canthus and anterior edge of eyeball globe and a second quadrilateral between the anterior edge of eyeball globe and upper lip philtral dimple. Other relationships exists, such as the philtral dimple should line up with anterior chin margin and the anterior and inferior sides of the lowermost quadrilateral should define the anterior and inferior chin borders from profile view.

Figure 4C:
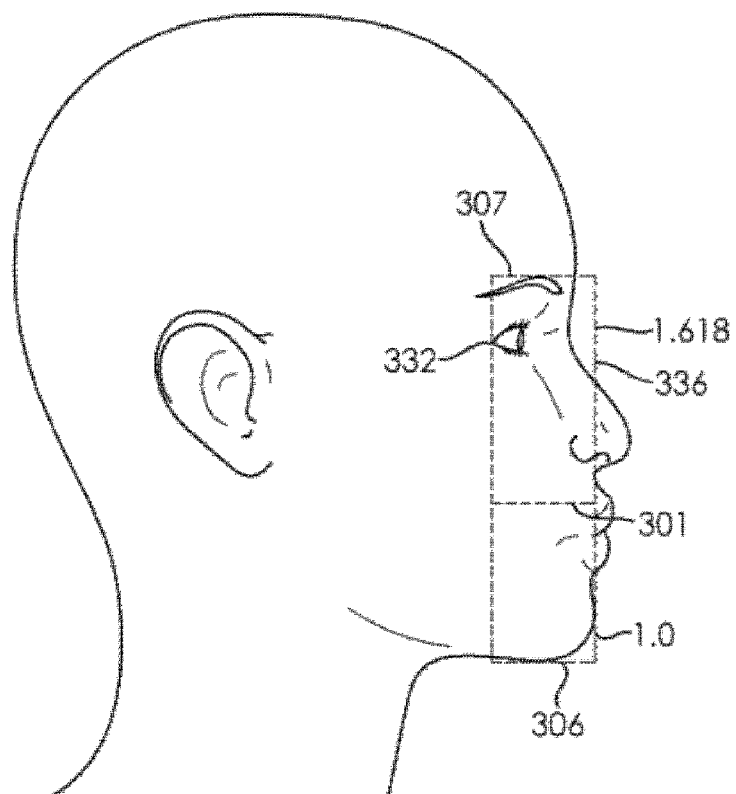
FIG. 4C illustrates an exemplary portrayal of a facial grid 28, shown overlaid on representations of a human face situated in a profile position, in accordance with an embodiment of the present invention.

Turning to FIG. 4C, facial grid 28 is depicted, with three anchor points that dictate a suitable location of the horizontal grid lines of this particular grid, with a first horizontal anchor point being a peak of an eyebrow arch, a second horizontal anchor point being an upper lip vermillion apex plane and a third horizontal anchor point being an inferior edge of chin. These three anchor points form two vertically arranged quadrilaterals that are related by the Golden Ratio (1.618:1.0) as labeled in FIG. 4C. A first quadrilateral is formed between the inferior edge of chin and the upper lip vermillion apex plane and a second quadrilateral formed between the upper lip vermillion apex plane and the eyebrow arch peak.

Figure 4D:
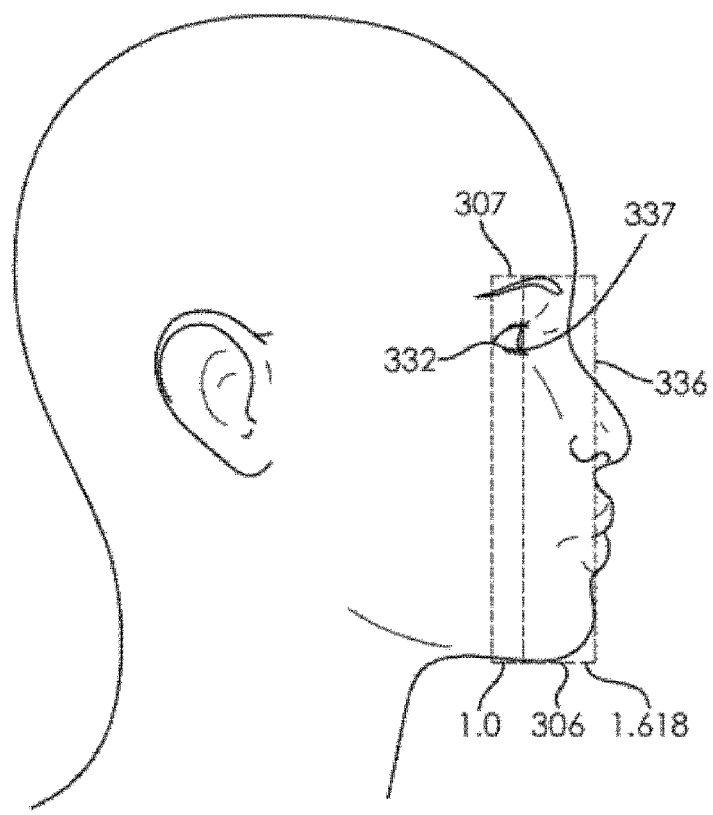
FIG. 4D illustrates an exemplary portrayal of a facial grid 29, shown overlaid on representations of a human face situated in a profile position, in accordance with an embodiment of the present invention.

Turning to FIG. 4D, facial grid 29 is depicted, with anchor points dictate a suitable location for the three vertical grid lines of this grid, with, a first vertical anchor point being an upper lip philtral dimple, a second vertical anchor point being an anterior edge of eyeball globe and a third vertical anchor point being a lateral canthus. These three anchor points form two horizontally arranged quadrilaterals that are related by the Golden Ratio (1.618:1.0) as labeled in FIG. 4D. A first quadrilateral is formed between the lateral canthus and anterior edge of eyeball globe and a second quadrilateral between the anterior edge of eyeball globe and upper lip philtral dimple. Other relationships exists, such as the philtral dimple should line up with anterior chin margin and the anterior and inferior sides of the second quadrilateral should define the anterior and inferior chin borders from profile view.

It should be noted that while FIGS. 3P-3U and 4A-4D, depicting facial grids 16-21 and 26-29, show the quadrilaterals being formed on one side of a face, the grids are valid as well on the opposite side of the face. One of ordinary skill in the art would appreciate that by simply mirroring the anchor points to the corresponding opposite side of the face (e.g., or breast area as described in the below embodiments) would allow for measuring grids on that corresponding opposite side of the face.

Figure 5:
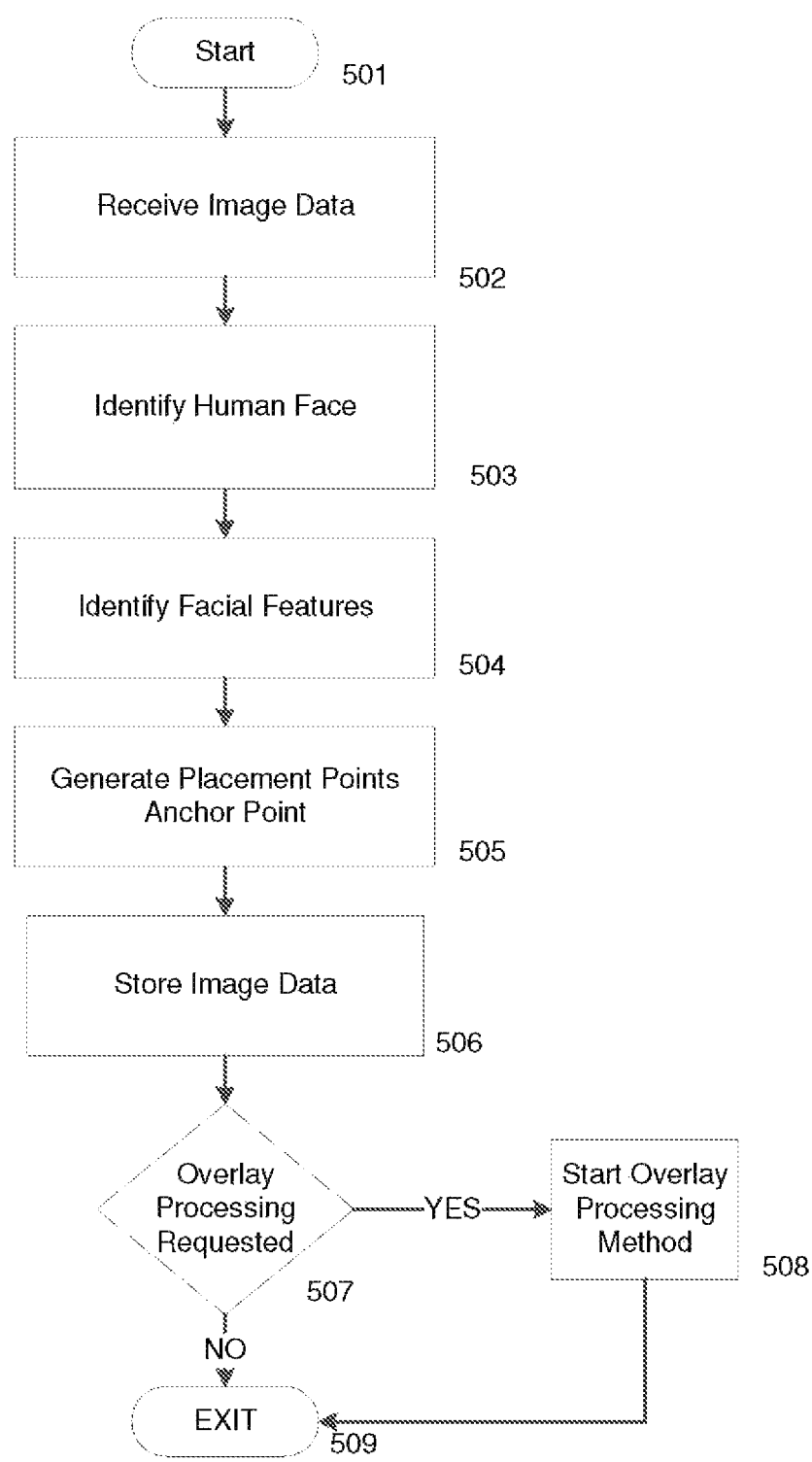
FIG. 5 is an illustration of an exemplary process flow, in accordance with an embodiment of the present invention.

Turning now to FIG. 5, a process flow for receiving and processing image data for use in the system is shown. The process starts at step 501 with the system being engaged by a user. At step 502, the system receives image data for processing. As noted elsewhere herein, the image data may be provided in any number of manners, including, but not limited to, from an image capture device, from a remote computing system, from a local image file, from a video capture device, or any other means for capturing or retrieving usable image data.

At step 503, the system processes the image data and identifies a human face in the image data. Identification of a human face from the image data can be done by any number of methods known to those skilled in the art. For instance, image data can be processed for the identification of facial features and matched against a facial database. Method for such analysis include principal component analysis using eigenfaces, Linear Discriminate Analysis, Elastic Bunch Graph Matching using a Fisherface algorithm, Hidden Markov model, Multilinear Subspace Learning using tensor representation, and the neuronal motivated dynamic link matching. In other embodiments, identification of a face can be done by placing anchor point identifying indicia on various spots on a human face in an image. Anchor point identifying indicia may include, but are not limited to, adhesive dots, points made on the skin of the human face with an identifiable property (e.g., visual points made on the skin with a marker, visual points made on the skin with a paint or other pigmented application, non-visual points detectable by a scanning device (e.g., RFID indicia, transparent indicia that react to different wavelengths of light)) or the user simply marking the points on their own image on a computer screen after being presented with specific directions on how to do so properly. One of ordinary skill in the art would appreciate that there are numerous types of anchor point identifying indicia that could be used with embodiments of the present invention, and embodiments of the present invention are contemplated for use with any appropriate anchor point identifying indicia. Additionally, one of ordinary skill in the art would appreciate that there are numerous methods for identifying a human face in image data, and embodiments of the present invention are contemplated for use with any such methods.

At step 504, the system identifies one or more facial features in the image data and identified human face in said image data. Generally, a plurality of facial features are identified, such identified facial features correlating with anchor points in one or more grid overlays the image data is to be compared against. Identification of facial features in image data, similar to the identification of the human face in step 503, could be handled via any one of numerous methods known in the art. One of ordinary skill in the art would appreciate that there are numerous methods for identifying facial features in a human face as identified in image data.

At step 505, the system generates placement points for each facial feature identified and associates the placement points with the image data. The placement points are points of reference associated with the identified facial features and are to be used later to allow for alignment of such placement points with one or more (preferably a plurality) anchor points associated with one or more facial grid overlays.

At step 506, the system stores the processed image data, including identified human faces, facial features and generated placement points. Storage can be done locally, such as on a hard disk drive or other non-transitory storage medium, or remotely, such as on cloud storage or other remote storage system.

At step 507, the system checks to see if the processed image data is presently requested to be analyzed. If the processed image data is requested to be analyzed, the system proceeds to the overlay processing method (FIG. 6) (Step 508). Otherwise, the process terminates at step 509.

Figure 6:
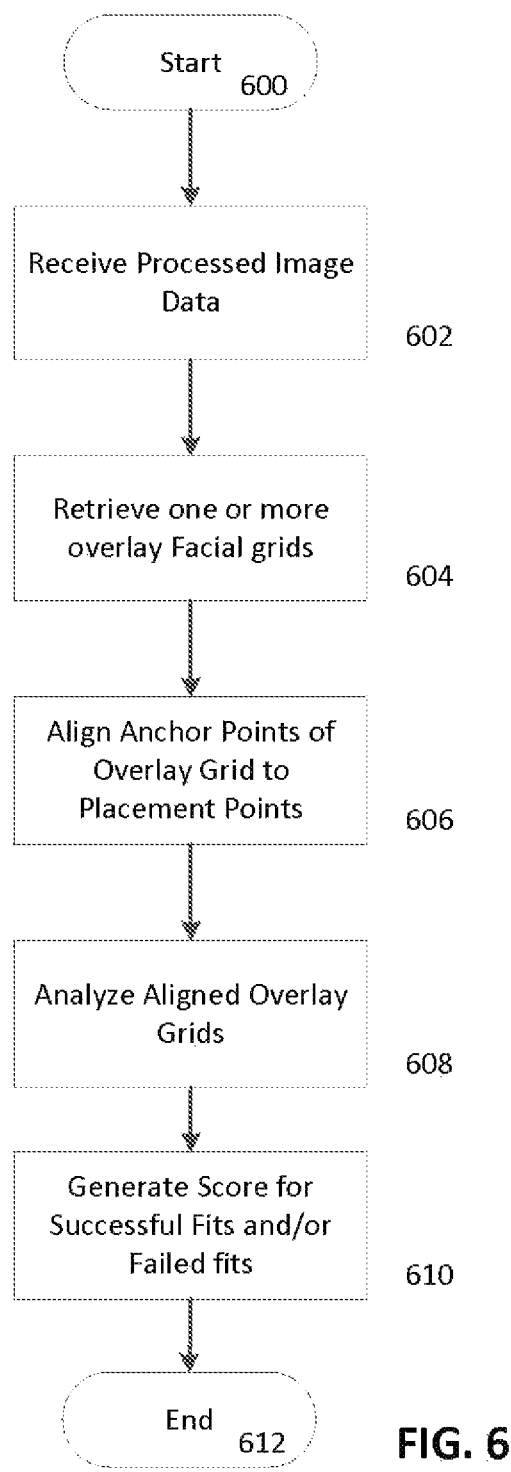
FIG. 6 is an illustration of an exemplary process flow, in accordance with an embodiment of the present invention.

Turning now to FIG. 6, a process for retrieving and aligning image data with one or more overlay facial grids, is shown. The process starts at step 600 with the system being engaged to analyze processed image data against one or more overlay facial grids. Prior to starting this method, a user may have selected or otherwise identified one or more overlay grids to be used in the analysis. In other embodiments, overlay grids may be selected by the user or automatically selected based on the number and type of identified facial features and placement points.

At step 602, the system receives the processed image data. In exemplary embodiments, receipt of the processed image data is either by way of retrieval from storage or directly provided by the image capture and processing portion of the system. In other embodiments, the system may receive processed image data from a third party or another local or remote system unrelated to the present system. One of ordinary skill in the art would appreciate that there are numerous methods for the system to receive processed image data, and embodiments of the present invention are contemplated for use with any appropriate method.

At step 604, the system retrieves one or more overlay facial grids for use in the analysis. In exemplary embodiments of the present invention, the system may retrieve overlay facial grids from local or remote storage. In other embodiments, the overlay grids may be provided by a third party or another local or remote system unrelated to the present system. One of ordinary skill in the art would appreciate that there are numerous methods for the system to retrieve overlay grids, and embodiments of the present invention are contemplated for use with any appropriate method.

Further, in certain embodiments, the selection and retrieval of facial grid overlays may be done in association with the placement points present in the image data. For instance, the system may request and retrieve only those overlay grids that are able to be matched to the image data based on the placement points in the image data and the anchor points determined based on the overlay grids. In other embodiments, the system may be configured to reject the receipt of overlay grids that involve anchor points that are not identified in the placement points associated with the image data.

At step 606, The system aligns the retrieved overlay grids to the placement points identified and stored along with the processed image data. As noted previously herein, the overlay grids comprise a plurality of anchor points that are used in conjunction with the placement points to align the overlay grids with the human face identified in the image data. The system may be configured to align multiple overlay grids to the placement points, depending on the placement points available in the image data.

At step 608, the system analyzes the overlay grids and image data in order to determine their agreement with the golden ratio as defined specifically in a given facial grid. If the golden ratio relationship does not exist between the quadrilateral created based on the anatomical anchor points for any given human face, then that particular facial grid is considered an unsuccessful or "failed fit". If the golden ratio exists as defined in a given facial grid, then one has achieved a "successful fit" score. In other embodiments, scores can be calculated based on the proximity to the golden ratio defined specifically in a given facial grid. For instance, the closer the proportions of the identified facial features are to the golden ratio as outlined in the overlay facial grids, the higher the attractiveness rating score will be. Conversely, the farther away the proportions of the identified facial features are from the golden ratio, the lower the attractiveness score will be. Weighting of these scores can be done in numerous ways. One of ordinary skill in the art would appreciate that there are numerous methods for calculating a relationship/correlation score with matched features, and embodiments of the present invention are contemplated for use with any such method for weighting and scoring relationships/correlations.

At step 610, the system generates an overall attractiveness rating for the human face in the image data based on the cumulative scoring for each overlay grid utilized in the analysis. In an exemplary embodiment, the more overlay grids utilized, the more accurate the attractiveness rating will be. In this light, not only can an attractiveness rating be generated, but also a measure of accuracy can be generated as well, with a higher accuracy being associated with an analysis that utilized a greater number of grid overlays (e.g., >5 overlays, >10 overlays) and lower accuracy being associated with an analysis that utilized a lower number of grid overlays (e.g., <5 overlays, <10 overlays). Once the score (and in certain cases, accuracy) is generated, the process terminates at step 612.

In at least some exemplary embodiments, for example with respect to image data for processing by the image capture and processing module regarding breast images, suitable camera lens focal length may provide quality and accuracy of raw image data. For example, for a standard 35 mm single lens reflex print film camera, a lens with focal length of about 50-60 mm may be suitable for clinical breast area (e.g., clinical breast, chest, abdominal and thorax) photography and for use in analyses associated with these exemplary features. Regarding for example the use of digital cameras and digital camera lenses, a 35 mm equivalent focal length may be suitable. The 35 mm equivalent focal length may be calculated by multiplying an actual focal length of a lens by the crop factor of a specific digital camera sensor being used inside the digital camera being used itself. Irrespective of the type of digital camera or lens used, a photographic or video image equivalent to one taken with a 50-60 mm focal length lens on a standard 35 mm single lens reflex print film camera may be created. Lenses in this exemplary focal length range may have a minimal amount of distortion, which creates a flat field and a suitably accurate depiction of a subject's breasts, thorax and abdomen. Any suitable method for capturing image data for clinical chest photography and/or videography may be used with the exemplary embodiments disclosed for example herein.

Figure 7A:
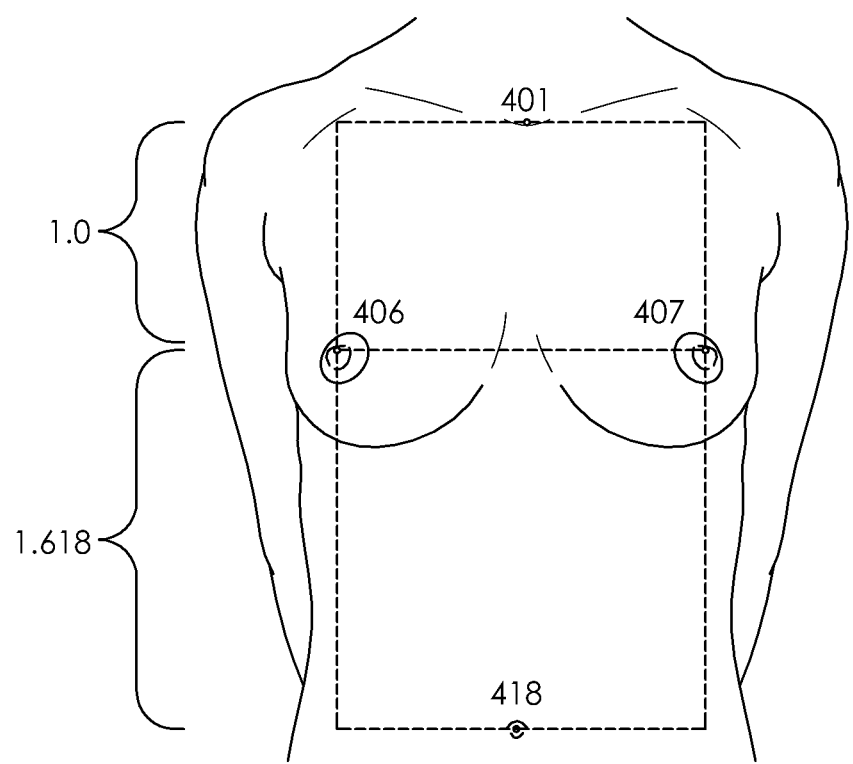
FIG. 7A illustrates an exemplary portrayal of a breast grid 1, shown overlaid on representations of a human breast area situated in a frontal position, in accordance with an embodiment of the present invention.
Figure 7B:
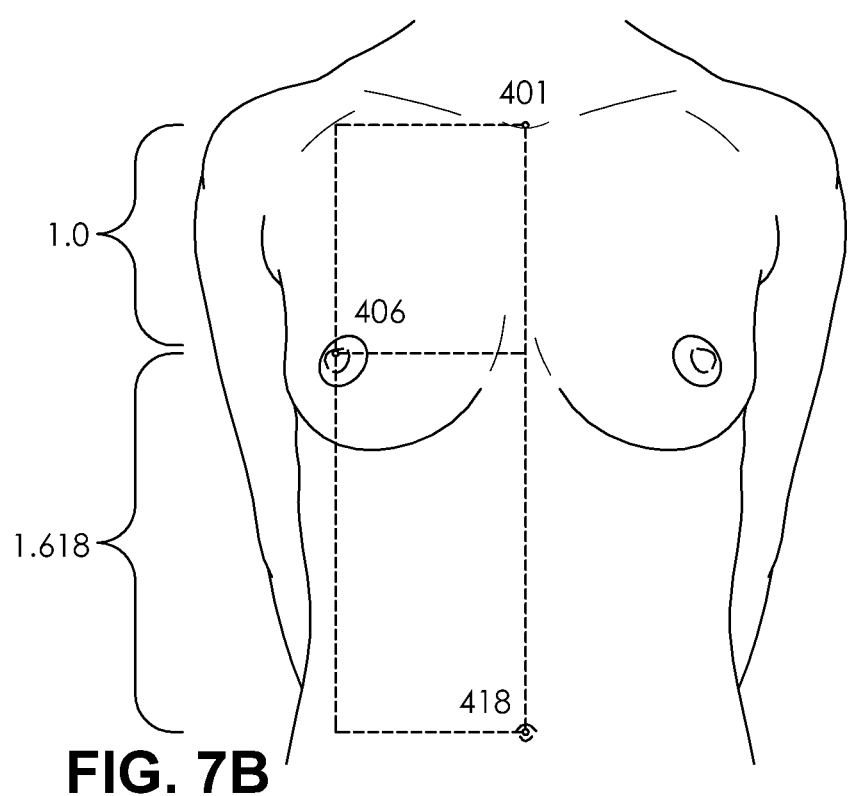
FIG. 7B illustrates an exemplary portrayal of a breast grid 2, shown overlaid on representations of a human breast area situated in a frontal position, in accordance with an embodiment of the present invention.
Figure 7C:
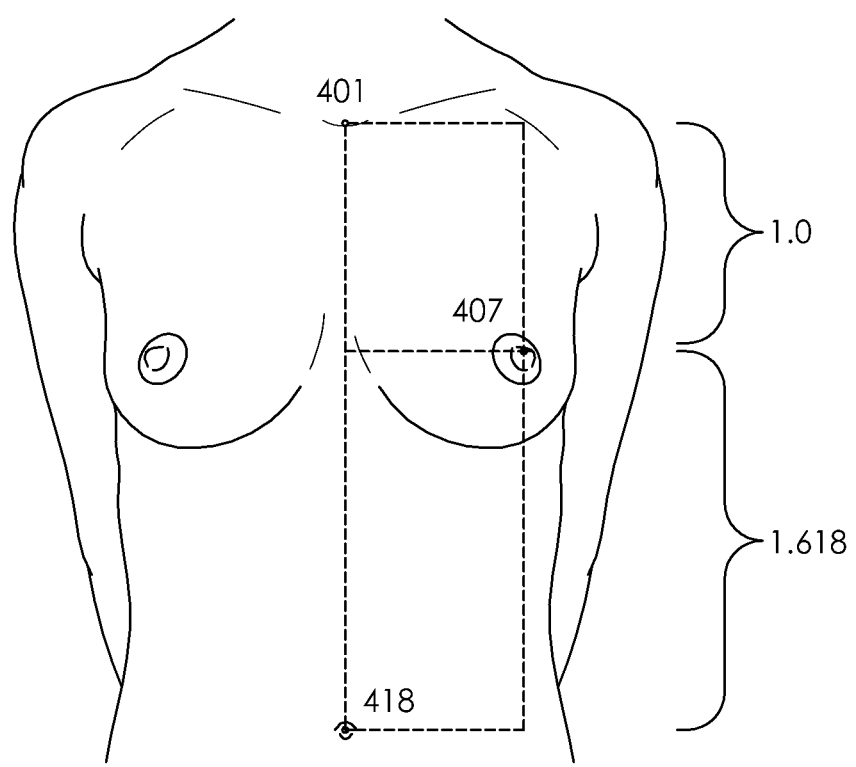
FIG. 7C illustrates an exemplary portrayal of a breast grid 3, shown overlaid on representations of a human breast area situated in a frontal position, in accordance with an embodiment of the present invention.
Figure 7D:
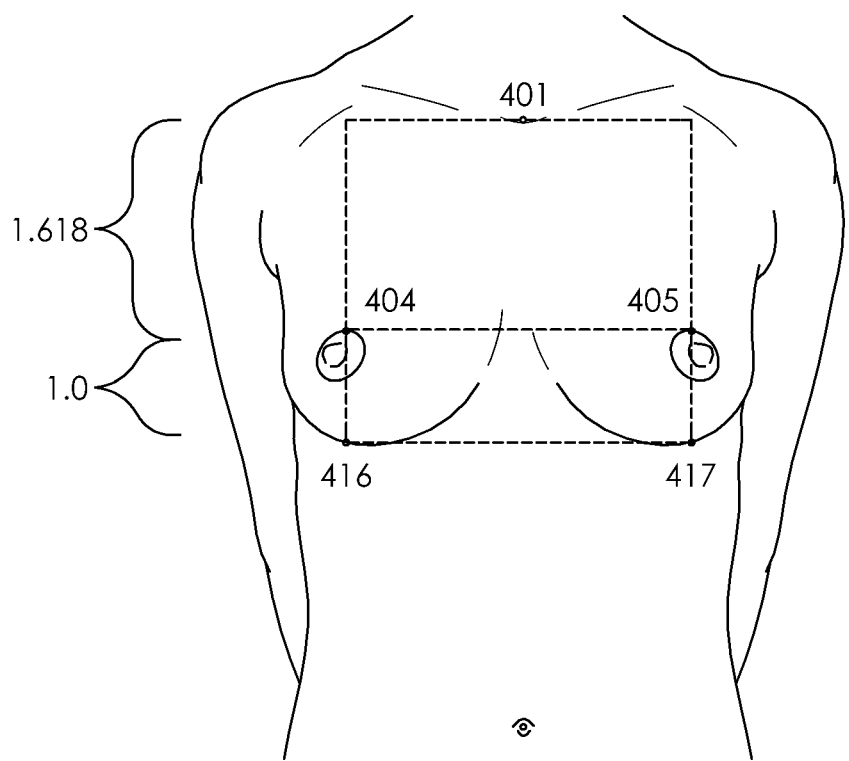
FIG. 7D illustrates an exemplary portrayal of a breast grid 4, shown overlaid on representations of a human breast area situated in a frontal position, in accordance with an embodiment of the present invention.
Figure 7E:
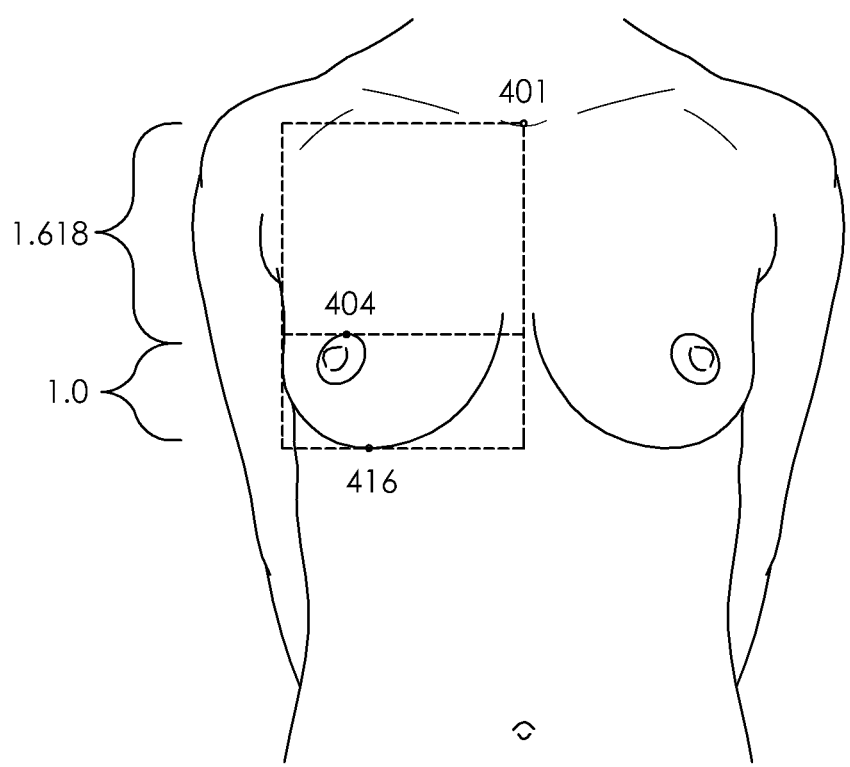
FIG. 7E illustrates an exemplary portrayal of a breast grid 5, shown overlaid on representations of a human breast area situated in a frontal position, in accordance with an embodiment of the present invention.
Figure 7F:
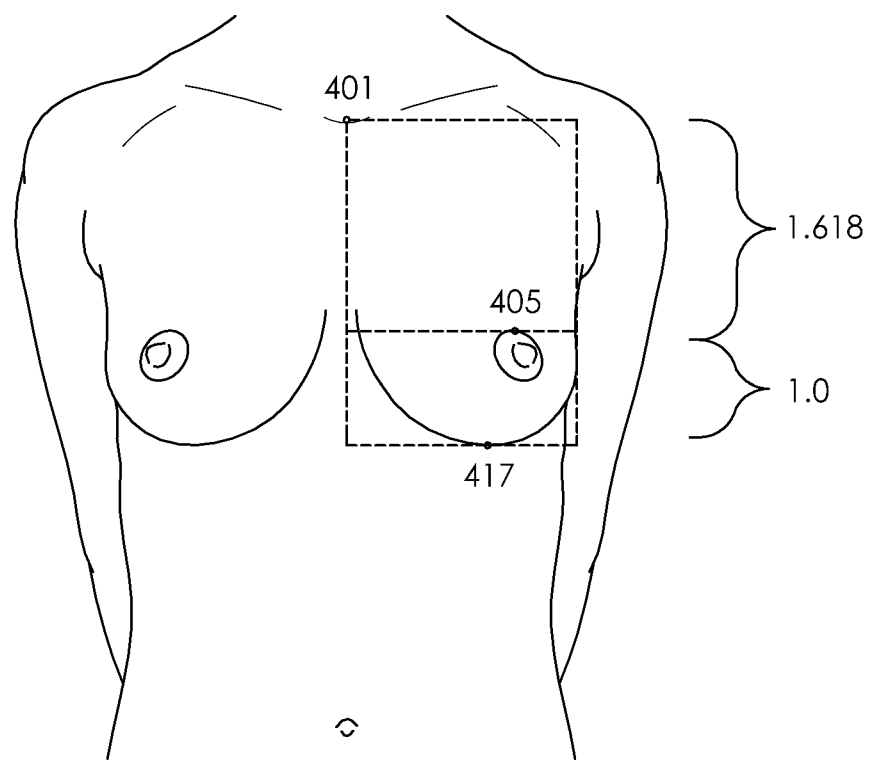
FIG. 7F illustrates an exemplary portrayal of a breast grid 6, shown overlaid on representations of a human breast area situated in a frontal position, in accordance with an embodiment of the present invention.
Figure 7G:
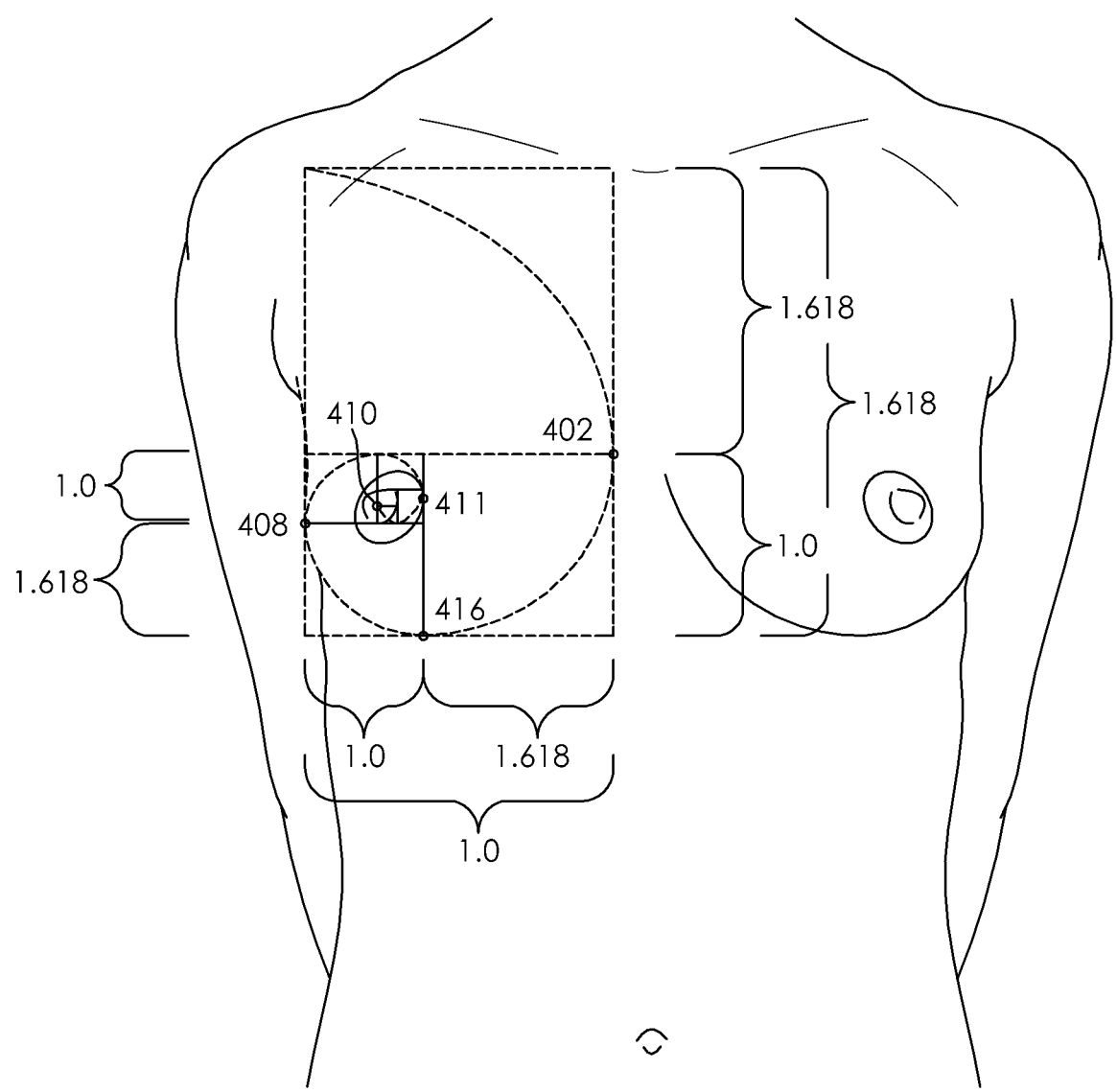
FIG. 7G illustrates an exemplary portrayal of a breast grid 7, shown overlaid on representations of a human breast area situated in a frontal position, in accordance with an embodiment of the present invention.
Figure 7H:
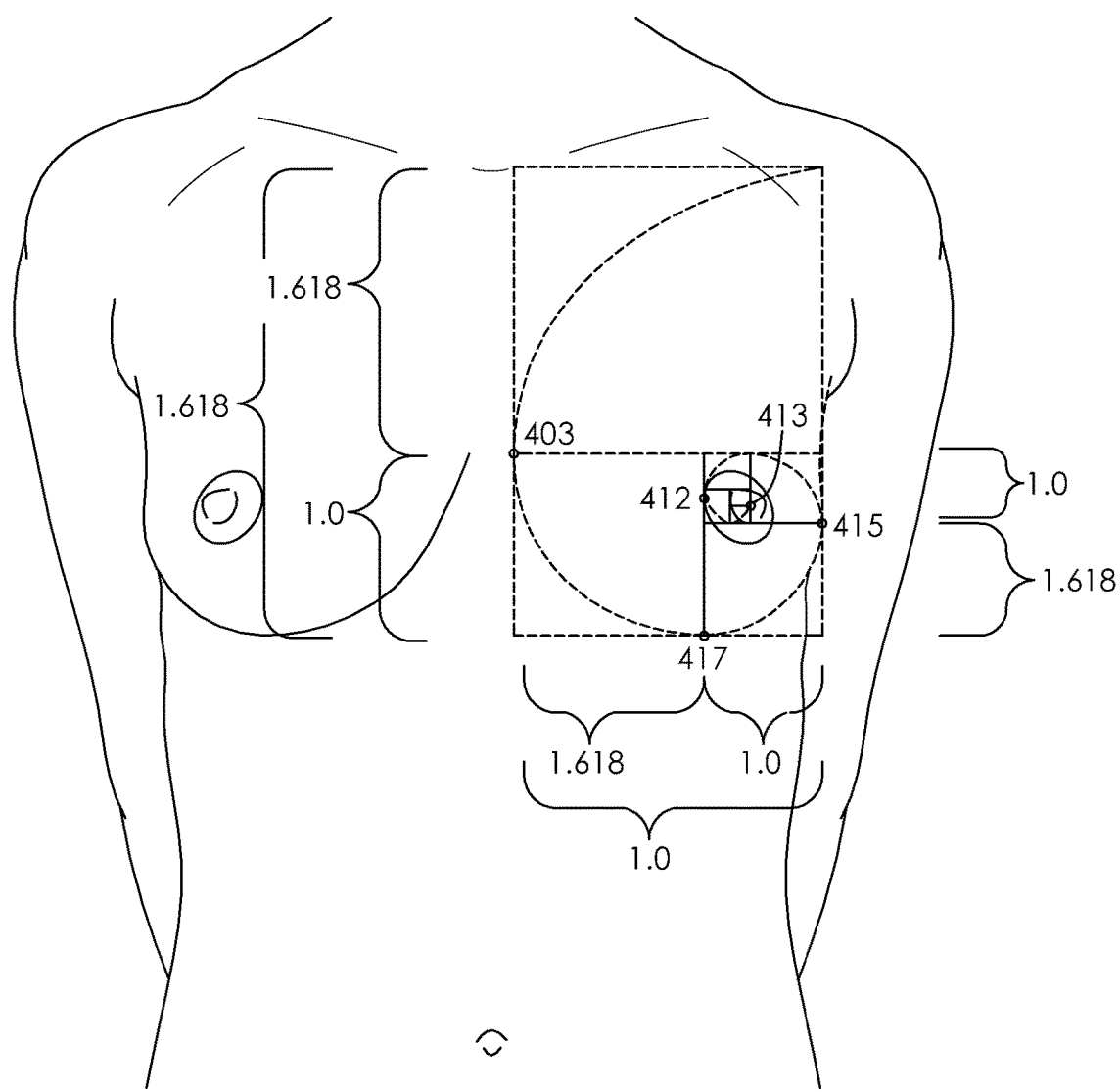
FIG. 7H illustrates an exemplary portrayal of a breast grid 8, shown overlaid on representations of a human breast area situated in a frontal position, in accordance with an embodiment of the present invention.
Figure 7I:
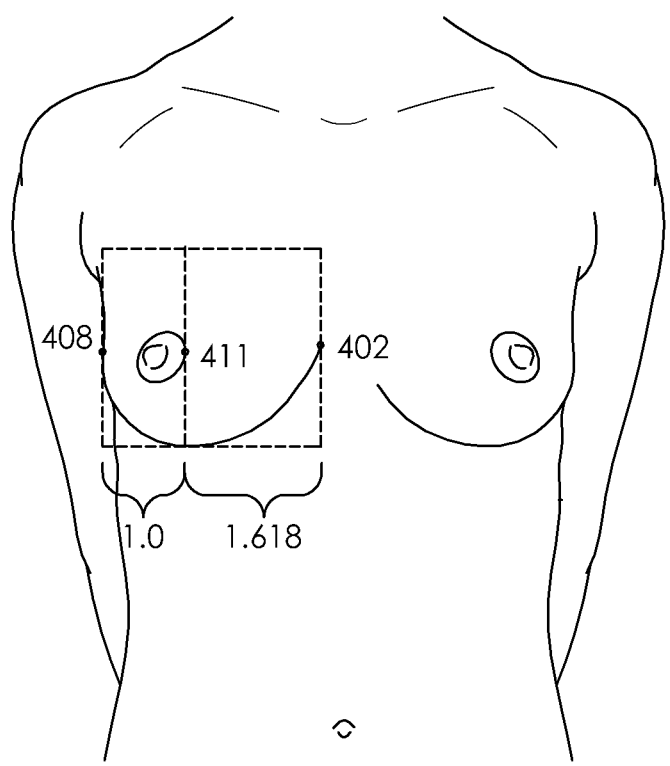
FIG. 7I illustrates an exemplary portrayal of a breast grid 9, shown overlaid on representations of a human breast area situated in a frontal position, in accordance with an embodiment of the present invention.
Figure 7J:
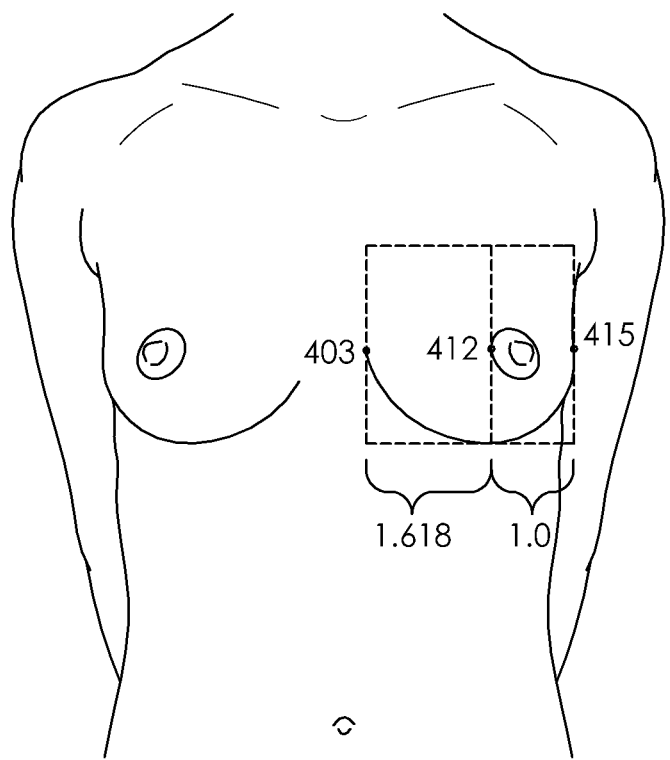
FIG. 7J illustrates an exemplary portrayal of a breast grid 10, shown overlaid on representations of a human breast area situated in a frontal position, in accordance with an embodiment of the present invention.
Figure 7K:
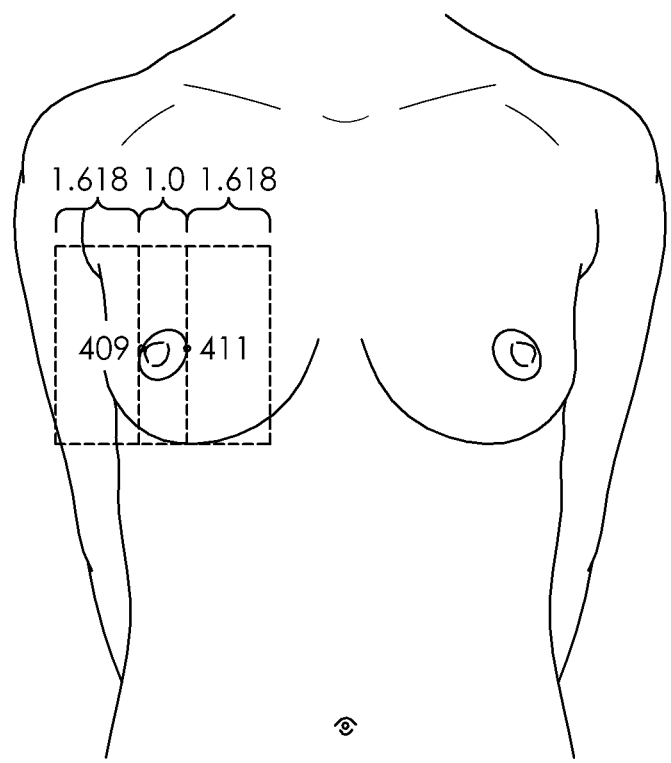
FIG. 7K illustrates an exemplary portrayal of a breast grid 11, shown overlaid on representations of a human breast area situated in a frontal position, in accordance with an embodiment of the present invention.
Figure 7L:
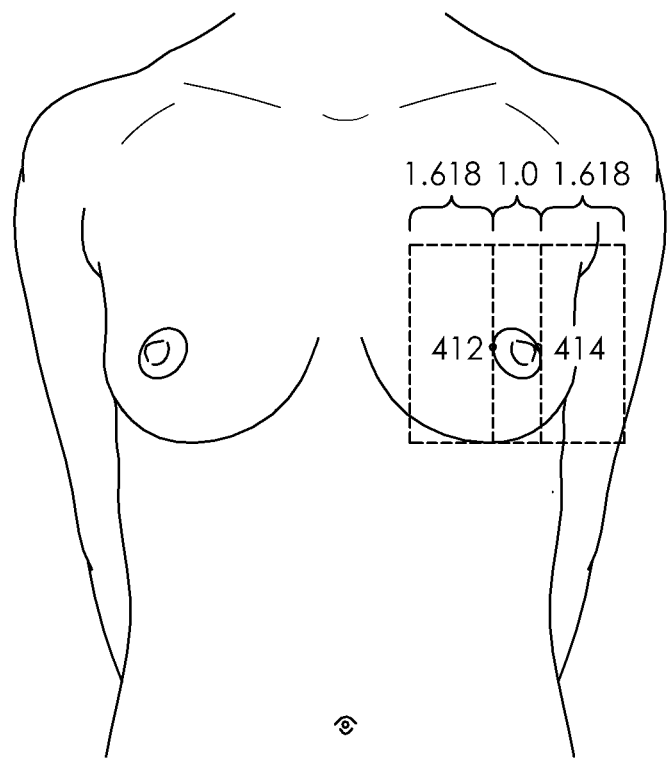
FIG. 7L illustrates an exemplary portrayal of a breast grid 12, shown overlaid on representations of a human breast area situated in a frontal position, in accordance with an embodiment of the present invention.
Figure 7M:
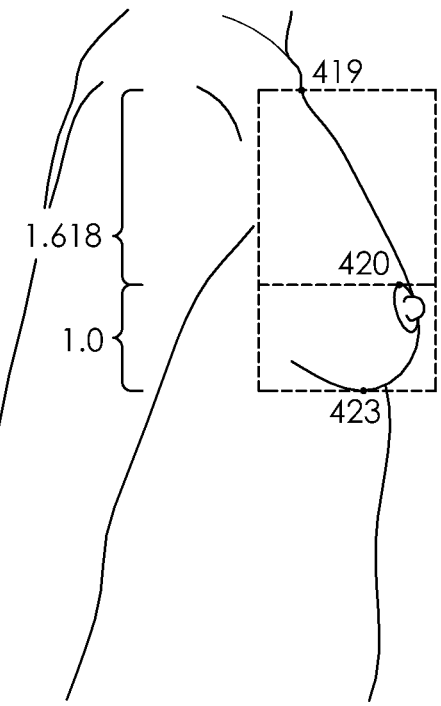
FIG. 7M illustrates an exemplary portrayal of a breast grid 13, shown overlaid on representations of a human breast area situated in a profile position, in accordance with an embodiment of the present invention.
Figure 7N:
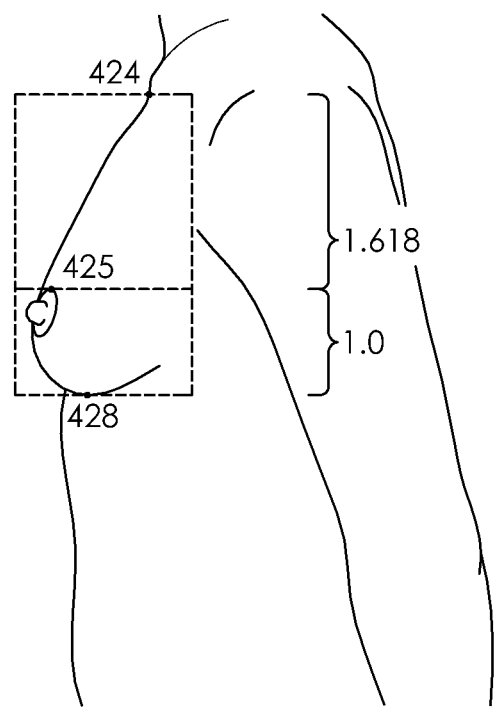
FIG. 7N illustrates an exemplary portrayal of a breast grid 14, shown overlaid on representations of a human breast area situated in a profile position, in accordance with an embodiment of the present invention.
Figure 7O:
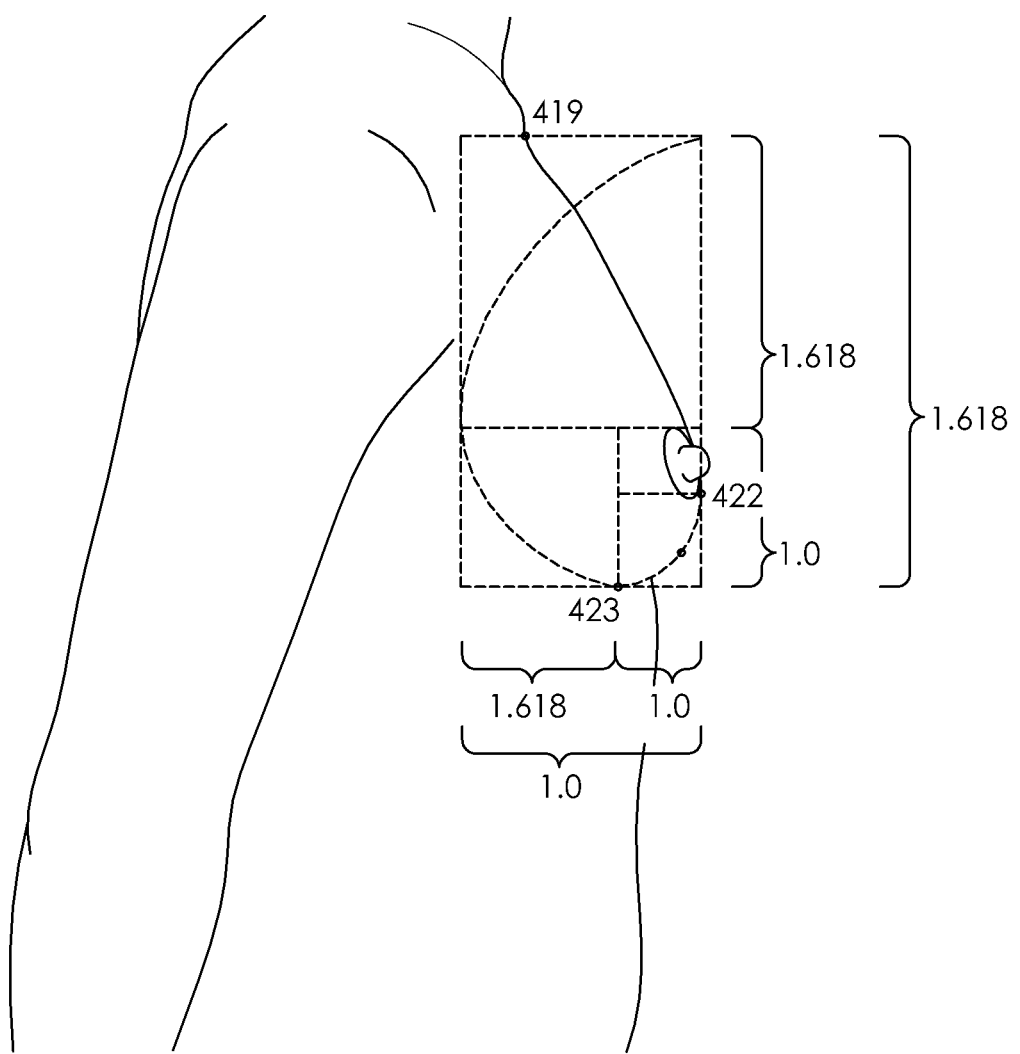
FIG. 7O illustrates an exemplary portrayal of a breast grid 15, shown overlaid on representations of a human breast area situated in a profile position, in accordance with an embodiment of the present invention.
Figure 7P:
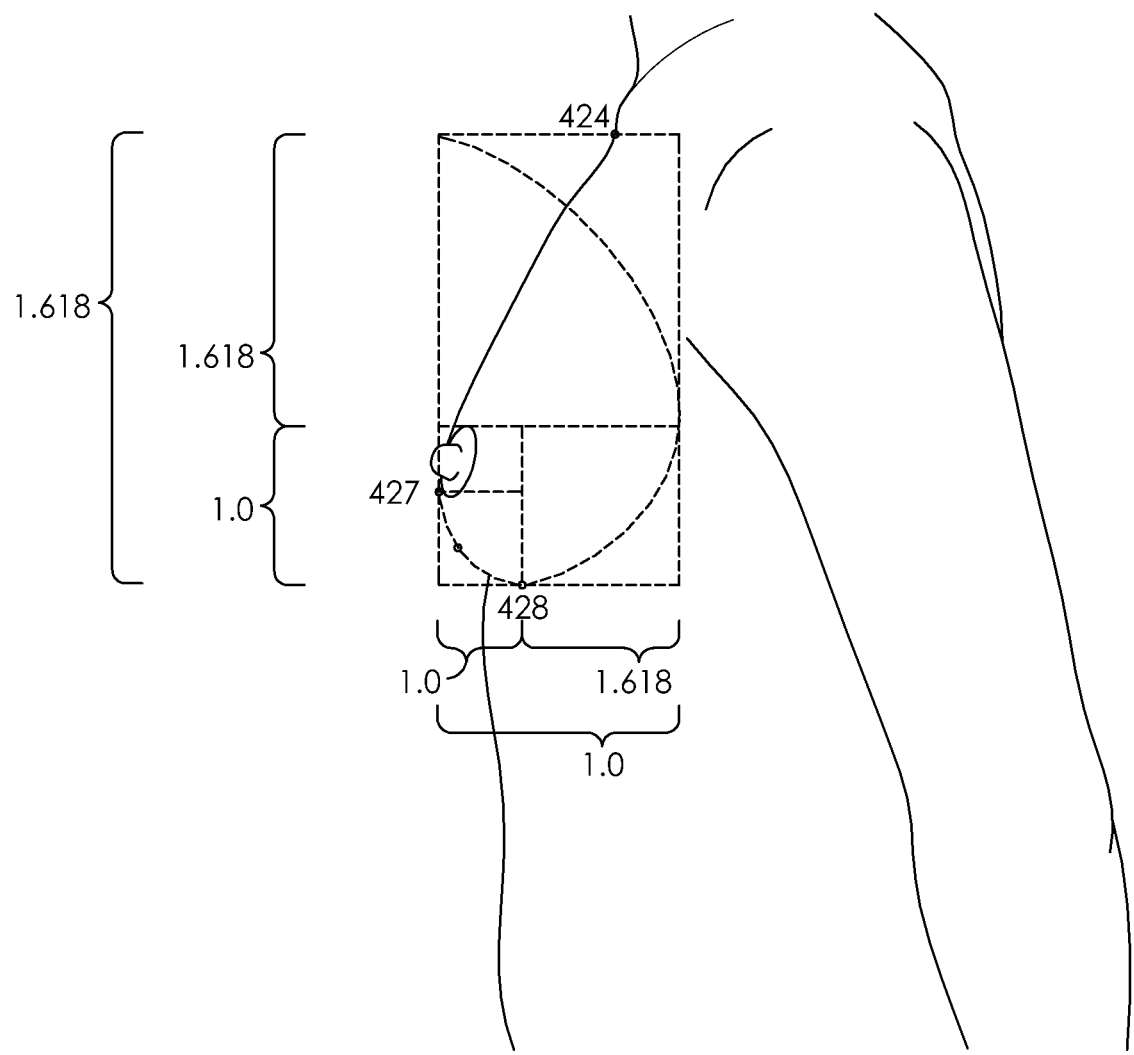
FIG. 7P illustrates an exemplary portrayal of a breast grid 16, shown overlaid on representations of a human breast area situated in a profile position, in accordance with an embodiment of the present invention.
Figure 7Q:
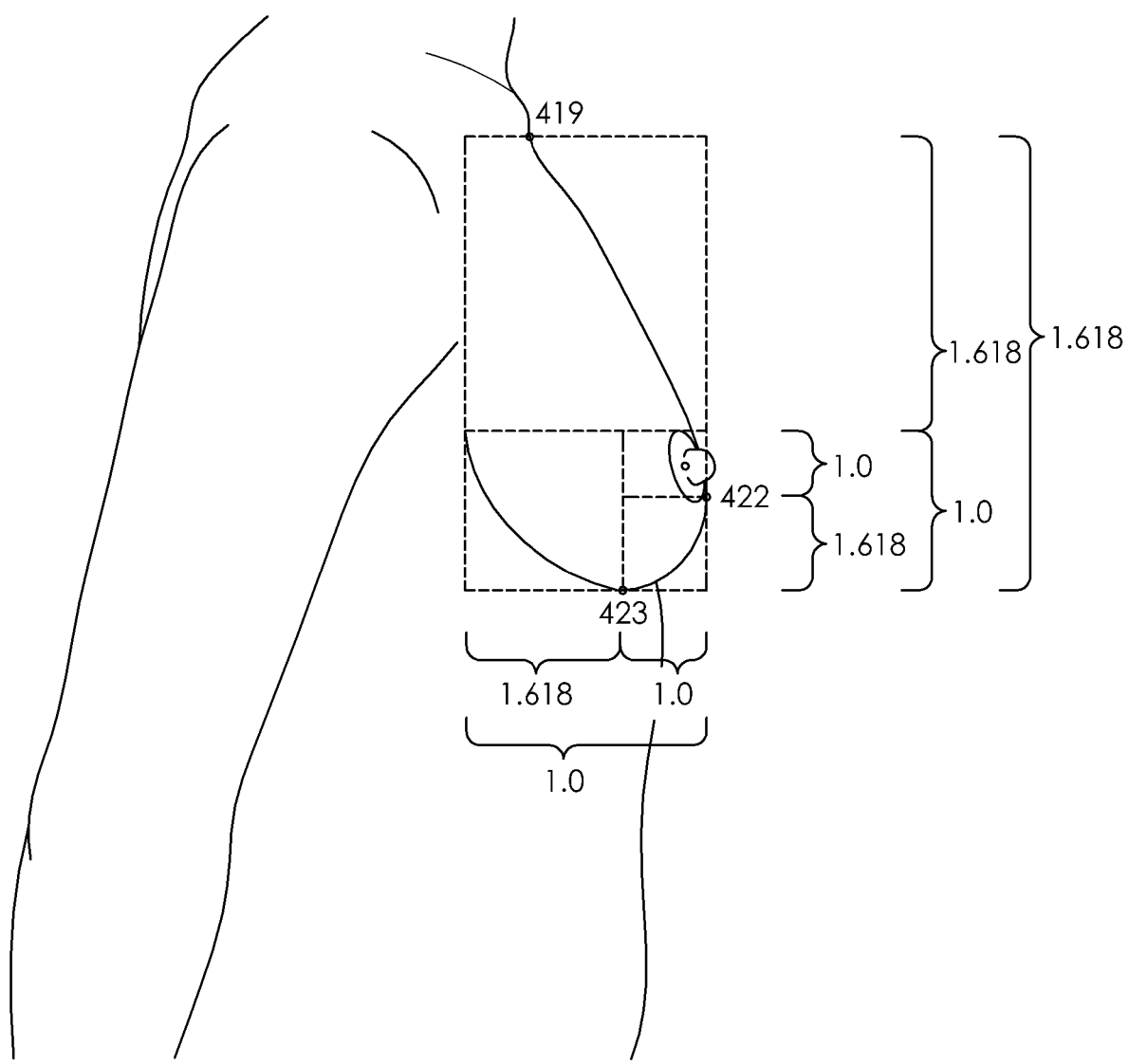
FIG. 7Q illustrates an exemplary portrayal of a breast grid 17, shown overlaid on representations of a human breast area situated in a profile position, in accordance with an embodiment of the present invention.
Figure 7R:
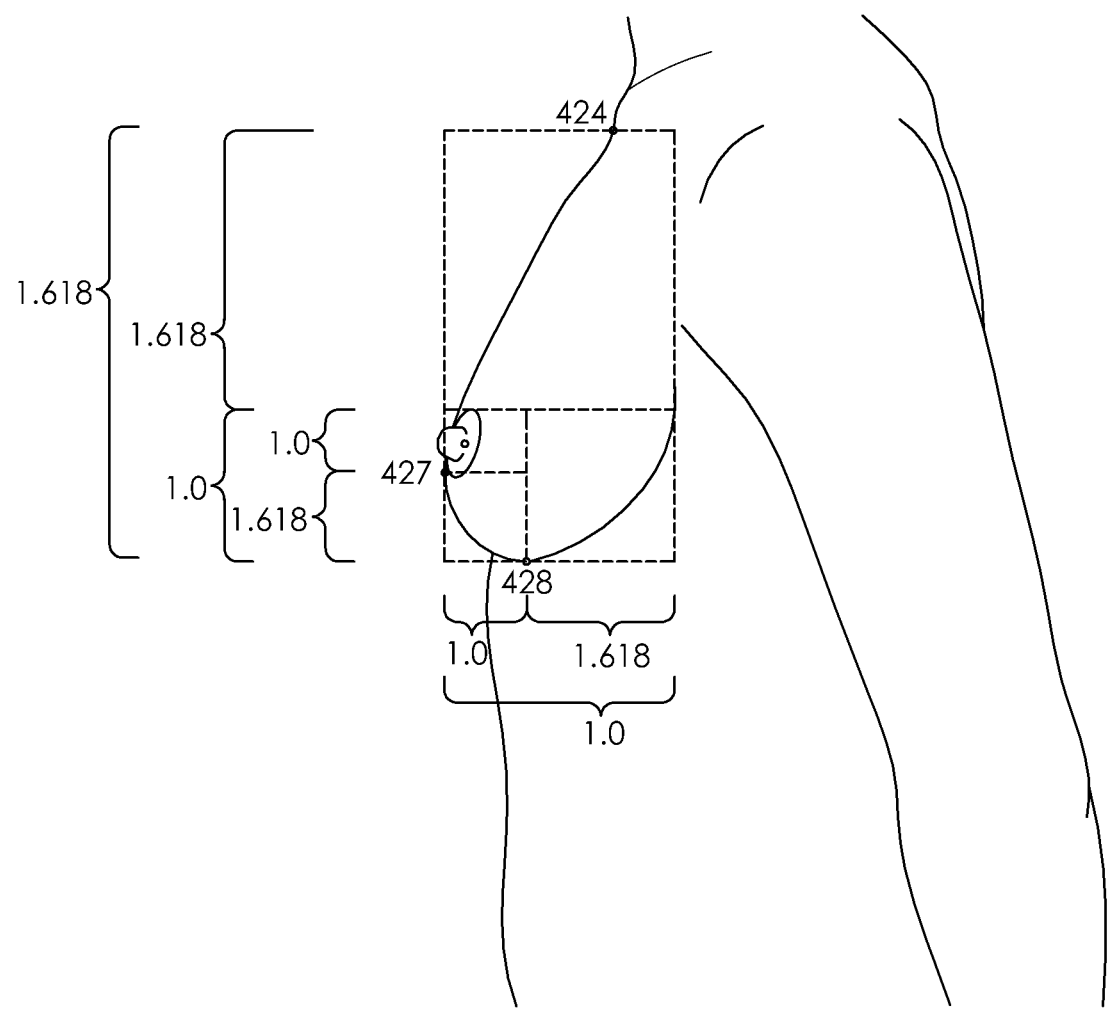
FIG. 7R illustrates an exemplary portrayal of a breast grid 18, shown overlaid on representations of a human breast area situated in a profile position, in accordance with an embodiment of the present invention.
Figure 7S:
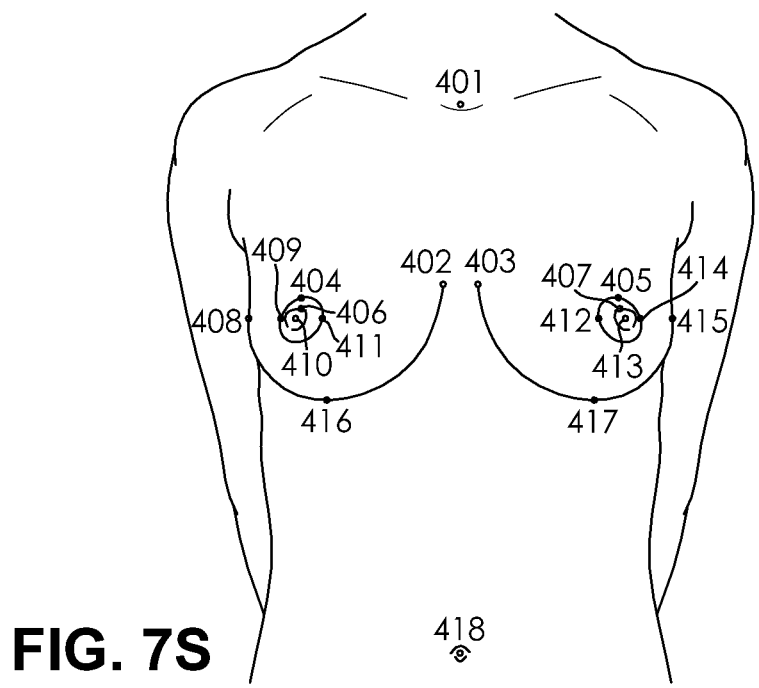
FIG. 7S illustrates an exemplary breast area depicting exemplary landmarks, in accordance with an embodiment of the present invention.
Figure 7T:
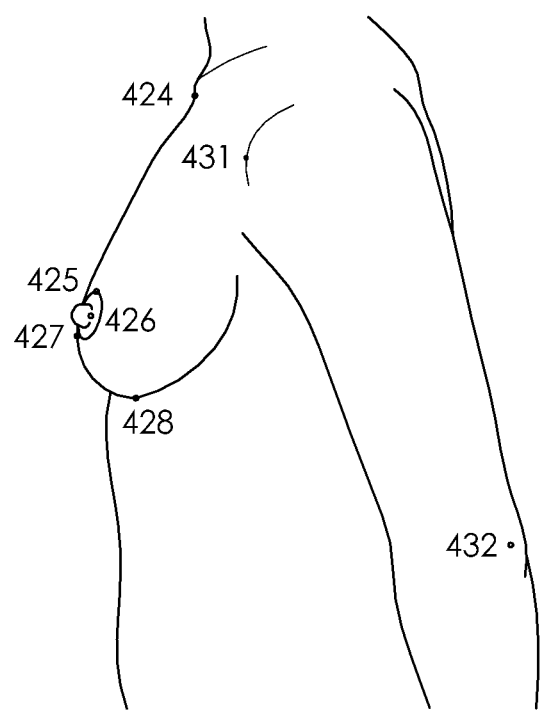
FIG. 7T illustrates an exemplary breast area depicting exemplary landmarks, in accordance with an embodiment of the present invention.
Figure 7U:
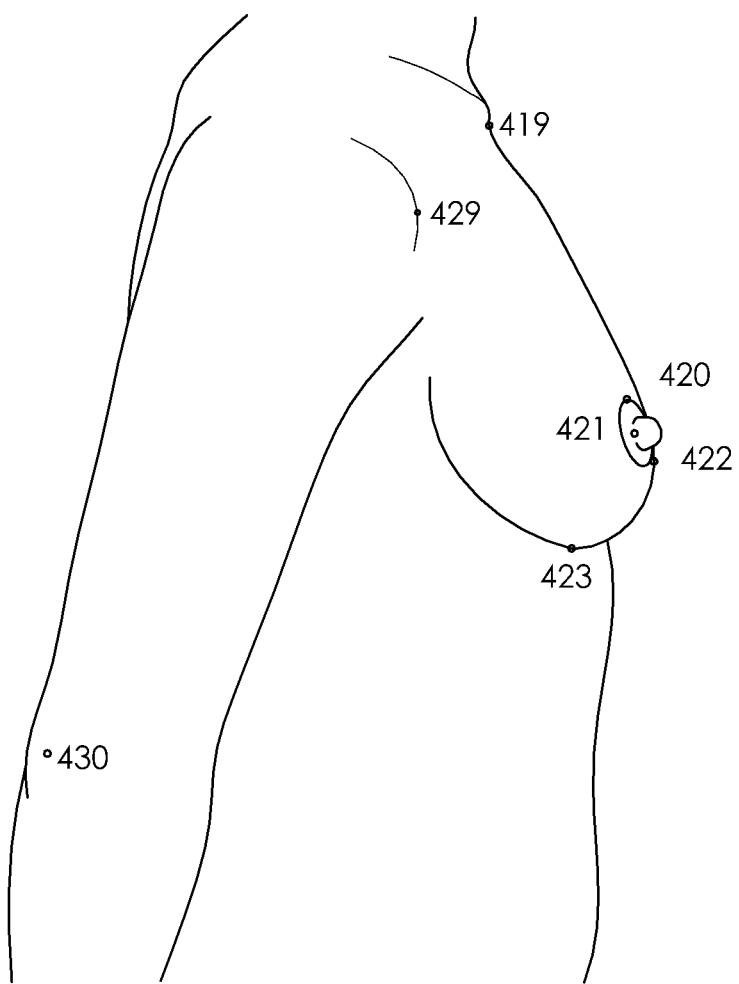
FIG. 7U illustrates an exemplary breast area depicting exemplary landmarks, in accordance with an embodiment of the present invention.

According to an embodiment of the present invention and as illustrated in FIGS. 7S-U, human frontal breast, thoracic and abdominal anatomic landmarks identifiable by the exemplary image capture and processing module may include, but are not limited to, the base of the jugular suprasternal notch 401, a medial uppermost margin of the right breast (e.g., upper inner breast quadrant medial border) where the breast tissue terminates and joins the flat parasternal area 402, a medial uppermost margin of the left breast (e.g., upper inner breast quadrant medial border) where the breast tissue terminates and joins the flat parasternal area 403, a superior border of the right areola 404, a superior border of the left areola 405, a superior border of the right nipple 406, a superior border of the left nipple 407, a lateral margin of the right breast 408, a lateral border of the right areola 409, a center of the right nipple 410, a medial border of the right areola 411, a medial border of the left areola 412, a center of the left nipple 413, a lateral border of the left areola 414, a lateral margin of the left breast 415, a central inferior-most margin of the right breast 416, a central inferior-most margin of the left breast 417, and/or a center of the umbilicus 418. From a right profile view and as illustrated in FIG. 7U, the anatomic landmarks may include, but are not limited to, the lowermost inferior border of the right clavicle 419, superior border of the right areola 420, central base of the right nipple where the nipple base joins the areola 421, anterior most margin of the right breast (e.g., excluding right nipple projection from breast) 422, inferior most central margin of the right breast 423, anterior most margin of the right shoulder 429, and/or the right olecranon 430. From a left profile view and as illustrated in FIG. 7T, the anatomic landmarks may include, but are not limited to, the lowermost inferior border of the left clavicle 424, superior border of the left areola 425, central base of the left nipple where the nipple base joins the areola 426, anterior most margin of the left breast (e.g., excluding the left nipple projection from breast) 427, inferior most central margin of the left breast 428, anterior most margin of the left shoulder 431, and/or the left olecranon 432.

According to an embodiment of the present invention, the overlay retrieval and analysis module is configured to retrieve one or more overlays to be used with the image data received and processed by the image capture and processing module to perform analysis of the breast features identified thereby in order to provide a measurement of beauty and/or attractiveness. Measurement and analysis methodology may be similar to the methodology described above. In at least some exemplary embodiments of the present invention, the overlay retrieval and analysis module may be configured to retrieve one or more overlays from a local or remote datastore (e.g., database, file repository, cloud service) for use in analysis of the breast features identified in the image data. Analysis of the overlays and identified breast features is also generally handled by the overlay retrieval and analysis module. One of ordinary skill in the art would appreciate that the functional modeling of these components as separate is merely one embodiment, and embodiments of the present invention could combine or further separate and individualize each module or component as may be involved in various implementations, and embodiments of the present invention are contemplated for use with any such implementation.

The cloud integration module described above may be used in conjunction with exemplary embodiments involving imaging and analyzing a human breast area.

According to an exemplary embodiment of the present invention, the system is configured to process image data, whether captured by the system or provided to it via an external source, in such a manner as to identify specific breast features of an individual depicted in the image data. In the exemplary embodiment, once the breast features are identified, the system is further configured to use specific overlays detailed herein, known as breast grids, in order to analyze proportions (e.g., areas) between the specific breast features to identify a measurement of beauty or attractiveness based on these analyzed proportions. In other embodiments, additional or alternative overlays may be used in order to analyze the identified breast features. The measurement of beauty or attractiveness is generally based on a plurality of breast feature anatomical anchor points in a specific overlay and the resultant presence or absence of a golden ratio relationship in the quadrilaterals created using those specific anchor points.

According to an exemplary embodiment of the present invention, horizontal and vertical grid line anchor points based on specifically defined human breast anatomical points dictate the precise placement (location) of the given grid lines on or near a human breast. In order for any given breast grid to be considered a successful fit, the grid lines may be first be placed on the specified anatomic anchor points for that particular breast grid. The resulting grid lines will create multiple quadrilaterals. The next step is to analyze the relationship between the created quadrilaterals. For a "successful fit" in any given breast grid, a predetermined ratio (e.g., the ratio of 1:1.618) exists between the created quadrilaterals within the grid itself as specified in the figures provided (FIGS. 7A-Y). If this golden ratio relationship does not exist between the quadrilaterals created based on the anatomical anchor points for any given human breast and/or breast area, then that particular breast grid is considered an unsuccessful or "failed fit". After analysis of a human breast and/or breast area with multiple breast grids, the more "successful fit" grids a breast and/or breast area possesses, the more golden ratio (1:1.618) relationships exists within the features of that particular human breast and/or breast area. An attractive or beautiful breast and/or breast area will have many "successful fits". This system and method can be used to gauge beauty and harmony within a given human breast and/or breast area.

As noted above in the brief description of the drawings, FIGS. 7A-R and FIGS. 7V-Y show 22 breast grids. Breast grids 1, 2, 3, 4, 5, 6, 13, 14, 19, 20, 21 and 22 include vertically arranged quadrilaterals. Breast grids 9, 10, 11, and 12 include horizontally arranged quadrilaterals. Breast grids 7, 8, 15, 16, 17, and 18 are combination grids including both horizontally arranged as well as vertically arranged quadrilaterals within the same grid. Breast grids 7,8,15 and 16 include a golden spiral within the breast grids.

Turning now to FIGS. 7A-R and FIGS. 7V-Y, depictions of the exemplary breast grids can be found. A description of each breast grid is detailed below. In exemplary embodiments of the present invention, the breast grids are comprised of a plurality of anchor points corresponding to breast features that are to be identified in the image data. The anchor points are configured such that when aligned with the breast features, two or more quadrilaterals are formed and these quadrilaterals may be compared in proportion to one another, for example with respect to the golden ratio, in order to identify beauty or attractiveness, particularly with respect to the particular breast features utilized with the anchor points. In exemplary embodiments, a grid forms two or more pairs of quadrilaterals. In four of the breast grids, a golden spiral within the quadrilaterals is also involved to identify beauty and attractiveness with respect to breast features.

Turning to FIG. 7A, breast grid 1 is depicted. Breast grid 1 may be a grid with four anchor points that determine a suitable location of the three horizontal grid lines of breast grid 1. The first horizontal anchor point may be the base of jugular suprasternal notch 401 that forms the upper horizontal line, the second and third anchor points may be the superior border of the right and left nipples 406 and 407 that form the middle horizontal line, and a fourth horizontal anchor point may be the center of the umbilicus 418 that forms the lower horizontal line. These four anchor points form two vertically arranged quadrilaterals, with a first quadrilateral formed between the jugular suprasternal notch and the superior border of the right and left nipples and a second quadrilateral formed between the superior border of the right and left nipples and the center of the umbilicus. The first quadrilateral is related to the second quadrilateral by any suitable ratio as disclosed for example herein (e.g., the golden ratio 1:1.618 as labeled in FIG. 7A).

Turning to FIG. 7B, breast grid 2 is depicted. Breast grid 2 may be a grid with three anchor points that determine a suitable location of the three horizontal grid lines of breast grid 2. The first horizontal anchor point may be the base of the jugular suprasternal notch 401 that forms the upper horizontal line, the second anchor point may be the superior border of the right nipple 406 that forms the middle horizontal line, and the third horizontal anchor point may be the center of the umbilicus 418 that forms the lower horizontal line. These three anchor points may form two vertically arranged quadrilaterals, with the first quadrilateral formed between the jugular suprasternal notch and the superior border of the right nipple and the second quadrilateral formed between the superior border of the right nipple and the center of the umbilicus. The first quadrilateral is related to the second quadrilateral by any suitable ratio as disclosed for example herein (e.g., the golden ratio 1:1.618 as labeled in FIG. 7B).

Turning to FIG. 7C, breast grid 3 is depicted. Breast grid 3 may be a grid with three anchor points that determine a suitable location of the three horizontal grid lines of breast grid 3. The first horizontal anchor point may be the base of the jugular suprasternal notch 401 that forms the upper horizontal line, the second anchor point may be the superior border of the left nipple 407 that forms the middle horizontal line, and the third horizontal anchor point may be the center of the umbilicus 418 that forms the lower horizontal line. These three anchor points form two vertically arranged quadrilaterals, with the first quadrilateral formed between the jugular suprasternal notch and the superior border of the left nipple and the second quadrilateral formed between the superior border of the left nipple and the center of the umbilicus. The first quadrilateral is related to the second quadrilateral by any suitable ratio as disclosed for example herein (e.g., the golden ratio 1:1.618 as labeled in FIG. 7C).

Turning to FIG. 7D, breast grid 4 is depicted. Breast grid 4 may be a grid with five anchor points that determine a suitable location of the three horizontal grid lines of breast grid 4. The first horizontal anchor point may be the base of the jugular suprasternal notch 401 that forms the upper horizontal line. The second and third anchor points may be the superior border of the right and left areolas 404 and 405 that form the middle horizontal line. The fourth and fifth anchor points may be the inferior margin of the right and left breast 416 and 417 that form the lower horizontal line. Two vertically arranged quadrilaterals are formed. In this overlay, the first quadrilateral is formed between the jugular suprasternal notch and the superior border of the right and left areolas. The second quadrilateral is formed between the superior border of the right and left areolas and the inferior margin of the right and left breasts. The first quadrilateral is related to the second quadrilateral by any suitable ratio as disclosed for example herein (e.g., the ratio 1.618:1 as labeled in FIG. 7D).

Turning to FIG. 7E, breast grid 5 is depicted. Breast grid 5 may be a grid with three anchor points that determine a suitable location of the three horizontal grid lines of breast grid 5. The first horizontal anchor point may be the base of the jugular suprasternal notch 401 that forms the upper horizontal line. The second anchor point may be the superior margin of the right areola 404 that forms the middle horizontal line. The third anchor point may be the inferior margin of the right breast 416 that forms the lower horizontal line. Two vertically arranged quadrilaterals are formed. In this overlay, the first quadrilateral is formed between the jugular suprasternal notch and the superior border of the right areola. The second quadrilateral is formed between the superior border of the right areola and the inferior margin of the right breast. The first quadrilateral is related to the second quadrilateral by any suitable ratio as disclosed for example herein (e.g., the ratio 1.618:1 as labeled in FIG. 7E).

Turning to FIG. 7F, breast grid 6 is depicted. Breast grid 6 may be a grid with three anchor points that determine a suitable location of the three horizontal grid lines of breast grid 6. The first horizontal anchor point may be the base of the jugular suprasternal notch 401 that forms the upper horizontal line. The second anchor point may be the superior margin of the left areola 405 that forms the middle horizontal line. The third anchor point may be the inferior margin of the right breast 417 that forms the lower horizontal line. Two vertically arranged quadrilaterals are formed. In this overlay, the first quadrilateral is formed between the jugular suprasternal notch and the superior border of the left areola. The second quadrilateral is formed between the superior border of the left areola and the inferior margin of the right breast. The first quadrilateral is related to the second quadrilateral by any suitable ratio as disclosed for example herein (e.g., the ratio 1.618:1 as labeled in FIG. 7F).

Turning to FIG. 7G, breast grid 7 is depicted. Breast grid 7 may be a grid that is based on a series of golden rectangles with a golden spiral located within this series of golden rectangles. A golden rectangle may be a rectangle having side lengths that are in the golden ratio. The ratio of the long side to short side of the golden rectangle may be any suitable ratio as disclosed for example herein (e.g., 1.618:1). When a square shape is removed from the outer (largest) golden rectangle, the remainder is another golden rectangle that is the same aspect ratio but smaller in overall size. Sequential square removal may be started from the uppermost part of the outer vertically oriented golden rectangle and may be repeated six times total starting from the outer golden rectangle in a clockwise sequence to create the layout of the golden rectangles within breast grid 7. The golden spiral is a logarithmic spiral whose growth factor may be 1.618 and follows this series of golden rectangles within breast grid 7. The golden spiral gets wider, or further from its origin, by a factor of 1.618 for every quarter turn that it makes. The golden spiral of breast grid 7 may originate from the superolateral corner of the smallest square within grid 7, and may spiral counterclockwise. The spiral tail may ultimately terminate in the superolateral corner of the largest square within grid 7. Three anchor points may determine both a suitable location of three outer golden rectangle sides for grid 7 as well as the overall size of the outer golden rectangle of grid 7. The medial (e.g., inner) vertical long side of the outer golden rectangle may be determined by an anchor point defined by the medial-most (e.g., inner) margin of the right breast 402. The lowermost side of the outer golden rectangle may be determined by an anchor point defined by the central inferior-most margin of the right breast 416. The lateral (outer) vertical long side of the outer golden rectangle may be determined by an anchor point defined by the lateral-most (outer) margin of the right breast 408. Overlay placement of grid 7 based on these three anchor points on a frontal right breast image allows evaluation of right sided breast anatomy that includes evaluation of the lower pole curvature of the right breast as it relates to the golden spiral, as well as the location of the medial border of the right areola 411 and the location of the right nipple 410 as labeled in FIG. 7G.

Turning to FIG. 7H, breast grid 8 is depicted. Breast grid 8 may be a grid that is based on a series of golden rectangles with a golden spiral located within this series of golden rectangles. A golden rectangle may be a rectangle having side lengths that are in the golden ratio. The ratio of the long side to short side of the golden rectangle may be any suitable ratio as disclosed for example herein (e.g., 1.618:1). When a square shape is removed from the outer (largest) golden rectangle, the remainder may be another golden rectangle that is the same aspect ratio but smaller in overall size. Sequential square removal may be started from the uppermost part of the outer vertically oriented golden rectangle and may be repeated six times total starting from the outer golden rectangle in a counterclockwise sequence to create the layout of the golden rectangles within breast grid 8. The golden spiral may be a logarithmic spiral having a growth factor of 1.618 and that follows this series of golden rectangles within grid 8. The golden spiral gets wider, or further from its origin, by a factor of 1.618 for every quarter turn that it makes. The golden spiral of breast grid 8 may originate from the superolateral corner of the smallest square within grid 8. The golden spiral may spiral clockwise, and the spiral tail may ultimately terminate in the superolateral corner of the largest square within grid 8. Three anchor points may determine both a suitable location of three outer golden rectangle sides for grid 8 as well as the overall size of the outer golden rectangle of grid 8. The medial (e.g., inner) vertical long side of the outer golden rectangle may be determined by an anchor point defined by the medial-most (e.g., inner) margin of the left breast 403. The lowermost side of the outer golden rectangle may be determined by an anchor point defined by the central inferior-most margin of the left breast 417. The lateral (e.g., outer) vertical long side of the outer golden rectangle may be determined by an anchor point defined by the lateral-most (e.g., outer) margin of the left breast 415. Overlay placement of grid 8 based on these three anchor points on a frontal left breast image allows evaluation of left sided breast anatomy that includes evaluation of the lower pole curvature of the left breast as it relates to the golden spiral, as well as the location of the medial border of the left areola 412 and the location of the left nipple 413 as labeled in FIG. 7H.

Turning to FIG. 7I, breast grid 9 is depicted. Breast grid 9 may be a grid with three anchor points that determine a suitable location of the three vertical grid lines of breast grid 9. The first anchor point may be the medial-most (inner) margin of the right breast 402, the second anchor point may be the medial (inner) border of the right areola 411 and the third anchor point may be the lateral-most (outer) margin of the right breast 408. Two horizontally arranged quadrilaterals are formed. In this overlay, the first quadrilateral (e.g., larger portion of the golden ratio—1.618) is formed between the medial margin of the right breast and the medial border of the right areola. The second quadrilateral (e.g., smaller portion of the golden ratio—1.0) is formed between the medial border of the right areola and the lateral-most margin of the right breast.

Turning to FIG. 7J, breast grid 10 is depicted. Breast grid 10 may be a grid with three anchor points that determine a suitable location of the three vertical grid lines of breast grid 10. The first anchor point may be the medial-most (inner) margin of the left breast 403, the second anchor point may be the medial (inner) border of the left areola 412 and the third anchor point being the lateral-most (outer) margin of the left breast 415. Two horizontally arranged quadrilaterals are formed. In this overlay, the first quadrilateral (e.g., larger portion of the golden ratio—1.618) is formed between the medial margin of the left breast and the medial border of the left areola. The second quadrilateral (e.g., smaller portion of the golden ratio—1.0) is formed between the medial border of the left areola and the lateral-most margin of the left breast.

Turning to FIG. 7K, breast grid 11 is depicted. Breast grid 11 may be a grid composed of three horizontally arranged quadrilaterals. The outer two quadrilaterals of this grid may be related to the central quadrilateral by the ratio 1.618:1. To set the overall width of this grid, two anchor points are used to determine a location of the two outermost vertical lines of this grid. The first anchor point may be the medial-most (inner) margin of the right breast to set the inner vertical line location and the second anchor point being the lateral-most (outer) margin of the right breast to set the outermost vertical line location. The two vertical lines created by these two anchor points set the overall width of grid 11. While maintaining this set width, the grid overlay is then hovered over the right areola to see if the diameter of the right areola (horizontal distance between 409 and 411) corresponds to the central quadrilateral width of grid 11.

Turning to FIG. 7L, breast grid 12 is depicted. Breast grid 12 may be a grid composed of three horizontally arranged quadrilaterals. The outer two quadrilaterals of this grid may be related to the central quadrilateral by the ratio 1.618:1. To set the overall width of this grid, two anchor points are used to determine the location of the two outermost vertical lines of this grid. The first anchor point may be the medial-most (inner) margin of the left breast to set the inner vertical line location and the second anchor point may be the lateral-most (outer) margin of the left breast to set the outermost vertical line location. The two vertical lines created by these two anchor points set the overall width of grid 12. While maintaining this set width, the grid overlay is then hovered over the left areola to see if the diameter of the left areola (horizontal distance between 412 and 414) corresponds to the central quadrilateral width of grid 12.

Turning to FIG. 7M, breast grid 13 is depicted. Breast grid 13 may be a profile breast grid composed of two vertically arranged quadrilaterals. Three anchor points may determine a suitable location of the three horizontal grid lines of grid 13. The first anchor point may be the inferior lowermost border of the clavicle at the anterior profile skin margin 419 which forms the uppermost horizontal line, the second anchor point may be the superior border of the right areola 420 which forms the middle horizontal line, and the third anchor point may be the lowermost inferior margin of the right breast 423 from profile view which forms the lowermost horizontal line. The first quadrilateral is formed between the inferior border of the clavicle and the superior border of the areola. The second quadrilateral is formed between the superior border of the areola and the inferior margin of the right breast. The first quadrilateral is related to the second quadrilateral by any suitable ratio as disclosed for example herein (e.g., the golden ratio 1.618:1).

Turning to FIG. 7N, breast grid 14 is depicted. Breast grid 14 may be a profile breast grid composed of two vertically arranged quadrilaterals. Three anchor points may determine a suitable location of the three horizontal grid lines of grid 14. The first anchor point may be the inferior lowermost border of the clavicle at the anterior profile skin margin 424 which forms the uppermost horizontal line, the second anchor point may be the superior border of the left areola 425 which forms the middle horizontal line, and the third anchor point may be the lowermost inferior margin of the left breast 428 from profile view which forms the lowermost horizontal line. The first quadrilateral is formed between the inferior border of the clavicle and the superior border of the areola. The second quadrilateral is formed between the superior border of the areola and the inferior margin of the left breast. The first quadrilateral is related to the second quadrilateral by any suitable ratio as disclosed for example herein (e.g., the golden ratio 1.618:1).

Turning to FIG. 7O, breast grid 15 is depicted. Breast grid 15 may be a profile breast grid that is based on a series of golden rectangles with a golden spiral located within this series of golden rectangles. A golden rectangle may be a rectangle having side lengths that are in the golden ratio. The ratio of the long side to short side of the golden rectangle may be 1.618:1. When a square shape is removed from the outer golden rectangle, the remainder may be another golden rectangle that is the same aspect ratio but smaller in overall size. Sequential square removal may be started from the uppermost part of the outer (largest) vertically oriented golden rectangle and may be repeated three times total starting from the outer golden rectangle in a counterclockwise sequence to create breast grid 15. The golden spiral may be a logarithmic spiral having a growth factor of 1.618 and may follow this series of golden rectangles within grid 15. The golden spiral may become wider, or further from its origin, by a factor of 1.618 for every quarter turn that it makes. The golden spiral may originate from the upper anterior corner of the smallest square within grid 15 and its tail may terminate in the upper anterior most corner of the largest golden rectangle away from a subject's image. Two anchor points may determine both a suitable location of upper and lower horizontal short side positions of the outer golden rectangle for grid 15 as well as the overall size of the outer golden rectangle of grid 15. The first anchor point may be the lowermost inferior border of the clavicle at the anterior profile skin margin 419 which forms the uppermost horizontal short side of the rectangle. The second anchor point may be the lowermost inferior margin of the right breast 423 which forms the lowermost horizontal short side of the rectangle. With the overall grid size set by these two anchor points, the grid is then hovered over the right breast to set the golden spiral over the central inferior most anchor point of the lower right breast margin. The part of the golden spiral that is lined up with the central inferior most anchor point of the right breast is the posteriorly directed takeoff point of the golden spiral curve as it leaves the lowermost outer rectangle short side. Overlay placement of grid 15 based on these anchor points of a right breast profile image allows evaluation of right sided breast anatomy that includes evaluation of right breast anterior projection 422, overall breast size and lower breast curvature as it relates to the golden spiral within grid 15.

Turning to FIG. 7P, breast grid 16 is depicted. Breast grid 16 may be a profile breast grid that is based on a series of golden rectangles with a golden spiral located within this series of golden rectangles. A golden rectangle may be a rectangle having side lengths that are in the golden ratio. The ratio of the long side to short side of the golden rectangle may be 1.618:1. When a square shape is removed from the outer golden rectangle, the remainder may be another golden rectangle that is the same aspect ratio but smaller in overall size. Sequential square removal may be started from the uppermost part of the outer (largest) vertically oriented golden rectangle and may be repeated three times total starting from the outer golden rectangle in a clockwise sequence to create breast grid 16. The golden spiral may be a logarithmic spiral having a growth factor of 1.618 and may follow this series of golden rectangles within grid 16. The golden spiral may become wider, or further from its origin, by a factor of 1.618 for every quarter turn that it makes. The golden spiral may originate from the upper anterior corner of the smallest square within grid 16 and its tail may terminate in the upper anterior most corner of the largest golden rectangle away from a subject's image. Two anchor points determine both the suitable location of upper and lower horizontal short side positions of the outer golden rectangle for grid 16 as well as the overall size of the outer golden rectangle of grid 16. The first anchor point may be the lowermost inferior border of the clavicle at the anterior profile skin margin 424 which forms the uppermost horizontal short side of the rectangle. The second anchor point may be the lowermost inferior margin of the right breast 428 which forms the lowermost horizontal short side of the rectangle. With the overall grid size set by these two anchor points, the grid is then hovered over the left breast to set the golden spiral over the central inferior most anchor point of the lower left breast margin. The part of the golden spiral that is lined up with the central inferior most anchor point of the left breast is the posteriorly directed takeoff point of the golden spiral curve as it leaves the lowermost outer rectangle short side. Overlay placement of grid 16 based on these anchor points of a left breast profile image allows evaluation of left sided breast anatomy that includes evaluation of left breast anterior projection 427, overall breast size and lower breast curvature as it relates to the golden spiral within grid 16.

Turning to FIG. 7Q, breast grid 17 is depicted. Breast grid 17 may be a profile breast grid that is based on a series of golden rectangles. A golden rectangle may be a rectangle having side lengths that are in the golden ratio. The ratio of the long side to short side of the golden rectangle may be 1.618:1. When a square shape is removed from the outer largest golden rectangle, the remainder may be another golden rectangle that is the same aspect ratio but smaller in overall size. Sequential square removal may be started from the uppermost part of the largest outer vertically oriented golden rectangle and may be repeated three times total starting from the outer golden rectangle in a counterclockwise sequence to create the multiple golden rectangle layout of breast grid 17. This may create a total of four golden rectangles. Two anchor points may determine both a suitable location of upper and lower horizontal short side positions of the outer largest golden rectangle for grid 17 as well as the overall size of the outer largest golden rectangle of grid 17. The first anchor point may be the lowermost inferior border of the clavicle at the anterior profile skin margin 419 which forms the uppermost horizontal short side of the rectangle. The second anchor point may be the lowermost inferior margin of the right breast 423 which forms the lowermost horizontal short side of the rectangle. With the overall grid size set by these two anchor points, the grid is then hovered over the right breast to set the anterior vertical side of the outer golden rectangle to the most anterior projecting part of the right breast profile that does not include the projection of the nipple as part of the profile 422. Overlay placement of grid 17 based on these anchor points of a right breast profile image allows evaluation of right sided breast anatomy that includes evaluation of right breast nipple base position within the smallest horizontally oriented golden rectangle within grid 17.

Turning to FIG. 7R, breast grid 18 is depicted. Breast grid 18 may be a profile breast grid that is based on a series of golden rectangles. A golden rectangle may be a rectangle having side lengths that are in the golden ratio. The ratio of the long side to short side of the golden rectangle may be 1.618:1. When a square shape is removed from the outer golden rectangle, the remainder may be another golden rectangle that is the same aspect ratio but smaller in overall size. Sequential square removal may be started from the uppermost part of the largest outer vertically oriented golden rectangle and may be repeated three times total starting from the largest outer golden rectangle in a clockwise sequence to create the multiple golden rectangle layout of breast grid 18. This may create a total of four golden rectangles. Two anchor points may determine both a suitable location of upper and lower horizontal short side positions of the outer golden rectangle for grid 18 as well as the overall size of the outer golden rectangle of grid 18. The first anchor point may be the lowermost inferior border of the clavicle at the anterior profile skin margin 424 which forms the uppermost horizontal short side of the rectangle. The second anchor point may be the lowermost inferior margin of the right breast which forms the lowermost horizontal short side of the rectangle 428. With the overall grid size set by these two anchor points, the grid is then hovered over the left breast to set the anterior vertical side of the outer golden rectangle to the most anterior projecting part of the left breast profile that does not include the projection of the nipple off of the breast as part of the profile 427. Overlay placement of grid 18 based on these anchor points of a left breast profile image allows evaluation of left sided breast anatomy that includes evaluation of left breast nipple base position within the smallest horizontally oriented golden rectangle within grid 18.

In at least some exemplary embodiments, the ratio of the long side to the short side of the exemplary rectangles (e.g., golden rectangles) may be 1.618:1. It is also contemplated that the ratio of the long side to short side of any exemplary rectangle may be any desired or suitable ratio. For example, it is contemplated that the ratio may be any desired or predetermined ratio between 1:1 and 1:2, any desired ratio between 1:1 and 1:5, any desired ratio between 1:1.4 and 1:1.8, any desired ratio between 1:1.5 and 1:1.7, any desired ratio between 1:1.55 and 1:1.69, about 1:1.6, and/or any other suitable ratio.

Figure 7V:
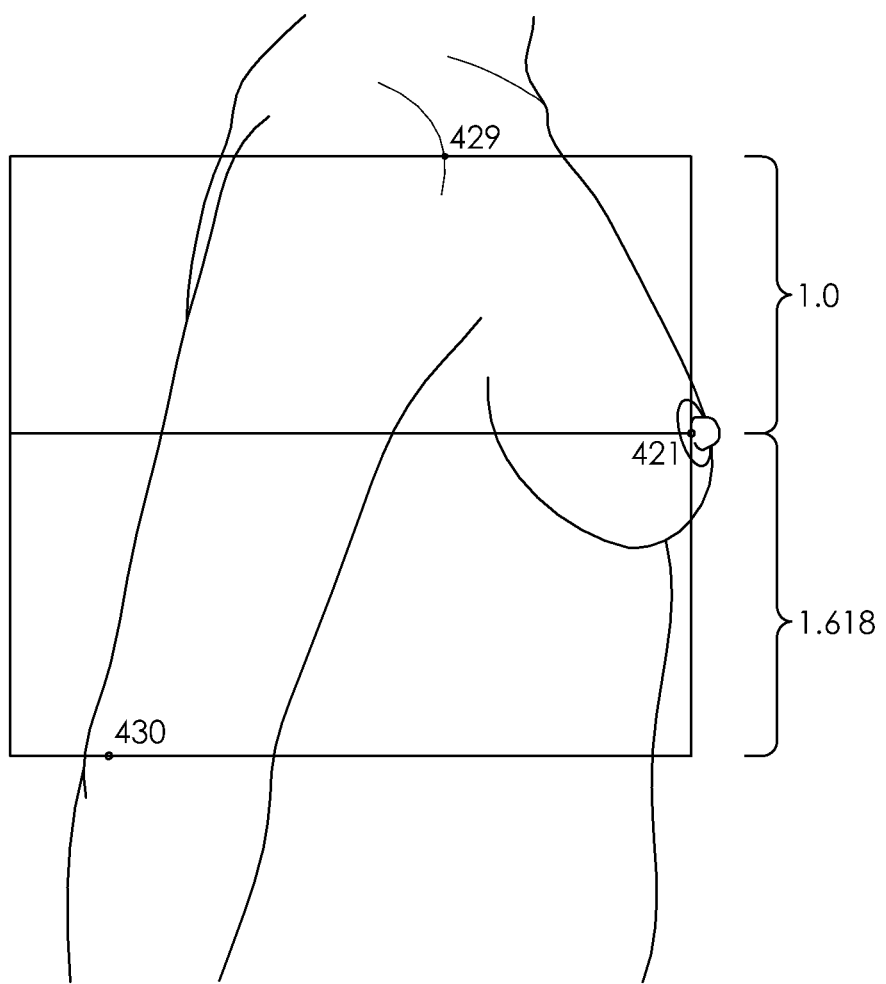
FIG. 7V illustrates an exemplary portrayal of a breast grid 19, shown overlaid on representations of a human breast area situated in a profile position, in accordance with an embodiment of the present invention.

Turning to FIG. 7V, breast grid 19 is depicted. Breast grid 19 may be a grid with three anchor points that determine a suitable location of the three horizontal grid lines of breast grid 19. The first horizontal anchor point may be an anterior most margin of the right shoulder 429 that forms an upper horizontal line, the second anchor point may be the central base of the right nipple where the nipple base joins the areola 421, and the third horizontal anchor point may be the right olecranon 430. These three anchor points may form two vertically arranged quadrilaterals, with the first quadrilateral formed between the anterior most margin of the right shoulder 429 and the central base of the right nipple where the nipple base joins the areola 421. The second quadrilateral may be formed between the central base of the right nipple where the nipple base joins the areola 421 and the right olecranon 430. The first quadrilateral may be related to the second quadrilateral by any suitable ratio as disclosed for example herein (e.g., the golden ratio 1:1.618 as labeled in FIG. 7V).

Figure 7W:
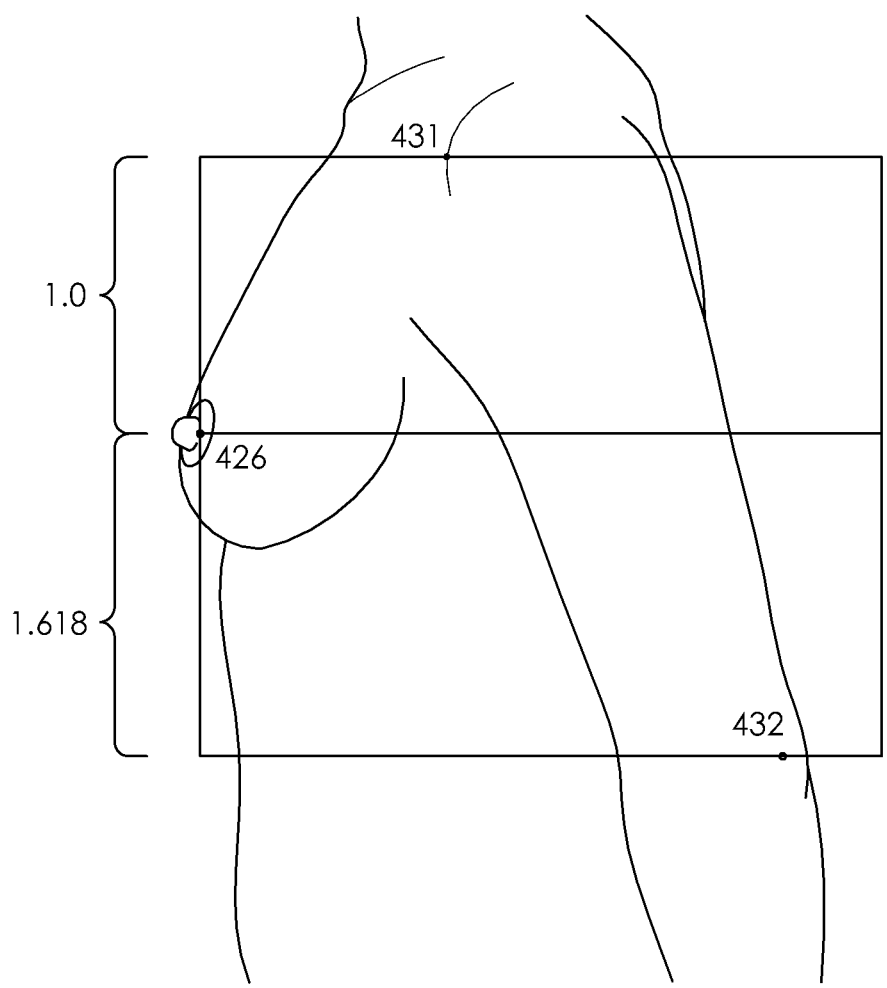
FIG. 7W illustrates an exemplary portrayal of a breast grid 20, shown overlaid on representations of a human breast area situated in a profile position, in accordance with an embodiment of the present invention.

Turning to FIG. 7W, breast grid 20 is depicted. Breast grid 20 may be a grid with three anchor points that determine a suitable location of the three horizontal grid lines of breast grid 20. The first horizontal anchor point may be an anterior most margin of the left shoulder 431 that forms an upper horizontal line, the second anchor point may be a central base of the left nipple where the nipple base joins the areola 426, and the third horizontal anchor point may be a left olecranon 432. These three anchor points may form two vertically arranged quadrilaterals, with the first quadrilateral formed between the anterior most margin of the left shoulder 431 and the central base of the left nipple where the nipple base joins the areola 426. The second quadrilateral may be formed between the central base of the left nipple where the nipple base joins the areola 426 and the left olecranon 432. The first quadrilateral may be related to the second quadrilateral by any suitable ratio as disclosed for example herein (e.g., the golden ratio 1:1.618 as labeled in FIG. 7W).

Figure 7X:
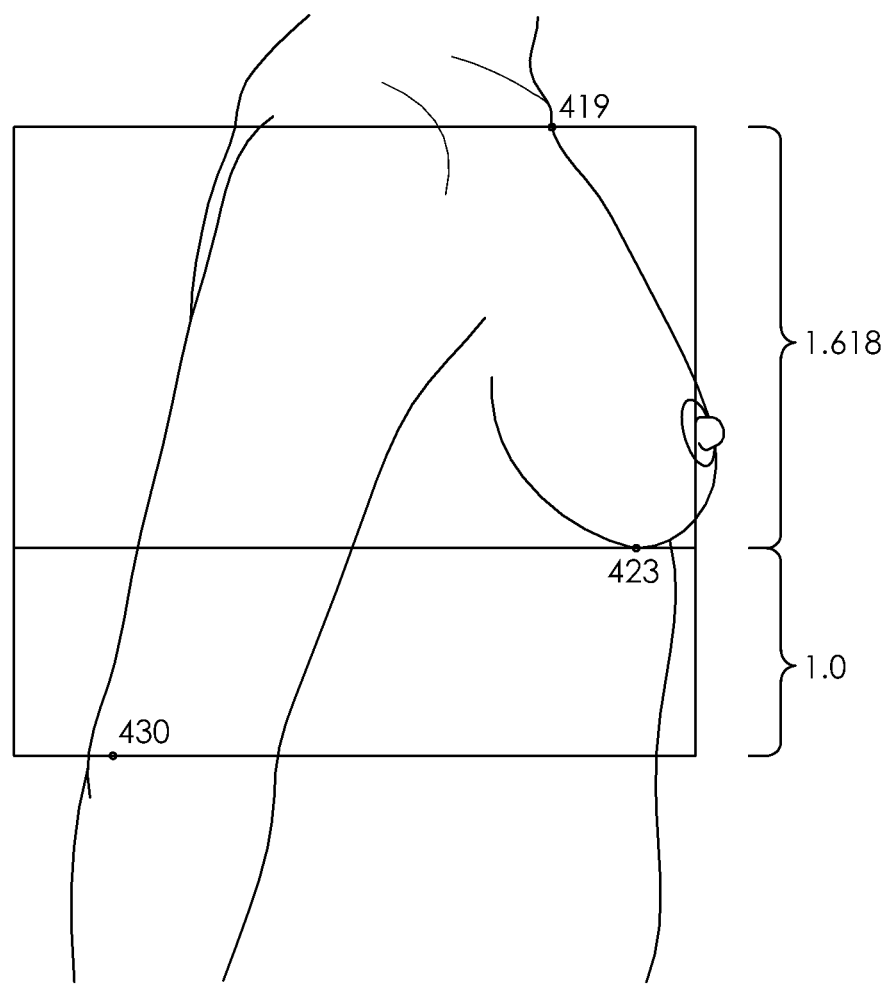
FIG. 7X illustrates an exemplary portrayal of a breast grid 21, shown overlaid on representations of a human breast area situated in a profile position, in accordance with an embodiment of the present invention.
Figure 7Y:
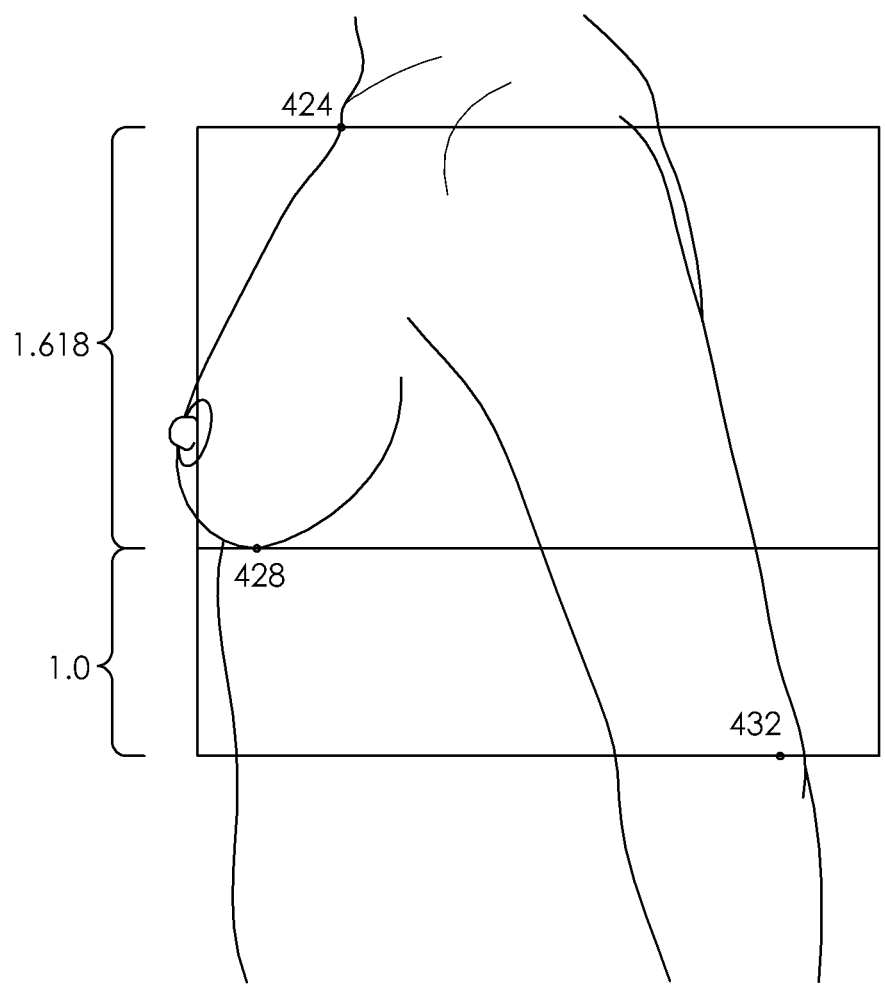
FIG. 7Y illustrates an exemplary portrayal of a breast grid 22, shown overlaid on representations of a human breast area situated in a profile position, in accordance with an embodiment of the present invention.

Turning to FIG. 7X, breast grid 21 is depicted. Breast grid 21 may be a grid with three anchor points that determine a suitable location of the three horizontal grid lines of breast grid 21. The first horizontal anchor point may be the lowermost inferior border of the right clavicle 419 that forms the upper horizontal line, the second anchor point may be the inferior lowermost central margin of the right breast 423, and the third horizontal anchor point may be the right olecranon 430. These three anchor points may form two vertically arranged quadrilaterals, with the first quadrilateral formed between the lowermost inferior border of the right clavicle 419 and the inferior lowermost central margin of the right breast 423. The second quadrilateral may be formed between the inferior lowermost central margin of the right breast 423 and the right olecranon 430. The first quadrilateral may be related to the second quadrilateral by any suitable ratio as disclosed for example herein (e.g., the golden ratio 1.618:1 as labeled in FIG. 7X).

Turning to FIG. 7Y, breast grid 22 is depicted. Breast grid 22 may be a grid with three anchor points that determine a suitable location of the three horizontal grid lines of breast grid 22. The first horizontal anchor point may be the lowermost inferior border of the left clavicle 424 that forms the upper horizontal line, the second anchor point may be the inferior lowermost central margin of the left breast 428, and the third horizontal anchor point may be the left olecranon 432. These three anchor points may form two vertically arranged quadrilaterals, with the first quadrilateral formed between the lowermost inferior border of the left clavicle 424 and the inferior lowermost central margin of the left breast 428. The second quadrilateral may be formed between the inferior lowermost central margin of the left breast 428 and the left olecranon 432. The first quadrilateral may be related to the second quadrilateral by any suitable ratio as disclosed for example herein (e.g., the golden ratio 1.618:1 as labeled in FIG. 7Y).

Figure 8:
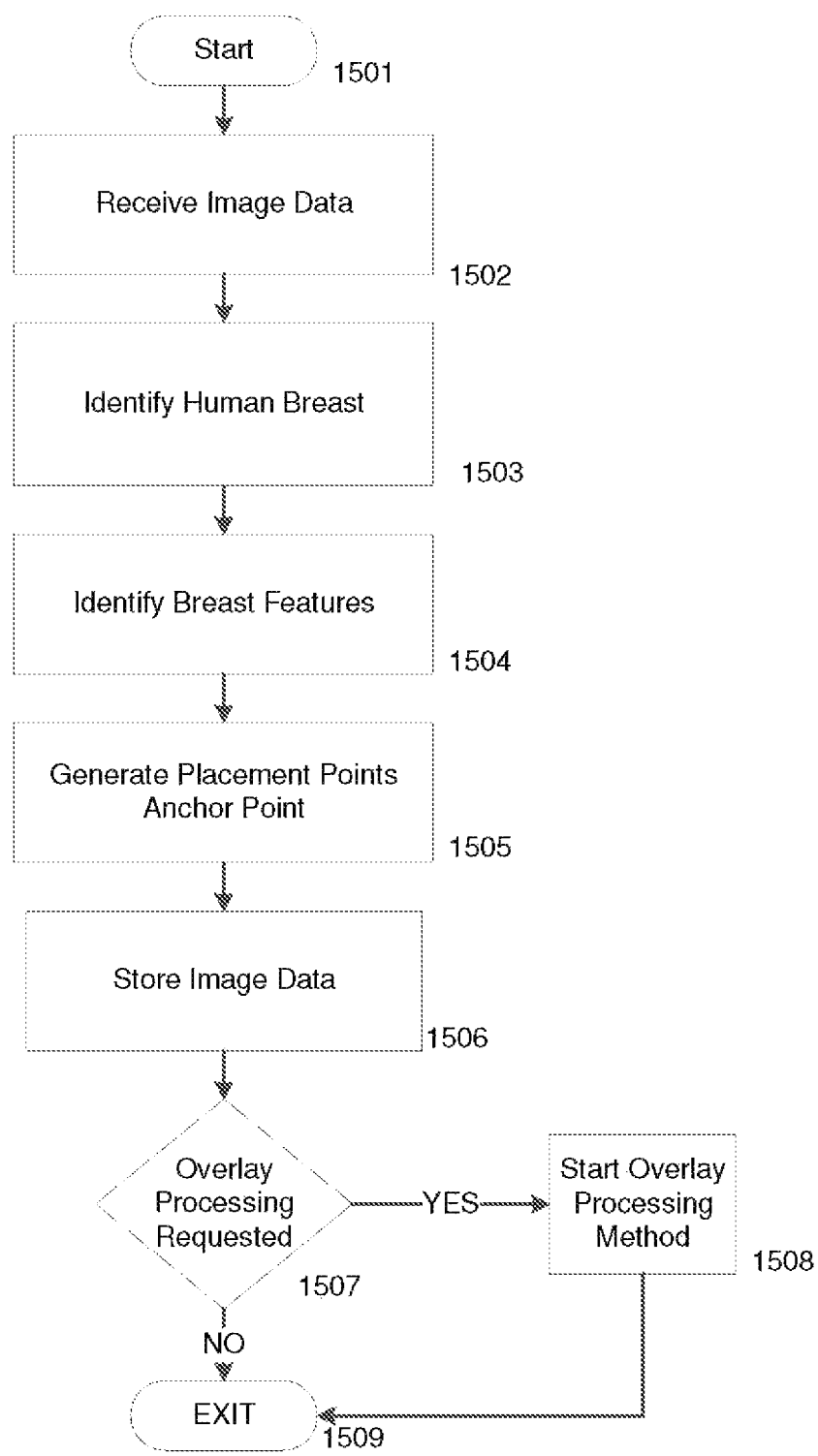
FIG. 8 is an illustration of an exemplary process flow, in accordance with an embodiment of the present invention.

Turning now to FIG. 8, a process flow for receiving and processing image data for use in at least some exemplary embodiments of the system is shown. The process starts at step 1501 with the system being engaged by a user. At step 1502, the system receives image data for processing. As noted elsewhere herein, the image data may be provided in any suitable manner, including, but not limited to, from an image capture device, from a remote computing system, from a local image file, from a video capture device, or any other means for capturing or retrieving usable image data.

At step 1503, the system processes the image data and identifies a human breast in the image data. Identification of a human breast and/or breast area from the image data can be done by any number of methods known to those skilled in the art. For instance, image data can be processed for the identification of breast features and matched against a breast feature database. Method for such analysis include principal component analysis using eigenfaces, Linear Discriminate Analysis, Elastic Bunch Graph Matching using a Fisherface algorithm, Hidden Markov model, Multilinear Subspace Learning using tensor representation, and the neuronal motivated dynamic link matching. In other embodiments, identification of a breast and/or breast area can be done by placing anchor point identifying indicia on various spots on a human breast in an image. Anchor point identifying indicia may include, but are not limited to, adhesive dots, points made on the skin of the human breast and/or breast area with an identifiable property (e.g., visual points made on the skin with a marker, visual points made on the skin with a paint or other pigmented application, non-visual points detectable by a scanning device (e.g., RFID indicia, transparent indicia that react to different wavelengths of light)) or the user simply marking the points on their own image on a computer screen after being presented with specific directions on how to do so properly. One of ordinary skill in the art would appreciate that there are numerous types of anchor point identifying indicia that could be used with embodiments of the present invention, and embodiments of the present invention are contemplated for use with any appropriate anchor point identifying indicia. Additionally, one of ordinary skill in the art would appreciate that there are numerous methods for identifying a human breast and/or breast area in image data, and embodiments of the present invention are contemplated for use with any such methods. For instance, computer vision systems and/or methods may be utilized to identify and label certain breast anatomic anchor points automatically through machine learning or artificial intelligence means understood in the art.

At step 1504, the system identifies one or more breast and/or breast area features in the image data and identified human breast and/or breast area in said image data. Generally, a plurality of breast and/or breast area features are identified, such identified features correlating with anchor points in one or more grid overlays the image data is to be compared against. Identification of breast and/or breast area features in image data, similar to the identification of the human breast in step 1503, could be handled via any one of numerous methods known in the art. One of ordinary skill in the art would appreciate that there are numerous methods for identifying features in a human breast and/or breast area as identified in image data.

At step 1505, the system generates placement points for each breast and/or breast area feature identified and associates the placement points with the image data. The placement points are points of reference associated with the identified features and are to be used later to allow for alignment of such placement points with one or more (e.g., a plurality) anchor points associated with one or more breast grid overlays.

At step 1506, the system stores the processed image data, including identified human breasts and/or breast areas, breast and/or breast features, and generated placement points. Storage can be done locally, such as on a hard disk drive or other non-transitory storage medium, or remotely, such as on cloud storage or other remote storage system.

At step 1507, the system checks to see if the processed image data is presently requested to be analyzed. If the processed image data is requested to be analyzed, the system proceeds to the overlay processing method (FIG. 9) (Step 1508). Otherwise, the process terminates at step 1509.

Figure 9:
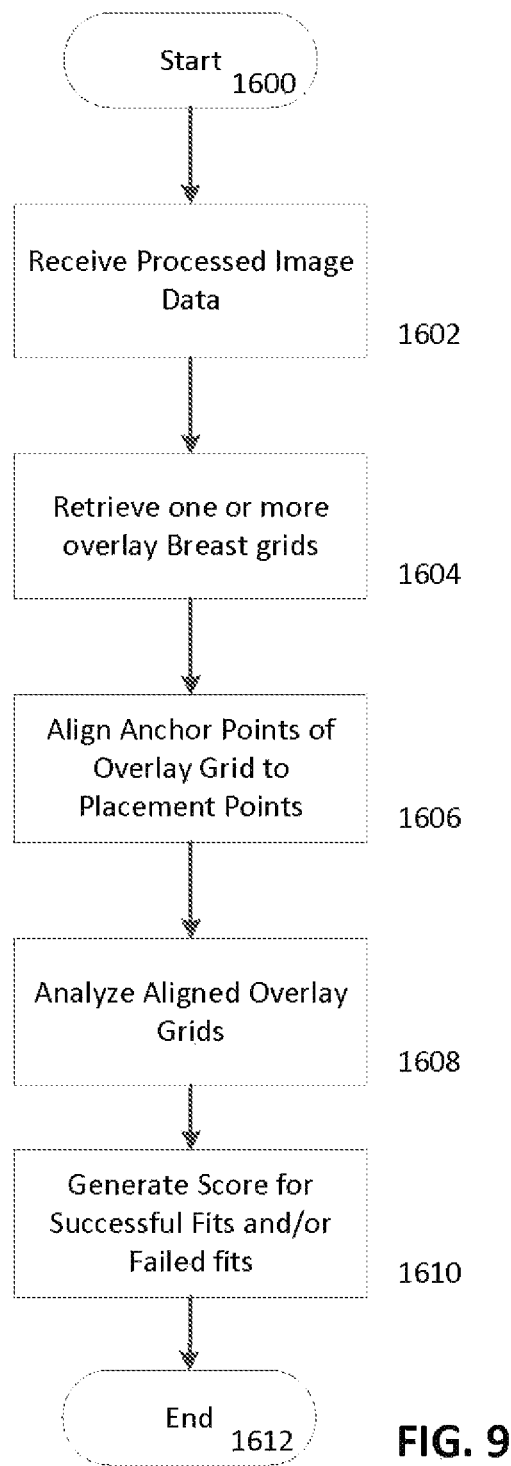
FIG. 9 is an illustration of an exemplary process flow, in accordance with an embodiment of the present invention.

Turning now to FIG. 9, a process for retrieving and aligning image data with one or more overlay breast grids, is shown. The process starts at step 1600 with the system being engaged to analyze processed image data against one or more overlay breast grids. Prior to starting this method, a user may have selected or otherwise identified one or more overlay grids to be used in the analysis. In other embodiments, overlay grids may be selected by the user or automatically selected based on the number and type of identified breast and/or breast area features and placement points.

At step 1602, the system receives the processed image data. In exemplary embodiments, receipt of the processed image data is either by way of retrieval from storage or directly provided by the image capture and processing portion of the system. In other embodiments, the system may receive processed image data from a third party or another local or remote system unrelated to the present system. One of ordinary skill in the art would appreciate that there are numerous methods for the system to receive processed image data, and embodiments of the present invention are contemplated for use with any appropriate method.

At step 1604, the system retrieves one or more overlay breast grids for use in the analysis. In exemplary embodiments of the present invention, the system may retrieve overlay breast grids from local or remote storage. In other embodiments, the overlay grids may be provided by a third party or another local or remote system unrelated to the present system. One of ordinary skill in the art would appreciate that there are numerous methods for the system to retrieve overlay grids, and embodiments of the present invention are contemplated for use with any appropriate method.

Further, in certain embodiments, the selection and retrieval of breast grid overlays may be done in association with the placement points present in the image data. For instance, the system may request and retrieve only those overlay grids that are able to be matched to the image data based on the placement points in the image data and the anchor points suitable by the overlay grids. In other embodiments, the system may be configured to reject the receipt of overlay grids that involve anchor points that are not identified in the placement points associated with the image data.

At step 1606, The system aligns the retrieved overlay grids to the placement points identified and stored along with the processed image data. As noted previously herein, the overlay grids comprise a plurality of anchor points that are used in conjunction with the placement points to align the overlay grids with the human breast and/or breast area identified in the image data. The system may be configured to align multiple overlay grids to the placement points, depending on the placement points available in the image data.

At step 1608, the system analyzes the overlay grids and image data in order to determine their agreement with the golden ratio as defined specifically in a given breast grid. If the golden ratio relationship (e.g., or other desired ratio as described for example above) does not exist between the quadrilateral created, or if the breast anatomy does not fit the golden spiral, based on the anatomical anchor points for any given human breast and/or breast area, then that particular breast grid may be considered an unsuccessful or "failed fit". If the golden ratio exists as defined in a given breast grid, and if the breast anatomy fits the golden spiral within a given breast grid, then one has achieved a "successful fit" score. In other embodiments, scores can be calculated based on the proximity to the golden ratio or golden spiral defined specifically in a given breast grid. For instance, the closer the proportions of the identified breast and/or breast area features are to the golden ratio or golden spiral as outlined in the overlay breast grids, the higher the attractiveness rating score will be. Conversely, the farther away the proportions of the identified breast and/or breast area features are from the golden ratio or golden spiral, the lower the attractiveness score will be. Weighting of these scores can be done in numerous ways. One of ordinary skill in the art would appreciate that there are numerous methods for calculating a relationship/correlation score with matched features, and embodiments of the present invention are contemplated for use with any such method for weighting and scoring relationships/correlations.

At step 1610, the system generates an overall attractiveness rating for the human breast and/or breast area in the image data based on the cumulative scoring for each overlay grid utilized in the analysis. In an exemplary embodiment, the more overlay grids utilized, the more accurate the attractiveness rating will be. In this light, not only can an attractiveness rating be generated, but also a measure of accuracy can be generated as well, with a higher accuracy being associated with an analysis that utilized a greater number of grid overlays (e.g., >5 overlays, >10 overlays) and lower accuracy being associated with an analysis that utilized a lower number of grid overlays (e.g., <5 overlays, <10 overlays). Once the score (and in certain cases, accuracy) is generated, the process terminates at step 1612.

The exemplary disclosed system and method may provide an efficient and effective technique for analyzing a human face or human breast and/or breast area to evaluate beauty and attractiveness of the face or breast area. The exemplary disclosed system and method may provide a reliable and objective technique for determining attractiveness of a human face and/or breast area.

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured, and embodiments of the present invention are contemplated for use with any configuration.

Figure 10:
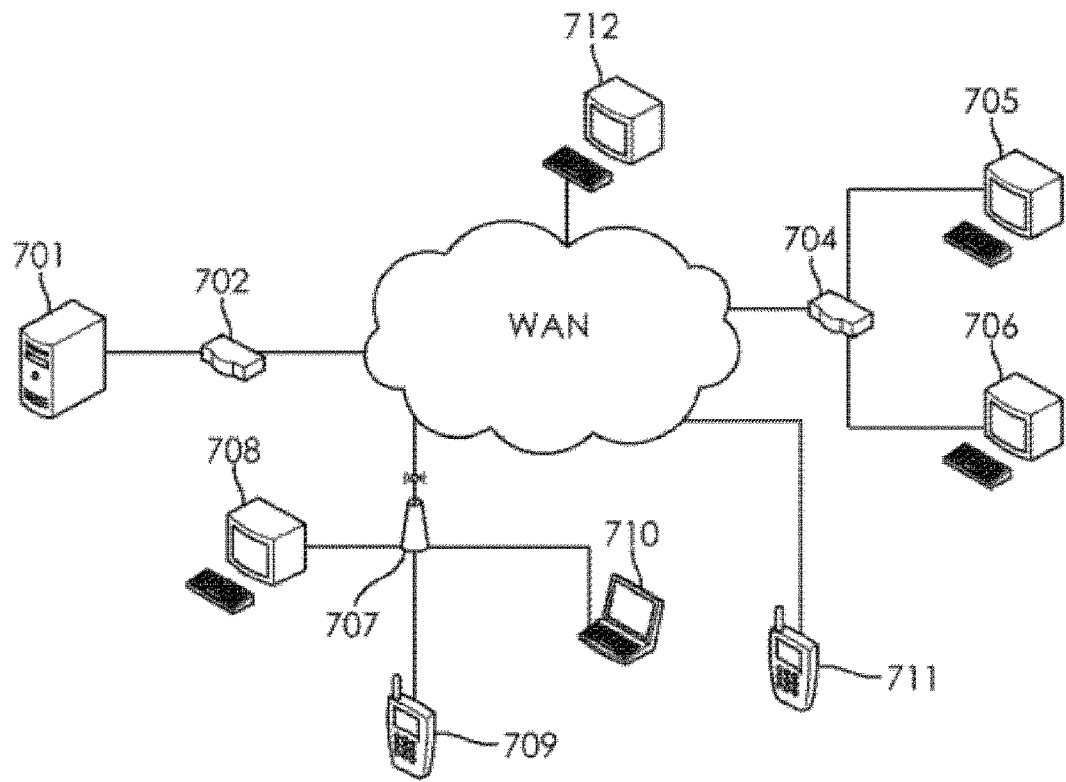
FIG. 10 is an illustration of a network diagram for a cloud based portion of the system, in accordance with an embodiment of the present invention.

Referring to FIG. 10, a schematic overview of a cloud-based system in accordance with an embodiment of the present invention is shown. The cloud-based system is comprised of one or more application servers 703 for electronically storing information used by the system. Applications in the application server 203 may retrieve and manipulate information in storage devices and exchange information through a Network 701 (e.g., the Internet, a LAN, WiFi, Bluetooth, etc.). Applications in server 703 may also be used to manipulate information stored remotely and process and analyze data stored remotely across a Network 701 (e.g., the Internet, a LAN, WiFi, Bluetooth, etc.).

According to an exemplary embodiment, as shown in FIG. 10, exchange of information through the Network 701 may occur through one or more high speed connections. In some cases, high speed connections may be over-the-air (OTA), passed through networked systems, directly connected to one or more Networks 701 or directed through one or more routers 702. Router(s) 702 are completely optional and other embodiments in accordance with the present invention may or may not utilize one or more routers 702. One of ordinary skill in the art would appreciate that there are numerous ways server 703 may connect to Network 701 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 703 via Network 701 or other network in numerous ways. For instance, a component may connect to the system i) through a computing device 712 directly connected to the Network 701, ii) through a computing device 705, 706 connected to the WAN 701 through a routing device 704, iii) through a computing device 708, 709, 710 connected to a wireless access point 707 or iv) through a computing device 711 via a wireless connection (e.g., CDMA, GMS, 3G, 4G) to the Network 701. One of ordinary skill in the art would appreciate that there are numerous ways that a component may connect to server 703 via Network 701, and embodiments of the present invention are contemplated for use with any method for connecting to server 703 via Network 701. Furthermore, server 703 could be comprised of a personal computing device, such as a smartphone, acting as a host for other computing devices to connect to.

Figure 11:
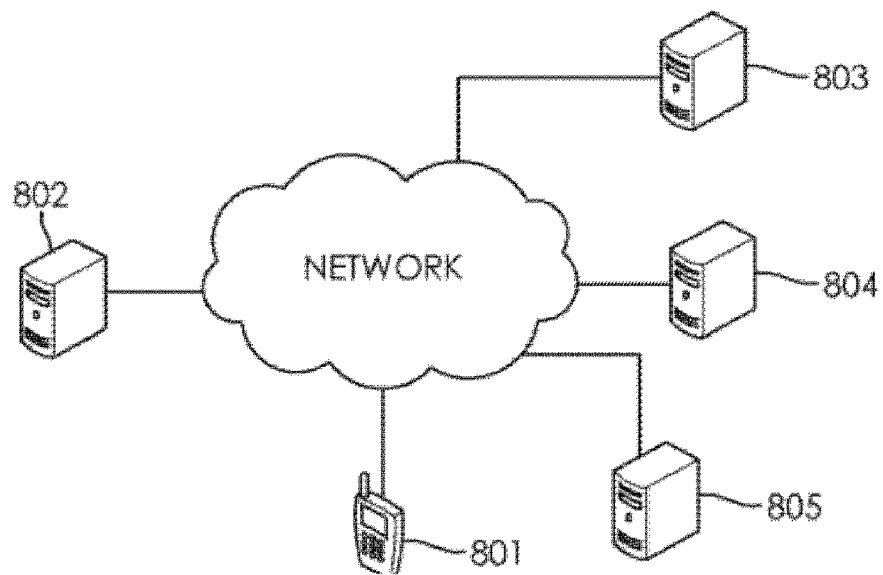
FIG. 11 is an illustration of a network diagram for a cloud based portion of the system, in accordance with an embodiment of the present invention.

Turning now to FIG. 11, a continued schematic overview of a cloud-based system in accordance with an embodiment of the present invention is shown. In FIG. 8, the cloud-based system is shown as it may interact with users and other third party networks or APIs. For instance, a user of a mobile device 801 may be able to connect to application server 802. Application server 802 may be able to enhance or otherwise provide additional services to the user by requesting and receiving information from one or more of an external content provider API/website or other third-party system 803, a social network 804, one or more business and service providers 805 or any combination thereof. Additionally, application server 802 may be able to enhance or otherwise provide additional services to an external content provider API/website or other third-party system 803, a social network 804, or one or more business and service providers 805 by providing information to those entities that is stored on a database that is connected to the application server 802. One of ordinary skill in the art would appreciate how accessing one or more third-party systems could augment the ability of the system described herein, and embodiments of the present invention are contemplated for use with any third-party system.

Traditionally, a computer program consists of a finite sequence of computational instructions or program instructions. It will be appreciated that a programmable apparatus (e.g., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, Python, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed is:

1. A system for analyzing the attractiveness of a human breast area, the system comprising:
    an image capture and processing module, comprising computer-executable code stored in non-volatile memory,
    an overlay retrieval and analysis module, comprising computer-executable code stored in non-volatile memory,
    a processor, and
    a display element,
    wherein said image capture and processing module, said overlay retrieval and analysis module, said processor, and said display element are operably connected and are configured to:
        receive image data associated with one or more images of the human breast area;
        process said one or more images of the human breast area in order to identify a plurality of breast features to be analyzed;
        generate and associate placement points for each identified breast feature;
        group the placement points into respective breast zones, where each breast zone comprises one or more identified breast features, wherein each breast zone is configured as one or more quadrilateral grids having dimensions that are defined by said placement points;

retrieve one or more quadrilateral breast overlay grids for each breast zone, wherein the quadrilateral breast overlay grids are selected from a group of specifically defined breast grid overlays; align each retrieved quadrilateral breast overlay grid over said one or more images, wherein said alignment utilizes said identified plurality of breast features as points of reference for said alignment, wherein said alignment aligns said retrieved quadrilateral breast overlay grids over discontinuous discrete portions of said image;

calculate for each of said one or more quadrilateral grids comprising each of said breast zones a numerical rating score indicative of a degree of match between said one or more quadrilateral grids and said quadrilateral breast overlay grid aligned to said one or more quadrilateral grids; and calculate an overall numerical attractiveness rating score as the sum of individually calculated numerical rating scores; and wherein the one or more quadrilateral breast overlay grids form a logarithmic spiral having a predetermined growth factor of 1.618, and wherein the logarithmic spiral widens in a direction moving from an origin by a factor of 1.618 for each quarter turn that the logarithmic spiral makes.

2. The system of claim 1, wherein a portion of the logarithmic spiral is overlaid at a lower breast margin curvature of the human breast.

3. The system of claim 1, wherein the one or more quadrilateral breast overlay grids have a first dimension and a second dimension, with a ratio between the first dimension and the second dimension being 1.618:1.

4. The system of claim 1, wherein the plurality of breast features are selected from the group consisting of a base of a jugular suprasternal notch, a medial uppermost margin of a right breast, a medial uppermost margin of a left breast, a superior border of a right areola, a superior border of a left areola, a superior border of a right nipple, a superior border of a left nipple, a lateral margin of a right breast, a lateral border of a right areola, a center of a right nipple, a medial border of a right areola, a medial border of a left areola, a center of a left nipple, a lateral border of a left areola, a lateral margin of a left breast, a central inferior-most margin of a right breast, a central inferior-most margin of a left breast, and a center of an umbilicus.

5. The system of claim 1, wherein the plurality of breast features are selected from the group consisting of a lowermost inferior border of a right clavicle, a superior border of a right areola, a central base of a right nipple where a nipple base joins an areola, an anterior most margin of a right breast, an inferior most central margin of a right breast, an anterior most margin of the right shoulder and a right olecranon.

6. The system of claim 1, wherein the plurality of breast features are selected from the group consisting of a lowermost inferior border of a left clavicle, a superior border of a left areola, a central base of a left nipple where a nipple base joins an areola, an anterior most margin of a left breast, an inferior most central margin of a left breast, an anterior most margin of the left shoulder and a left olecranon.

7. The system of claim 1, wherein the image data associated with the one or more images of the human breast area includes data of one or more equivalent images that are equivalent to imaging by a 35 mm single lens reflex print film camera having a focal length of between 50 mm and 60 mm.

8. A method for analyzing the attractiveness of a human breast area, comprising:

receiving image data associated with one or more images of a human breast area;

processing said one or more images of the human breast area in order to identify a plurality of breast features to be analyzed;

generating and associating placement points for each identified breast feature;

grouping the placement points into respective breast zones, where each breast zone comprises one or more identified breast features, wherein each breast zone is configured as one or more quadrilateral grids having dimensions that are defined by said placement points;

retrieving one or more quadrilateral breast overlay grids for each breast zone, wherein the quadrilateral breast overlay grids are selected from a group of specifically defined breast grid overlays;

aligning each retrieved quadrilateral breast overlay grid over said one or more images, wherein said alignment utilizes said identified plurality of breast features as points of reference for said alignment, wherein said alignment aligns said retrieved quadrilateral breast overlay grids over discontinuous discrete portions of said image;

calculating for each of said one or more quadrilateral grids comprising each of said breast zones a numerical rating score indicative of a degree of match between said one or more quadrilateral grids and said quadrilateral breast overlay grid aligned to said one or more quadrilateral grids; and calculating an overall numerical attractiveness rating score as the sum of individually calculated numerical rating scores;

wherein the one or more quadrilateral breast overlay grids form a logarithmic spiral having a predetermined growth factor, wherein the predetermined growth factor is 1.618, and wherein the logarithmic spiral widens in a direction moving from an origin by a factor of 1.618 for each quarter turn that the logarithmic spiral makes.

9. The method of claim 8, wherein a portion of the logarithmic spiral is overlaid at a lower breast margin curvature of the human breast.

10. The method of claim 8, wherein the one or more quadrilateral breast overlay grids have a first dimension and a second dimension, with a ratio between the first dimension and the second dimension being 1.618:1.

11. The method of claim 8, wherein the plurality of breast features are selected from the group consisting of a base of a jugular suprasternal notch, a medial uppermost margin of a right breast, a medial uppermost margin of a left breast, a superior border of a right areola, a superior border of a left areola, a superior border of a right nipple, a superior border of a left nipple, a lateral margin of a right breast, a lateral border of a right areola, a center of a right nipple, a medial border of a right areola, a medial border of a left areola, a center of a left nipple, a lateral border of a left areola, a lateral margin of a left breast, a central inferior-most margin of a right breast, a central inferior-most margin of a left breast, and a center of an umbilicus.

12. The method of claim 8, wherein the plurality of breast features are selected from the group consisting of a lowermost inferior border of a right clavicle, a superior border of a right areola, a central base of a right nipple where a nipple base joins an areola, an anterior most margin of a right breast, an inferior most central margin of a right breast, an anterior most margin of the right shoulder and a right olecranon.

13. The method of claim 8, wherein the plurality of breast features are selected from the group consisting of a lowermost inferior border of a left clavicle, a superior border of a left areola, a central base of a left nipple, an anterior most margin of a left breast, an inferior most central margin of a left breast, an anterior most margin of the left shoulder and a left olecranon.

14. A system for analyzing the attractiveness of a human breast area, the system comprising:
    an image capture and processing module, comprising computer-executable code stored in non-volatile memory,
    an overlay retrieval and analysis module, comprising computer-executable code stored in non-volatile memory,
    a processor, and
    a display element,
    wherein said image capture and processing module, said overlay retrieval and analysis module, said processor, and said display element are operably connected and are configured to:
        receive image data associated with one or more images of the human breast area;
        process said one or more images of the human breast area in order to identify a plurality of breast features to be analyzed;
        generate and associate placement points for each identified breast feature;
        group the placement points into respective breast zones, where each breast zone comprises one or more identified breast features, wherein each breast zone is configured as one or more quadrilateral grids having dimensions that are defined by said placement points;
        retrieve one or more quadrilateral breast overlay grids for each breast zone, wherein the quadrilateral breast overlay grids are selected from a group of specifically defined breast grid overlays; align each retrieved quadrilateral breast overlay grid over said one or more images, wherein said alignment utilizes said identified plurality of breast features as points of reference for said alignment, wherein said alignment aligns said retrieved quadrilateral breast overlay grids over discontinuous discrete portions of said image;
        calculate for each of said one or more quadrilateral grids comprising each of said breast zones a numerical rating score indicative of a degree of match between said one or more quadrilateral grids and said quadrilateral breast overlay grid aligned to said one or more quadrilateral grids; and
        calculate an overall numerical attractiveness rating score as the sum of individually calculated numerical rating scores; and
    wherein the image data associated with the one or more images of the human breast area includes data of one or more equivalent images that are equivalent to imaging by a 35 mm camera having a focal length of between 50 mm and 60 mm.

15. The system of claim 14, wherein the 35 mm camera is a 35 mm single lens reflex print film camera.

16. The system of claim 14, wherein the one or more quadrilateral breast overlay grids have a first dimension and a second dimension, with a ratio between the first dimension and the second dimension being 1.618:1.

* * * * *